(12) United States Patent
Yan et al.

(10) Patent No.: US 12,524,140 B2
(45) Date of Patent: Jan. 13, 2026

(54) WINDOW INTERACTION METHOD AND ELECTRONIC DEVICE

(71) Applicant: Honor Device Co., Ltd., Shenzhen (CN)

(72) Inventors: Chaojie Yan, Shenzhen (CN); Junfeng Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/580,897

(22) PCT Filed: Jan. 6, 2023

(86) PCT No.: PCT/CN2023/071082
§ 371 (c)(1),
(2) Date: Jan. 19, 2024

(87) PCT Pub. No.: WO2023/131312
PCT Pub. Date: Jul. 13, 2023

(65) Prior Publication Data
US 2024/0361897 A1  Oct. 31, 2024

(30) Foreign Application Priority Data

Jan. 10, 2022  (CN) .......................... 202210023810.3
Jan. 30, 2022  (CN) .......................... 202210114778.X

(51) Int. Cl.
*G06F 3/04847* (2022.01)
*G06F 1/16* (2006.01)
(Continued)

(52) U.S. Cl.
CPC ........ *G06F 3/04847* (2013.01); *G06F 1/1641* (2013.01); *G06F 1/1652* (2013.01);
(Continued)

(58) Field of Classification Search
CPC ............... G06F 3/0481; G06F 3/04817; G06F 2203/04803; G06F 2209/545; G06F 3/00;
(Continued)

(56) References Cited

U.S. PATENT DOCUMENTS 5,619,639 A * 4/1997 Mast ....................... G06F 9/451
715/835
2014/0310646 A1* 10/2014 Vranjes ................... G06F 9/451
715/788
(Continued)

FOREIGN PATENT DOCUMENTS

CN          104820557 A      8/2015
CN          107153541 A      9/2017
(Continued)

Primary Examiner — Sujit Shah
(74) Attorney, Agent, or Firm — SLATER MATSIL, LLP

(57) ABSTRACT

An electronic device displays a first interface by using the first display screen; the electronic device displays a second interface in response to a first operation on the first window or the second window; the second interface includes a first floating window, the first window, the second window, and the first slide bar; and a width of the first floating window is less than that of the first display screen, the first floating window is a non-modal dialog box, and the first floating window satisfies a first state.

20 Claims, 54 Drawing Sheets

(51) Int. Cl.
*G06F 3/04842* (2022.01)
*G06F 3/04845* (2022.01)
*H04M 1/02* (2006.01)

(52) U.S. Cl.
CPC ........ *G06F 1/1677* (2013.01); *G06F 3/04842* (2013.01); *G06F 3/04845* (2013.01); *H04M 1/0268* (2013.01); *G06F 2203/04803* (2013.01)

(58) Field of Classification Search
CPC .... G06F 3/048; G06F 3/0482; G06F 3/04845; G06F 3/04847; G06F 3/0486; G06F 3/04883; G06F 3/04886; G06F 9/00; G06F 9/451
See application file for complete search history.

(56) References Cited

U.S. PATENT DOCUMENTS

| | | | | |
|---|---|---|---|---|
| 2015/0227509 | A1* | 8/2015 | Landau | G06F 40/58 704/2 |
| 2015/0338888 | A1* | 11/2015 | Kim | G06F 1/1677 345/156 |
| 2018/0367666 | A1* | 12/2018 | Won | G06F 3/0488 |
| 2020/0278720 | A1* | 9/2020 | Kim | G06F 1/1647 |
| 2021/0004432 | A1* | 1/2021 | Li | G06F 40/295 |
| 2021/0096675 | A1 | 4/2021 | Klein et al. | |
| 2021/0097901 | A1* | 4/2021 | Klein | G06F 1/162 |
| 2022/0317873 | A1 | 10/2022 | Wang et al. | |
| 2023/0325072 | A1 | 10/2023 | Wang | |

FOREIGN PATENT DOCUMENTS

| | | |
|---|---|---|
| CN | 110324464 A | 10/2019 |
| CN | 111669459 A | 9/2020 |
| CN | 111813285 A | 10/2020 |
| CN | 111913774 A | 11/2020 |
| CN | 111949350 A | 11/2020 |
| CN | 111966252 A | 11/2020 |
| CN | 112578982 A | 3/2021 |
| CN | 113325996 A | 8/2021 |
| CN | 113672133 A | 11/2021 |
| WO | 2021227770 A1 | 11/2021 |

* cited by examiner

WINDOW INTERACTION METHOD AND ELECTRONIC DEVICE

CROSS-REFERENCE TO RELATED APPLICATIONS

This application is a national phase of International Application No. PCT/CN2023/071082, filed Jan. 6, 2023, which application claims priority to Chinese Patent Application No. 202210023810.3, filed on Jan. 10, 2022, and Chinese Patent Application No. 202210114778.X, filed on Jan. 30, 2022, which are incorporated herein by reference in their entireties.

TECHNICAL FIELD

This application relates to the field of terminal technologies, and in particular, to a window interaction method and an electronic device.

BACKGROUND

With the popularization and development of the Internet, people's functional requirements for electronic devices are also becoming more and more diverse. For example, to meet a requirement of a user for using multiple functions, a larger number of electronic devices may support display of floating windows of the electronic devices. For example, the user may trigger display of a floating window corresponding to a translation function by copying a to-be-translated text, and the user may also view translation content through the floating window corresponding to the translation function.

However, when the user screen-splits a display interface, it is difficult for the electronic device to adjust the display of the floating window according to a requirement of the user for screen-splitting the interface, thereby affecting user experience.

SUMMARY

Embodiments of this application provide a window interaction method and an electronic device, so that the electronic device can appropriately display a floating window according to a requirement of a user for screen-splitting a display screen, thereby enhancing the user's experience of using the floating window.

In a first aspect, an embodiment of this application provides a window interaction method, applied to an electronic device, the electronic device includes a first display screen, and the method includes: The electronic device displays a first interface by using the first display screen; the first interface includes a first window, a second window, and a first slide bar configured to resize the first window and the second window; and content displayed in the first window and content displayed in the second window both belong to a first application; and the electronic device displays a second interface in response to a first operation on the first window or the second window; the second interface includes a first floating window, the first window, the second window, and the first slide bar; and a width of the first floating window is less than that of the first display screen, the first floating window is a non-modal dialog box, and the first floating window satisfies a first state. In this way, the electronic device can appropriately display a floating window according to a requirement of a user for screen-splitting a display screen, thereby enhancing the user's experience of using the floating window.

In a possible implementation, the second interface further includes a first region, the first region is a region in the second interface other than the first floating window, and the method further includes: The electronic device displays a third interface in response to a second operation on the first region; the third interface includes a second floating window, the second floating window satisfies a second state; and the second state is different from or the same as the first state. In this way, the electronic device can realize non-modality of the floating window, thereby enhancing the user's experience of using the floating window.

In a possible implementation, the second operation includes: an operation of sliding the first slide bar to the first region in the second interface.

In a possible implementation, the first state includes any one of a half-screen state, a full-screen state, and a bottom state; and the second state includes the bottom state.

In a possible implementation, the method further includes: The electronic device displays a fourth interface in response to a third operation on the electronic device; the fourth interface includes a third floating window; and a width of the third floating window is less than that of the first display screen, and the third floating window satisfies the first state. In this way, the electronic device can realize flipping of the floating window according to screen flipping, to enhance the user's experience of using the floating window.

In a possible implementation, the fourth interface is an interface of the electronic device in a landscape state when the second interface is an interface of the electronic device in a portrait state.

In a possible implementation, the electronic device further includes a second display screen, and the method further includes: The electronic device displays a fifth interface in response to a fourth operation on the electronic device by using the second display screen; the fifth interface includes a fourth floating window and the second window; and a width of the fourth floating window is the same as that of the second display screen.

In a possible implementation, that the electronic device displays a fifth interface in response to a fourth operation on the electronic device by using the second display screen includes: The electronic device obtains first data in response to a fourth operation on the electronic device; the first data includes folding-angle data; the folding-angle data is detected based on an angle chain sensor; and the electronic device displays the fifth interface by using the second display screen when the electronic device determines that the folding-angle data satisfies a first preset condition. In this way, the electronic device can switch floating windows in inner and outer display screens according to a detected folding angle.

In a possible implementation, before the electronic device displays a first interface by using the first display screen, the method further includes: The electronic device displays a sixth interface by using the first display screen when a preset function of the first application is enabled; content displayed on the sixth interface belongs to the first application; and that the electronic device displays a first interface by using the first display screen includes: The electronic device displays the first interface in response to a fifth operation on the sixth interface by using the first display screen. In this way, the electronic device can conveniently open a parallel horizon.

In a possible implementation, that the electronic device displays a second interface in response to a first operation on the first window or the second window includes: The electronic device displays a seventh interface in response to the first operation on the first window or the second window; the seventh interface includes a first text; the electronic device displays a first control in response to an operation on the first text; the first control includes a copy option and a translation option; the electronic device displays a floating ball control in response to an operation on the copy option; and the electronic device displays the second interface in response to an operation on the floating ball control. In this way, the electronic device can conveniently open the floating window according to a copy operation of the user.

In a possible implementation, that the electronic device displays a first interface by using the first display screen includes: The electronic device displays an eighth interface by using the first display screen; the eighth interface includes a second text; the electronic device displays a second control in response to an operation on the second text; the second control includes a copy option and a translation option; and the electronic device displays the first interface in response to an operation on the translation option by using the first display screen. In this way, the electronic device can conveniently open the floating window according to a translation operation of the user.

In a possible implementation, a window interaction method is provided, applied to an electronic device, the electronic device includes a first display screen, and the method includes: The electronic device displays a first interface by using the first display screen; the first interface includes a first window and a second window, content displayed in the first window belongs to a first application, and content displayed in the second window belongs to a second application; the electronic device displays a first floating window in the first window in response to a first operation on the first window; the first floating window is a non-modal dialog box, and the first floating window satisfies a first state; and the electronic device displays a second floating window in the second window in response to a second operation on the second window; and the second floating window is a non-modal dialog box, and the second floating window satisfies the first state. In this way, the electronic device can realize flexible display of the floating window in a split-screen window.

In a possible implementation, the first window further includes a first region, the first region is a region in the first window other than the first floating window, and the method further includes: The electronic device displays a third interface in response to a third operation on the first region; the third interface includes: a third floating window in the first window, and the second floating window in the second window; the third floating window satisfies a second state; and the second state is different from or the same as the first state. In this way, each floating window in the split-screen window can realize non-modality, which enhances the user's experience of using the floating window.

In a possible implementation, the second window further includes a second region, the second region is a region in the second window other than the second floating window, and the method further includes: The electronic device displays a fourth interface in response to a fourth operation on the second region; the fourth interface includes: the first floating window in the first window, and a fourth floating window in the second window; the fourth floating window satisfies a second state; and the second state is different from or the same as the first state. In this way, each floating window in the split-screen window can realize non-modality, which enhances the user's experience of using the floating window.

In a possible implementation, the first state includes any one of a half-screen state, a full-screen state, and a bottom state; and the second state includes the bottom state.

In a possible implementation, a width of the first floating window is half a width of the first display screen; and a width of the second floating window is half the width of the first display screen.

In a possible implementation, the method further includes: The electronic device displays a fifth interface in response to a fifth operation on the electronic device; the fifth interface includes a fifth floating window in the first window and a sixth floating window in the second window, the fifth floating window satisfies the first state, and the sixth floating window satisfies the first state. In this way, the floating window in the split-screen window can be flexibly displayed according to a flip operation of the user.

In a possible implementation, that the electronic device displays a fifth interface in response to a fifth operation on the electronic device includes: The electronic device obtains first data in response to the fifth operation on the electronic device; the first data includes angular acceleration data; the angular acceleration data is detected based on a gyroscope sensor; and the electronic device displays the fifth interface when the electronic device determines that the angular acceleration data satisfies a first preset condition. In this way, the electronic device can flexibly display the screen according to the detected angular acceleration data.

In a possible implementation, a width of the fifth floating window is half a height of the first display screen; and a width of the sixth floating window is half the height of the first display screen.

In a possible implementation, the first interface further includes a first slide bar configured to resize the first window and the second window, and the method further includes: The electronic device displays a sixth interface in response to an operation of sliding the first slide bar to a third region; the sixth interface includes a seventh floating window in a third window and an eighth floating window in a fourth window, a width of the third window is less than that of the fourth window, and a width of the seventh floating window is less than that of the eighth floating window; alternatively, the electronic device displays a seventh interface in response to an operation of sliding the first slide bar to a fourth region; the seventh interface includes a first floating ball control in a fifth window and a ninth floating window in a sixth window, a width of the fifth window is less than that of the sixth window, and a width of the ninth floating window is less than that of the sixth window; alternatively, the electronic device displays an eighth interface in response to an operation of sliding the first slide bar to a fifth region; the eighth interface includes an eighth floating window, and a width of the eighth floating window is less than that of the first display screen.

In a possible implementation, after that the electronic device displays a seventh interface in response to an operation of sliding the first slide bar to a fourth region, the method further includes: The electronic device displays a ninth interface in response to an operation of sliding the first slide bar to a sixth region; the ninth interface includes the first floating ball control in the seventh window and a second floating ball control in an eighth window; and a width of the seventh window is greater than that of the eighth window; alternatively, the electronic device displays a tenth interface in response to an operation of sliding the first slide bar to a seventh region; the tenth interface includes a ninth floating window; and a width of the ninth floating window is less than that of the first display screen. In this way, the floating window in the split-screen window can be flexibly displayed according to an operation of the user.

In a possible implementation, after that the electronic device displays a ninth interface in response to an operation of sliding the first slide bar to a sixth region, the method further includes: The electronic device displays an eleventh interface in response to an operation of sliding the first slide bar to an eighth region; the eleventh interface includes the second floating ball control. In this way, the floating window in the split-screen window can be flexibly displayed according to an operation of the user.

In a possible implementation, the electronic device further includes a second display screen, and the method further includes: The electronic device displays a twelfth interface in response to a sixth operation on the electronic device by using the second display screen; the twelfth interface includes a ninth window and a tenth window, and a width of the ninth window and a width of the tenth window are both the same as a width of the second display screen. In this way, the electronic device can flexibly display the floating window on a plurality of screens according to folding of a foldable screen by the user.

In a possible implementation, that the electronic device displays a twelfth interface in response to a sixth operation on the electronic device by using the second display screen includes: The electronic device obtains second data in response to the sixth operation on the electronic device; the second data includes folding-angle data; the folding-angle data is detected based on an angle chain sensor; and the electronic device displays the twelfth interface by using the second display screen when the electronic device determines that the folding-angle data satisfies a second preset condition. In this way, the electronic device can realize detection according to an angle of the foldable screen, and determine display of a plurality of display screens of the electronic device according to a folding angle.

In a possible implementation, a window interaction method is provided, applied to an electronic device, the electronic device includes a first display screen, and the method includes: The electronic device displays a first interface in response to an operation of enabling a first application by using the first display screen when a preset function of the first application is not enabled; the electronic device displays a second interface in response to a first operation on the first interface; the second interface includes a first floating window; a width of the first floating window is less than that of the first display screen; the electronic device displays the first interface in response to an operation of enabling the preset function of the first application and opening the first application; the electronic device displays a third interface in response to the first operation on the first interface; the third interface includes a first window, a second window, and a first slide bar configured to resize the first window and the second window, the second window includes a first floating ball control corresponding to the first floating window, and content displayed in the first window and content displayed in the second window both belong to the first application; and the electronic device displays a fourth interface in response to a second operation on the first floating ball control; the fourth interface includes the first floating window, the first window, the second window, and the first slide bar; and a width of the first floating window is less than that of the first display screen, the first floating window is a non-modal dialog box, and the first floating window satisfies a first state. In this way, the electronic device can realize display of the floating window in an interface using the parallel horizon.

In a second aspect, an embodiment of this application provides a window interaction apparatus, applied to an electronic device, the electronic device includes a first display screen, and the method includes: a display unit, configured to display a first interface by using the first display screen; the first interface includes a first window, a second window, and a first slide bar configured to resize the first window and the second window; content displayed in the first window and content displayed in the second window both belong to a first application; and the display unit is further configured to display a second interface in response to a first operation on the first window or the second window; the second interface includes a first floating window, the first window, the second window, and the first slide bar; and a width of the first floating window is less than that of the first display screen, the first floating window is a non-modal dialog box, and the first floating window satisfies a first state.

In a possible implementation, the second interface further includes a first region, the first region is a region in the second interface other than the first floating window, and the display unit is further configured to display a third interface in response to a second operation on the first region; the third interface includes a second floating window, the second floating window satisfies a second state; and the second state is different from or the same as the first state.

In a possible implementation, the second operation includes: an operation of sliding the first slide bar to the first region in the second interface.

In a possible implementation, the first state includes any one of a half-screen state, a full-screen state, and a bottom state; and the second state includes the bottom state.

In a possible implementation, the display unit is configured to display a fourth interface in response to a third operation on the electronic device; the fourth interface includes a third floating window; and a width of the third floating window is less than that of the first display screen, and the third floating window satisfies the first state.

In a possible implementation, the fourth interface is an interface of the electronic device in a landscape state when the second interface is an interface of the electronic device in a portrait state.

In a possible implementation, the electronic device further includes a second display screen, and the display unit is configured to display, in response to a fourth operation on the electronic device, a fifth interface by using the second display screen; the fifth interface includes a fourth floating window and the second window; and a width of the fourth floating window is the same as that of the second display screen.

In a possible implementation, a processing unit is configured to obtain first data in response to the fourth operation on the electronic device; the first data includes folding-angle data; the folding-angle data is detected based on an angle chain sensor; and the display unit is configured to display the fifth interface by using the second display screen when the electronic device determines that the folding-angle data satisfies a first preset condition.

In a possible implementation, the display unit is configured to display a sixth interface by using the first display screen when a preset function of the first application is enabled; content displayed on the sixth interface belongs to the first application; and the display unit is configured to display, in response to a fifth operation on the sixth interface, the first interface by using the first display screen.

In a possible implementation, the display unit is configured to display a seventh interface in response to the first operation on the first window or the second window; the seventh interface includes a first text; in response to an operation on the first text, the display unit is configured to display a first control; the first control includes a copy option and a translation option; the display unit is configured to display a floating ball control in response to an operation on the copy option; and the electronic device displays the second interface in response to an operation on the floating ball control.

In a possible implementation, the display unit is configured to display an eighth interface by using the first display screen; the eighth interface includes a second text; the display unit is configured to display a second control in response to an operation on the second text; the second control includes a copy option and a translation option; and the display unit is configured to display, in response to an operation on the translation option, the first interface by using the first display screen.

In a possible implementation, a window interaction method is provided, applied to an electronic device, the electronic device includes a first display screen, and the method includes: a display unit, configured to display a first interface by using the first display screen; the first interface includes a first window and a second window, content displayed in the first window belongs to a first application, and content displayed in the second window belongs to a second application; the display unit is configured to display a first floating window in the first window in response to a first operation on the first window; the first floating window is a non-modal dialog box, and the first floating window satisfies a first state; and the display unit is configured to display a second floating window in the second window in response to a second operation on the second window; the second floating window is a non-modal dialog box, and the second floating window satisfies the first state.

In a possible implementation, the first window further includes a first region, the first region is a region in the first window other than the first floating window, and the display unit is configured to display a third interface in response to a third operation on the first region; the third interface includes: a third floating window in the first window, and the second floating window in the second window; the third floating window satisfies a second state; and the second state is different from or the same as the first state.

In a possible implementation, the second window further includes a second region, the second region is a region in the second window other than the second floating window, and the display unit is configured to display a fourth interface in response to a fourth operation on the second region; the fourth interface includes: the first floating window in the first window, and a fourth floating window in the second window; the fourth floating window satisfies a second state; and the second state is different from or the same as the first state.

In a possible implementation, the first state includes any one of a half-screen state, a full-screen state, and a bottom state; and the second state includes the bottom state.

In a possible implementation, a width of the first floating window is half a width of the first display screen; and a width of the second floating window is half the width of the first display screen.

In a possible implementation, the display unit is further configured to display a fifth interface in response to a fifth operation on the electronic device; and the fifth interface includes a fifth floating window in the first window and a sixth floating window in the second window, the fifth floating window satisfies the first state, and the sixth floating window satisfies the first state.

In a possible implementation, a processing unit is configured to obtain first data in response to the fifth operation on the electronic device; the first data includes angular acceleration data; the angular acceleration data is detected based on a gyroscope sensor; and the display unit is configured to display the fifth interface when the electronic device determines that the angular acceleration data satisfies a first preset condition.

In a possible implementation, a width of the fifth floating window is half a height of the first display screen; and a width of the sixth floating window is half the height of the first display screen.

In a possible implementation, the first interface further includes a first slide bar configured to resize the first window and the second window, and the display unit is configured to display a sixth interface in response to an operation of sliding the first slide bar to a third region; the sixth interface includes a seventh floating window in a third window and an eighth floating window in a fourth window, a width of the third window is less than that of the fourth window, and a width of the seventh floating window is less than that of the eighth floating window; or the display unit is configured to display a seventh interface in response to an operation of sliding the first slide bar to a fourth region; the seventh interface includes a first floating ball control in a fifth window and a ninth floating window in a sixth window, a width of the fifth window is less than that of the sixth window, and a width of the ninth floating window is less than that of the sixth window; or the display unit is configured to display an eighth interface in response to an operation of sliding the first slide bar to a fifth region; the eighth interface includes an eighth floating window, and a width of the eighth floating window is less than that of the first display screen.

In a possible implementation, the display unit is configured to display a ninth interface in response to an operation of sliding the first slide bar to a sixth region; the ninth interface includes the first floating ball control in the seventh window and a second floating ball control in an eighth window; and a width of the seventh window is greater than that of the eighth window; or the display unit is configured to display a tenth interface in response to an operation of sliding the first slide bar to a seventh region; the tenth interface includes a ninth floating window; and a width of the ninth floating window is less than that of the first display screen.

In a possible implementation, the display unit is configured to display an eleventh interface in response to an operation of sliding the first slide bar to an eighth region; the eleventh interface includes the second floating ball control.

In a possible implementation, the electronic device further includes a second display screen, and the display unit is configured to display, in response to a sixth operation on the electronic device, a twelfth interface by using the second display screen; the twelfth interface includes a ninth window and a tenth window, and a width of the ninth window and a width of the tenth window are both the same as a width of the second display screen.

In a possible implementation, a processing unit is configured to obtain second data in response to the sixth operation on the electronic device; the second data includes folding-angle data; the second data includes folding-angle data; the folding-angle data is detected based on an angle chain sensor; and the display unit is configured to display the twelfth interface by using the second display screen when the electronic device determines that the folding-angle data satisfies a second preset condition.

In a possible implementation, a window interaction method is provided, applied to an electronic device, the electronic device includes a first display screen, and the method includes: a display unit, configured to display a first interface in response to an operation of enabling a first application by using the first display screen when a preset function of the first application is not enabled; the display unit is configured to display a second interface in response to a first operation on the first interface; the second interface includes a first floating window; a width of the first floating window is less than that of the first display screen; the display unit is configured to display the first interface in response to an operation of enabling the preset function of the first application and opening the first application; the display unit is configured to display a third interface in response to the first operation on the first interface; the third interface includes a first window, a second window, and a first slide bar configured to resize the first window and the second window, the second window includes a first floating ball control corresponding to the first floating window, and content displayed in the first window and content displayed in the second window both belong to the first application; and the display unit is configured to display a fourth interface in response to a second operation on the first floating ball control; the fourth interface includes the first floating window, the first window, the second window, and the first slide bar; and a width of the first floating window is less than that of the first display screen, the first floating window is a non-modal dialog box, and the first floating window satisfies a first state.

The second aspect and any one of the implementations in the second aspect correspond to the first aspect and any one of the implementations in the first aspect respectively. Technical effects of the second aspect and any one of the implementations in the second aspect may be obtained with reference to the technical effects corresponding to the first aspect and any one of the implementations in the first aspect. Details are not described herein.

In a third aspect, an embodiment of this application provides a computer-readable storage medium, where a computer program is stored in the computer-readable storage medium, and the computer program, when executed on a computer, causes the computer to perform the method according to any one of the first aspect.

The third aspect and any one of the implementations in the third aspect correspond to the first aspect and any one of the implementations in the first aspect respectively. Technical effects corresponding to the third aspect and any one of the implementations in the third aspect may be obtained with reference to the technical effects corresponding to the first aspect and any one of the implementations in the first aspect. Details are not described herein.

In a fourth aspect, an embodiment of this application provides a computer program product, where the computer program product includes a computer program, and the computer program, when executed on a computer, causes the computer to perform the method according to any one of the first aspect.

The fourth aspect and any one of the implementations in the fourth aspect correspond to the first aspect and any one of the implementations in the first aspect respectively. Technical effects corresponding to the fourth aspect and any one of the implementations in the fourth aspect may be obtained with reference to the technical effects corresponding to the first aspect and any one of the implementations in the first aspect. Details are not described herein.

In a possible design, the program in the fifth aspect may be stored in whole or in part on a storage medium packaged with a processor, or in part or in whole on a memory not packaged with a processor.

DETAILED DESCRIPTION OF ILLUSTRATIVE EMBODIMENTS

Figure 1:
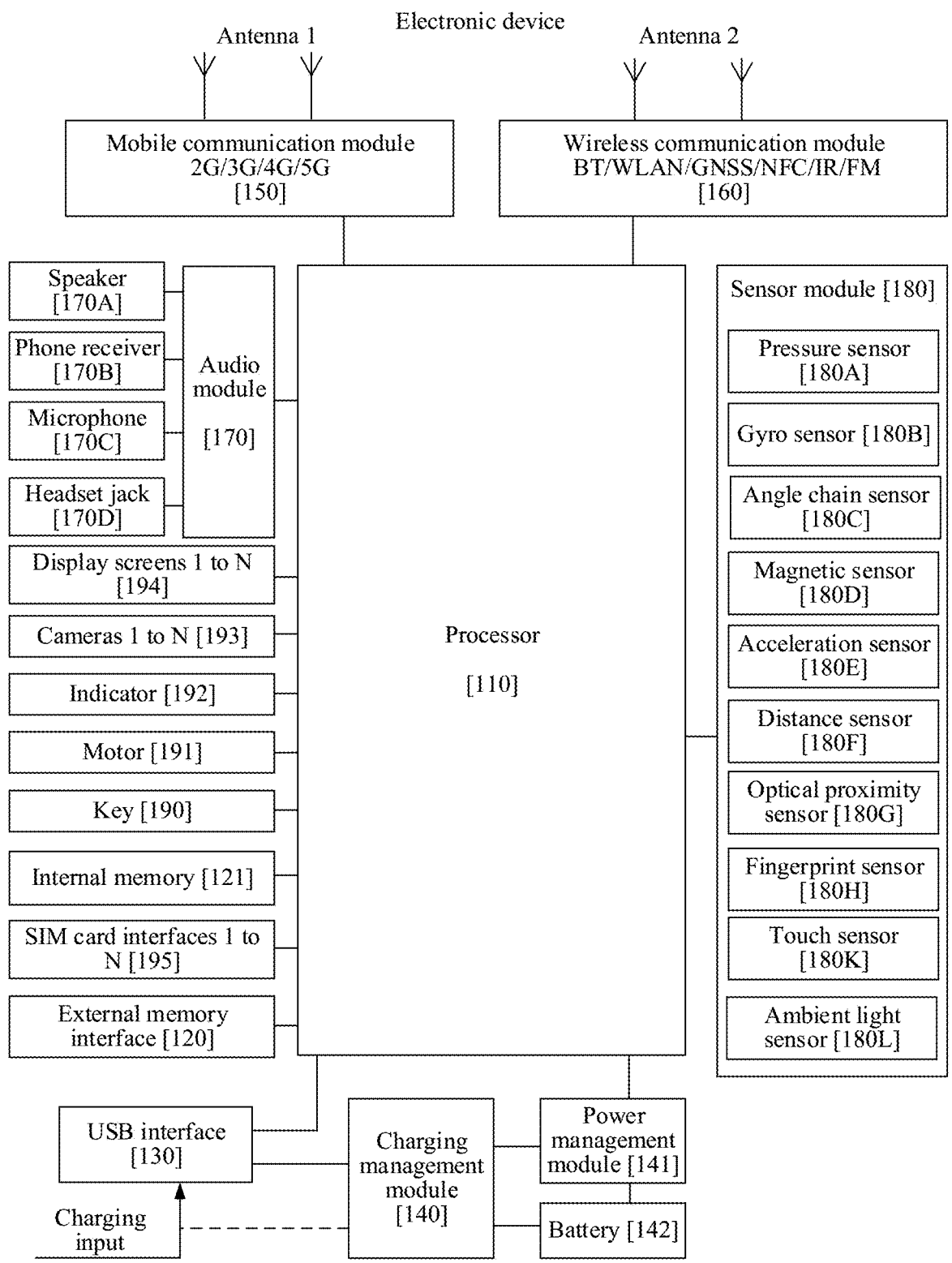
FIG. 1 is a schematic diagram of a hardware structure of an electronic device according to an embodiment of this application.

For ease of describing the technical solutions in embodiments of this application clearly, in embodiments of this application, words such as "first" and "second" are used to distinguish same or similar items with a basically same function and role. For example, a first value and a second value are merely used to distinguish between different values, and are not intended to limit a sequence thereof. A person skilled in the art may understand that the words "first", "second", and the like do not limit a quantity and an execution order, and the words "first", "second", and the like are not limited to be necessarily different.

It should be noted that in this application, the term "exemplarily" or "for example" is used to represent giving an example, an illustration, or a description. Any embodiment or design scheme described as "exemplary" or "for example" in this application should not be explained as being more preferred or having more advantages than another embodiment or design scheme. In particular, the terms such as "exemplary" and "for example" as used herein are intended to present the related concept in a specific implementation.

In this application, "at least one" refers to one or more, and "a plurality of" refers to two or more. The term "and/or" describes an association relationship for describing associated objects and represents that three relationships may exist. For example, A and/or B may represent: only A exists, both A and B exist, and only B exists, where A and B may be singular or plural. The character "/" in this specification generally indicates an "or" relationship between the associated objects. "At least one of the following items" or a similar expression means any combination of these items, including a single item or any combination of a plurality of items. For example, at least one of a, b, or c may represent: a, b, c, a and b, a and c, b and c, or a, b, and c, where a, b, and c may be single or multiple.

With the diversification of functional requirements of electronic devices, more electronic devices can support a parallel horizon function or an application split-screen display function. The parallel horizon function may be understood as respectively displaying different content of a same application in two windows of a same interface. The application split-screen display function may be understood as respectively displaying content of different applications in two windows of a same interface.

Generally, the electronic devices cannot support a user to open a floating window in the interface corresponding to the parallel horizon (or application split screen). In addition, when receiving, from the user, an operation of switching from a portrait state to a landscape state, the electronic devices cannot automatically flip the floating window opened in the interface corresponding to the parallel horizon (or application split screen). Moreover, the floating window is modal, which may be understood as that when the floating window exists, the user cannot touch or tap a region other than the floating window.

In view of this, embodiments of this application provide a window interaction method and an electronic device, so that the electronic device can appropriately display a floating window according to an operation of the user for screen-splitting a display screen, thereby enhancing the user's experience of using the floating window. The above electronic device may also be referred to as a terminal (terminal), a user equipment (user equipment, UE), a mobile station (mobile station, MS), a mobile terminal (mobile terminal, MT), or the like. The electronic device may be a mobile phone (mobile phone) with a window display function, a foldable screen phone, a smart TV, a wearable device, a tablet computer, a computer having a wireless transmission and receiving function, a virtual reality (virtual reality, VR) electronic device, an augmented reality (augmented reality, AR) electronic device, a wireless terminal related to industrial control (industrial control), a wireless terminal related to self-driving (self-driving), a wireless terminal related to remote medical surgery (remote medical surgery), a wireless terminal related to a smart grid (smart grid), a wireless terminal related to transportation safety (transportation safety), a wireless terminal related to a smart city (smart city), a wireless terminal related to a smart home (smart home), or the like. Embodiments of this application impose no limitation on a specific technology and a specific device form used by the electronic device.

For example, FIG. 1 is a schematic structural diagram of an electronic device according to an embodiment of this application.

As shown in FIG. 1, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a hinge sensor 180C, a magnetic sensor 180D, an acceleration sensor 180E, a range sensor 180F, an optical proximity sensor 180G, a fingerprint sensor 180H, a touch sensor 180K, an ambient light sensor 180L, and the like.

In this embodiment of this application, the hinge sensor may be configured to detect a folding angle of the electronic device, and the gyroscope sensor is configured to detect a landscape or portrait flip state of the electronic device.

It may be understood that the schematic structure in this embodiment of this application imposes no specific limitation on the electronic device. In some other embodiments of this application, the electronic device may include more or fewer components than those illustrated, or some components may be combined, or some components may be split, or a different component deployment may be used. The components illustrated may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors. For example, the processor 110 may be configured to perform an ambient light detection method in embodiments of this application.

The controller may be a nerve center and a command center of the electronic device. The controller may generate an operation control signal according to instruction operation code and a time-sequence signal, to complete control of instruction fetching and instruction execution.

A memory may also be disposed in the processor 110, configured to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. In this way, repeated access is avoided, and waiting time of the processor 110 is reduced, thereby improving system efficiency.

The electronic device implements a display function through the GPU, the display screen 194, and the application processor. The GPU is a microprocessor for image processing and connects the display screen 194 and the application processor. The GPU is configured to perform mathematical and geometric calculations, and is configured to render graphics. The processor 110 may include one or more GPUs that execute a program instruction to generate or change display information.

The display screen 194 is configured to display an image, a video, and the like. The display screen 194 includes a display panel. The display panel may be an organic light-emitting diode (organic light-emitting diode, OLED). In some embodiments, the electronic device may include 1 or N display screens 194, where N is a positive integer greater than 1.

A software system of the electronic device may use a layered architecture, an event-driven architecture, a microkernel architecture, a micro service architecture, or a cloud architecture. In embodiments of the present invention, an Android system with a layered architecture is used as an example to illustrate a software structure of the electronic device.

Figure 2:
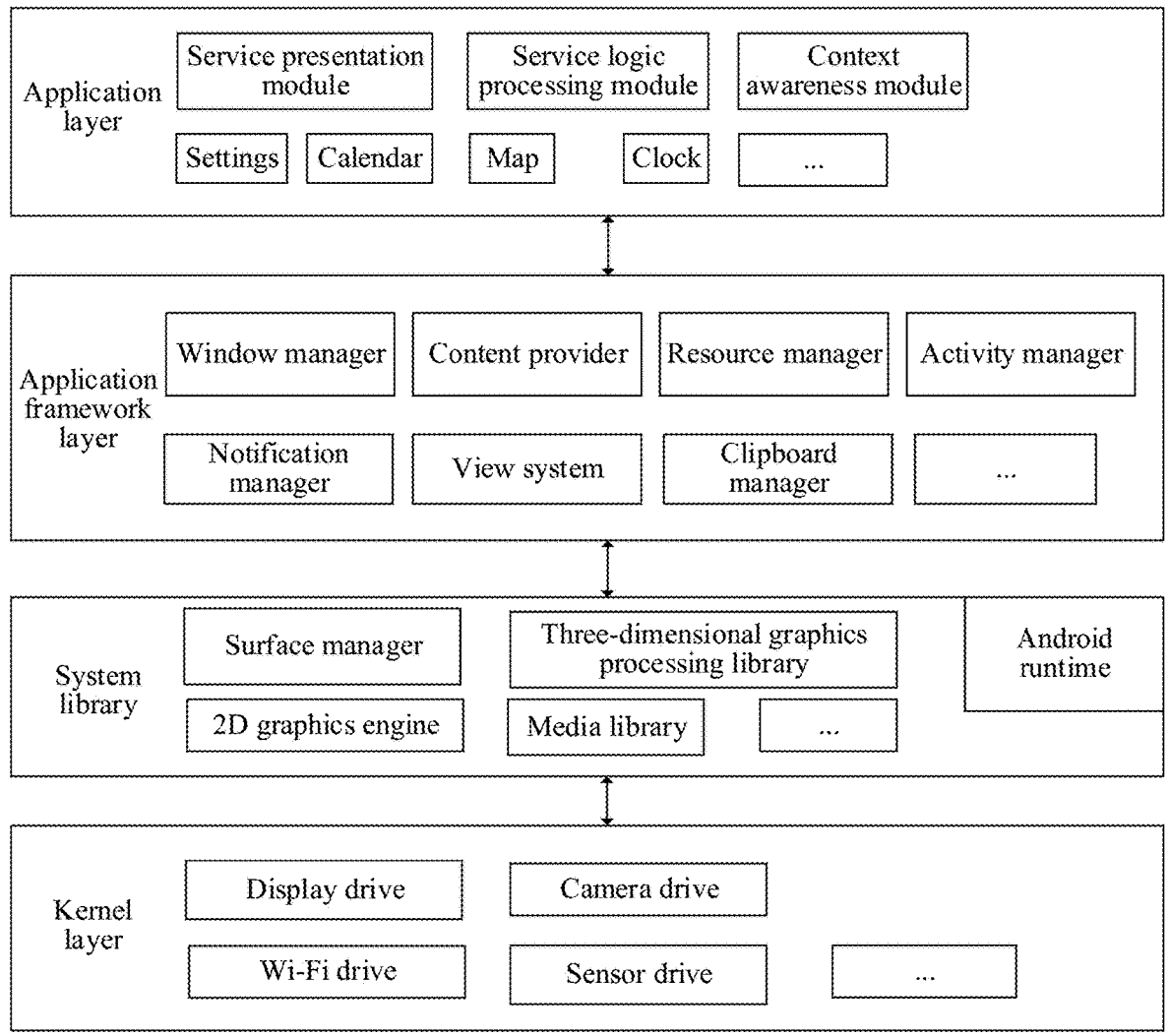
FIG. 2 is a schematic diagram of a software architecture of an electronic device according to an embodiment of this application.

For example, FIG. 2 is a schematic diagram of a software architecture of an electronic device according to an embodiment of this application.

As shown in FIG. 2, the electronic device may divide an Android system into five layers that are respectively an application layer (applications), an application framework layer (application framework), an Android runtime (Android runtime) and system library, a hardware abstraction layer (hardware abstraction layer, HAL, not shown in the figure), and a kernel layer (kernel).

The application layer may include a series of application packages. For example, the application layer may include: application programs (the application programs may be referred to as applications) such as Settings, Calendar, Map, and Clock, which are not limited in this embodiment of this application.

In this embodiment of this application, the application layer may further include a context awareness module, a service logic processing module, a service presentation module, and the like. The context awareness module, the service logic processing module, and the service presentation module may be independent APPs, or may be separately integrated into different APPs, or may be integrated into a same APP, which is not limited in this application.

The context awareness module is resident or runs in a form of low power consumption, and has a capability of perceiving an external fact or an environment. The context awareness module may detect a related event and obtain a state of the event from another application at the application layer, the application framework layer, the system layer, or the kernel layer by using an API (application program interface), such as detecting a Bluetooth connection or a network connection, monitoring a user's SMS message, or customizing a timer. In this embodiment of this application, the context awareness module mainly monitors whether a clipboard has a copy event, and notifies the service logic processing module of a copy event when monitoring that the clipboard has the copy event. The context awareness module may be further configured to obtain a source application (APP) of cut content in the clipboard, that is, an application package name. That is, the context awareness module recognizes that the cut content in the clipboard is copied from a specific application. In addition, the context awareness module may further detect whether an operation of exiting the current page is performed, and notify the service logic processing module when detecting the operation of exiting the current page.

The service logic processing module (for example, a computing engine) has a service logic processing capability, and is configured to implement logic of display and disappearance of various floating balls or floating windows. For example, the service logic processing module receives a copy event triggered by the user and clipboard content sent by the context awareness module, and determines whether a translation condition is met, to determine whether to display a floating ball. The service logic processing module may further determine, based on a floating ball tap event triggered by the user and translation result content obtained from a third-party server, whether to display a floating window and display a translation result in the floating window. In addition, the service logic processing module may be further configured to determine, based on a floating ball or floating window disappear event triggered by the user, whether to display or disappear the floating ball or the floating window on the electronic device.

In addition, the service logic processing module may further recognize a copy text or a text extracted by using an OCR technology. For example, it may be recognized that the text is at least one of a schedule, a to-be-shared link, a Taobao password, a web address, and the like. In another example, a language of a text may also be recognized.

The service presentation module (for example, YOYO suggestion) is configured to display or disappear a floating ball or a floating window on or from a screen of the phone. For example, the service presentation module receives a floating ball or floating window display command sent by the service logic processing module, and notifies a window manager to display the floating ball or the floating window on the electronic device. At the same time, the service presentation module may further present, in the floating window, a text copied by the user and a translation result corresponding to the text. In addition, the service presentation module may further determine, based on a floating ball or floating window disappear event triggered by the user, the window manager to display or disappear the floating ball or the floating window on the electronic device.

As shown in FIG. 2, the application framework layer may include a window manager, a content provider, a view system, a resource manager, a notification manager, an activity manager, a clipboard manager, and the like, which is not limited in this embodiment of this application.

The window manager is configured to manage a window program. The window manager may obtain a size of a display screen, determine whether there is a status bar, lock a screen, take a screenshot, and the like.

The clipboard manager is configured to manage the clipboard. The clipboard is a temporary storage region for temporarily storing exchanged information.

The activity manager is configured to manage a lifecycle of each application and a navigation fallback function, and is responsible for main thread creation of Android and maintenance of the lifecycle of each application.

The resource manager provides the application with various resources such as a localized character string, an icon, an image, a layout file, and a video file.

The notification manager enables the application to display notification information in the status bar that may be configured to convey a message of a notification type, where the message may disappear automatically after a short stay without user interaction. For example, the notification manager is configured to notify a download completion, a message reminder, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on the status bar, a prompt tone is made, the electronic device vibrates, or an indicator flickers.

The application layer and the application framework layer are run in the virtual machine. The virtual machine executes Java files of the application layer and the application framework layer as binary files. The virtual machine is used to execute functions such as object lifecycle management, stack management, thread management, security and exception management, and garbage collection.

As shown in FIG. 2, the system library may include a plurality of functional modules, for example, a surface manager (surface manager), a media library (Media Libraries), a three-dimensional graphics processing library (for example, OpenGL ES), a 2D graphics engine (for example, SGL), and the like.

The surface manager is configured to manage a display subsystem, and provide fusion of 2D and 3D layers for a plurality of applications.

As shown in FIG. 2, the kernel layer is a layer between hardware and software. The kernel layer includes at least a display drive, a camera drive, an audio drive, and a sensor drive.

Figure 3:
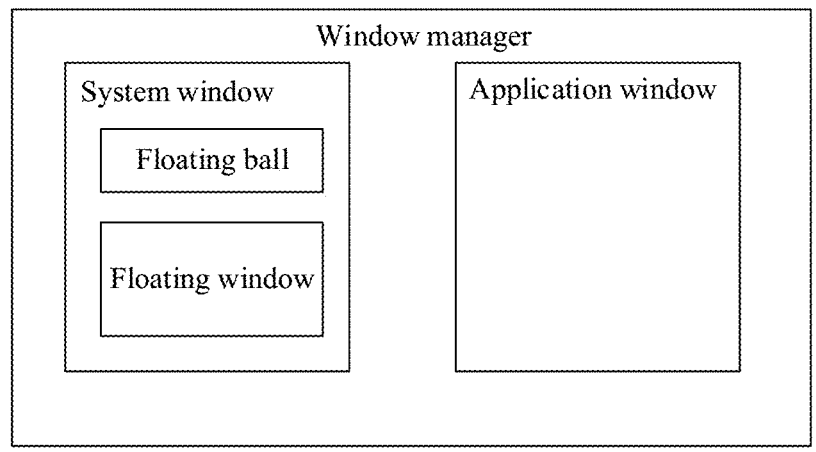
FIG. 3 is a schematic structural diagram of a window manager according to an embodiment of this application.

For example, FIG. 3 is a schematic structural diagram of a window manager according to an embodiment of this application.

As shown in FIG. 3, the window manager may include: an application window, a child window (not shown), and a system window.

The application window corresponds to an application window of an application, for example, an application window of a read application that is used to display content in the read application, an application window of a translation application that is used to display content in the translation application, or an application window of a memo application that is used to display content in the memo application. An interface of each application includes an activity, the activity includes a view, the view is an existence form of a window, and the window is a carrier of the view. When the activity is started, an application process is notified. Any activity belongs to the application process. That is, for example, the read application corresponds to one activity, and the memo application corresponds to another activity because the memo application and the read application are different applications. A default window type of all activities is a base window (TYPE_BASE_APPLICATION). That is, all other types of application windows appear at an upper layer of the base window.

The child window is attached to a parent window, that is, cannot exist independently, and needs to rely on an application, for example, an application input method window or an application prompt box window. When the parent window is invisible, the child window is also invisible.

The system window is different from the application window, and does not need to correspond to the activity. Different from the child window, the parent window is not required. The system window does not belong to any application, is created by the system, belongs to only the system, and can be created only with permission, for example, a power-off dialog box window, a status bar window, a search bar window, an input method window, a warning dialog box, a system volume bar, or the like.

It should be noted that a layer of the system window is generally higher than that of the application window and the child window.

Still referring to FIG. 3, in this embodiment of this application, a floating ball and a floating window are set in the system window. It can be learned from the foregoing analysis that the floating ball and the floating window are system windows and cannot be set in the application window.

The essence of the floating window and the floating ball is to deliver a view to the window manager for management. Due to Android's underlying system limitations, a z-axis range of the application window is 1 to 99, a range of the child window is 1001 to 1999, and a range of the system window is 2000 to 2999. Therefore, the floating window and the floating ball can only be implemented in the range of the system window. If a customized system-level window needs to be popped up, permission needs to be applied for dynamically. A Z-axis is a concept of a layer of an Android window. A window with a larger Z-axis is closer to a top layer.

Further, since an interface of each application includes an activity and any activity belongs to the application process, the floating ball and the floating window that are set in the system window do not have an activity function. To enable the floating ball and the floating window to achieve an effect similar to that of the activity in the application window, that is, display content, based on an operation performed by the user on the floating ball and the floating window, a slide operation, a slide conflict, and the like need to be additionally set in the system window, and a focus of a response window is determined based on an operation such as a tap of the user. Specifically, the following content is extended to be clearer.

The following describes the technical solutions of this application and how to resolve the foregoing technical problems according to the technical solutions of this application in detail by using specific embodiments. The following several specific embodiments may be independently implemented, and may also be combined with each other, and the same or similar concepts or processes may not be described repeatedly in some embodiments.

In embodiments of this application, an example in which the electronic device is a foldable screen phone is used for description, and this example does not impose a limitation on embodiments of this application. For example, FIG. 4 is a schematic structural diagram of a foldable screen phone according to an embodiment of this application.

Figure 4:
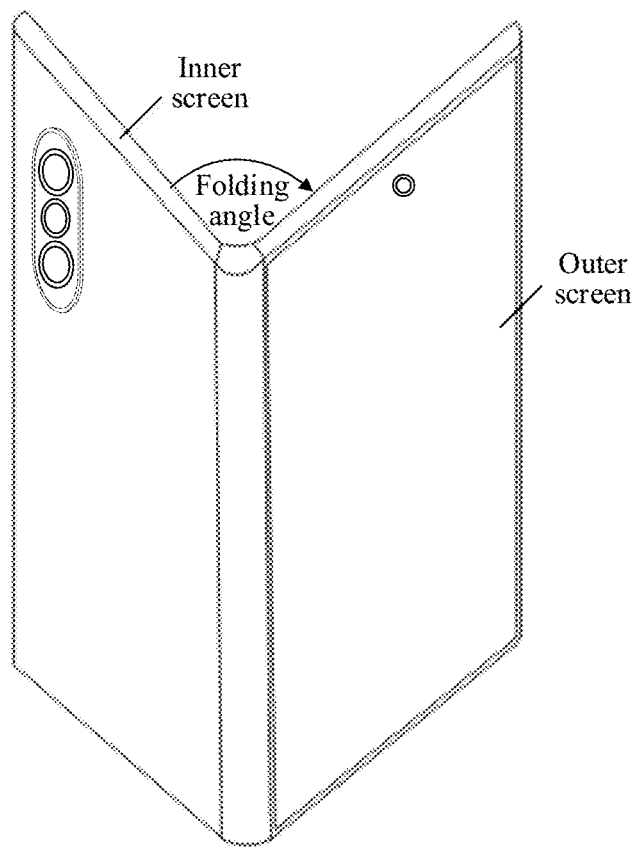
FIG. 4 is a schematic structural diagram of a foldable screen phone according to an embodiment of this application.

As shown in FIG. 4, the foldable screen phone includes an inner screen and an outer screen. When the foldable screen phone is in a folded state (or understood as that a folding angle ranges from 0° to 70° or the like), the foldable screen phone may use the outer screen to display an interface including a floating window, or when the foldable screen phone is in an unfolded state (or understood as that the folding angle ranges from 70° to 180° or the like), the foldable screen phone may use the inner screen to display the interface including the floating window. The folding angle of the foldable screen phone in the folded state or the unfolded state is only an example and cannot be used as a limitation on this embodiment of the application.

It may be understood that, in this embodiment of this application, the window interaction method will be illustrated by taking display of the inner screen of the foldable screen phone as an example, and this example does not impose a limitation on this embodiment of this application.

It may be understood that, in this embodiment of this application, specific implementation of the window interaction method will be illustrated respectively with examples in which the floating window is displayed in a parallel horizon (or referred to as Scenario 1, as shown in embodiments corresponding to FIG. 5 to FIG. 9) and the floating window is displayed in an application split screen (or referred to as Scenario 2, as shown in embodiments corresponding to FIG. 10 to FIG. 12).

Scenario 1: The Foldable Screen Phone Displays the Floating Window in the Parallel Horizon.

In Scenario 1, the foldable screen phone may support the display of the floating window in two parallel horizon functions: In Method 1, the foldable screen phone supports triggering a floating window in an interface corresponding to a parallel horizon of an application. In Method 2, the foldable screen phone supports opening the parallel horizon of the application after the triggering of the floating window.

Method 1: The Foldable Screen Phone Supports Triggering the Floating Window in the Interface Corresponding to the Parallel Horizon of the Application.

In this embodiment of this application, the foldable screen phone may display the application by using the parallel horizon function, and based on the user's operation, the foldable screen phone may display the floating window in the interface corresponding to the parallel horizon.

It may be understood that an option switch such as "parallel horizon" may be set in a setting interface of the foldable screen phone. When the user opens an application according to a requirement, such as a "parallel horizon" option corresponding to a news application, the user may view two pages at the same time in the news application.

An option switch such as "copy trigger translation" may be set in the setting interface of the foldable screen phone. If the user chooses to enable a function of the "copy trigger translation", the electronic device may trigger a translation function and display a floating ball corresponding to the translation function when the user copies a text in a language other than a system default language. Further, a translation result may be displayed when the user triggers the floating ball.

For example, FIG. 5 is a schematic diagram of an interface for displaying a floating window under a parallel horizon according to an embodiment of this application. In the embodiment corresponding to FIG. 5, descriptions are based on an example in which the floating window is opened in a news application.

Figure 5A:
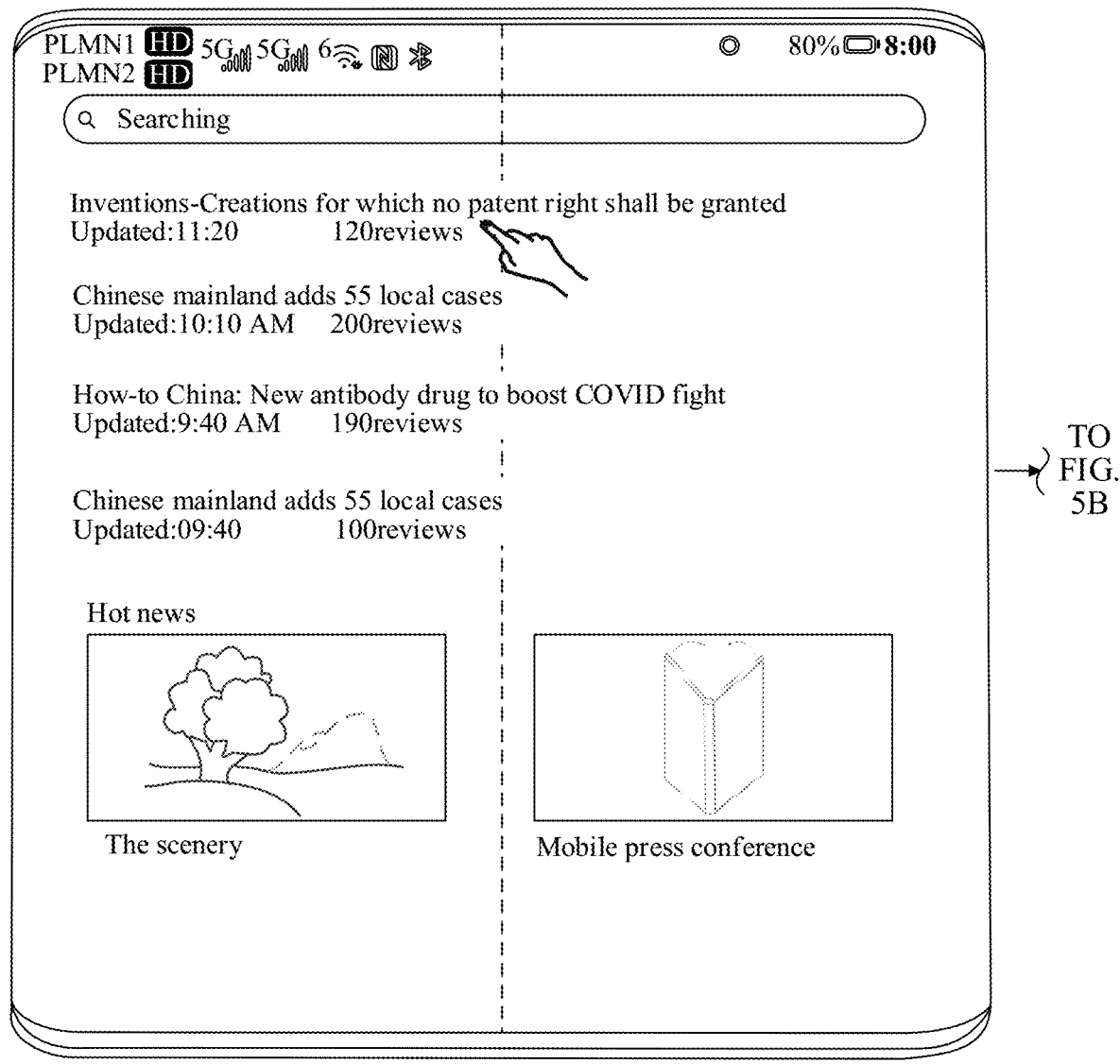
FIGS. 5A-5F are a schematic diagram of an interface for displaying a floating window according to an embodiment of this application.

If a "parallel horizon" function corresponding to a news application is enabled, the foldable screen phone may display an interface shown in FIG. 5A when the foldable screen phone receives, from the user, an operation of opening the news application. A home page of the news application may be displayed in full screen in the interface.

Figure 5B:
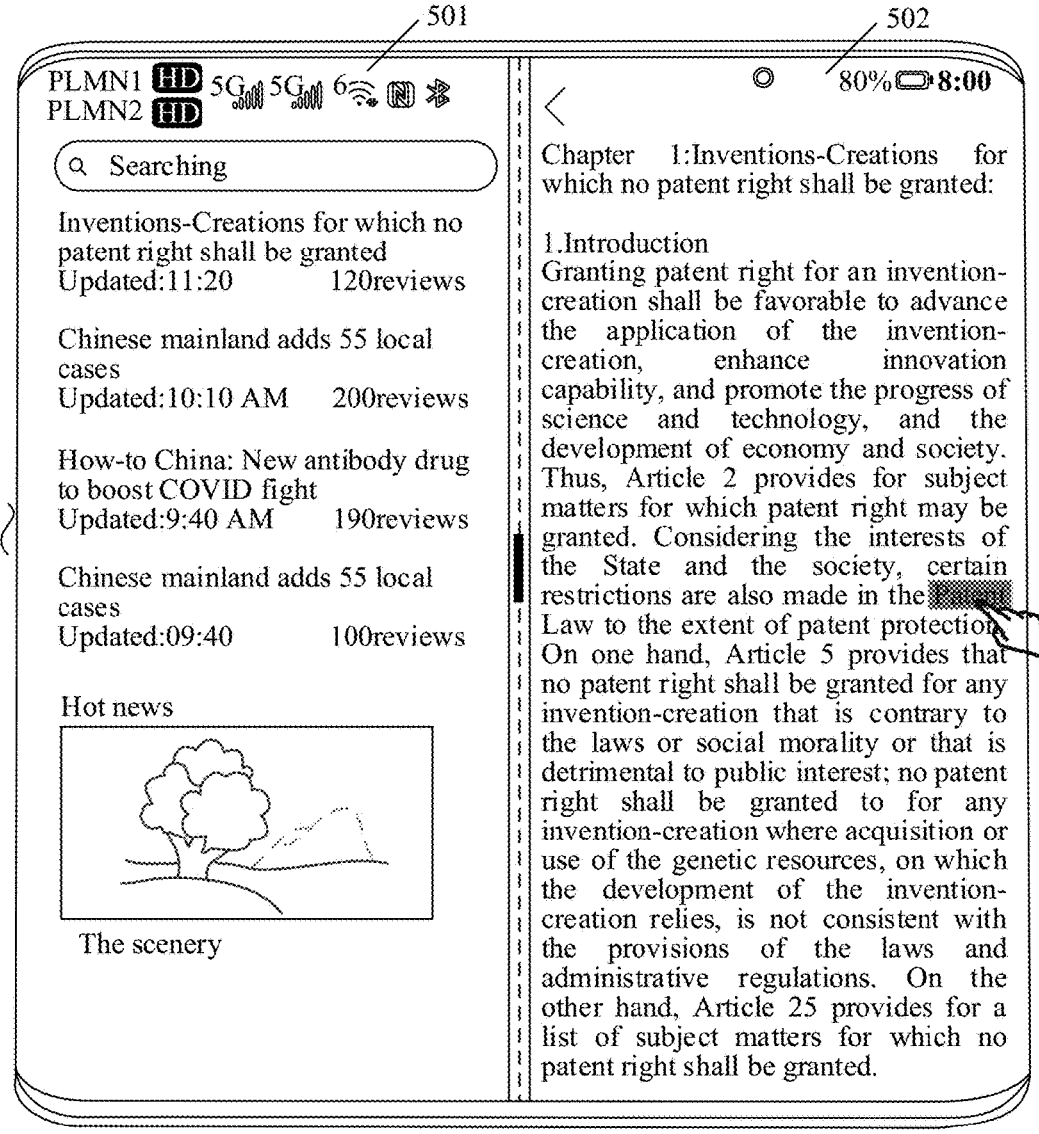

In the interface shown in FIG. 5A, the foldable screen phone may display an interface shown in FIG. 5B when the foldable screen phone receives, from the user, an operation of triggering any news. In the interface shown in FIG. 5B, a home page 501 of the news application and a content page 502 of the news application may be displayed on left and right split screens. It may be understood that the interface shown in FIG. 5B may be referred to as the interface corresponding to the parallel horizon of the application.

Figure 5C:
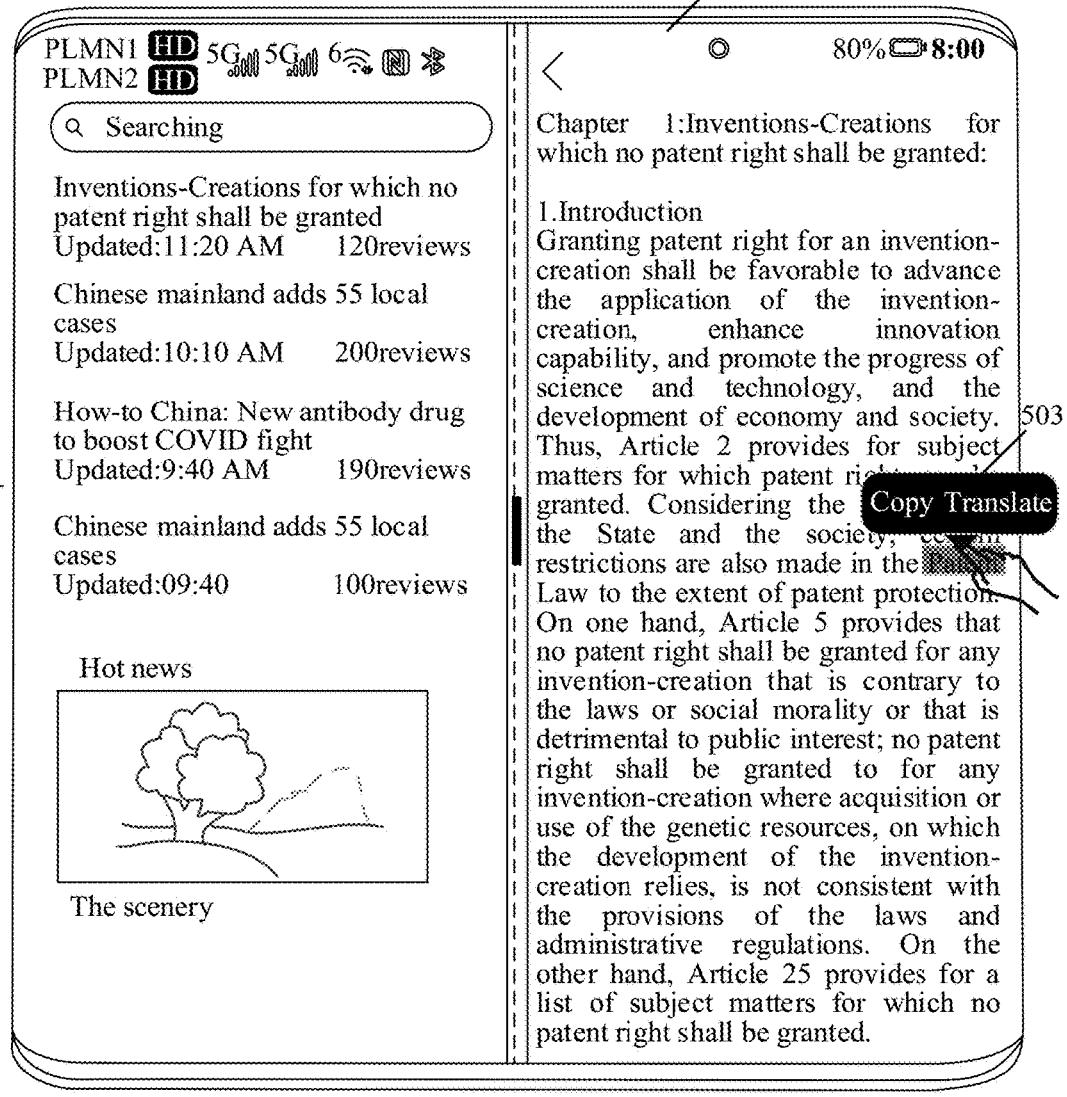

In a scenario where the interface corresponding to the parallel horizon is displayed as shown in FIG. 5B, the foldable screen phone may display an interface shown in FIG. 5C when the foldable screen phone receives, from the user, an operation of selecting a word "patent" on the content page 502. The interface shown in FIG. 5C may include an option bar 503, and the option bar 503 may include operation options such as copy and translate.

Figure 5D:
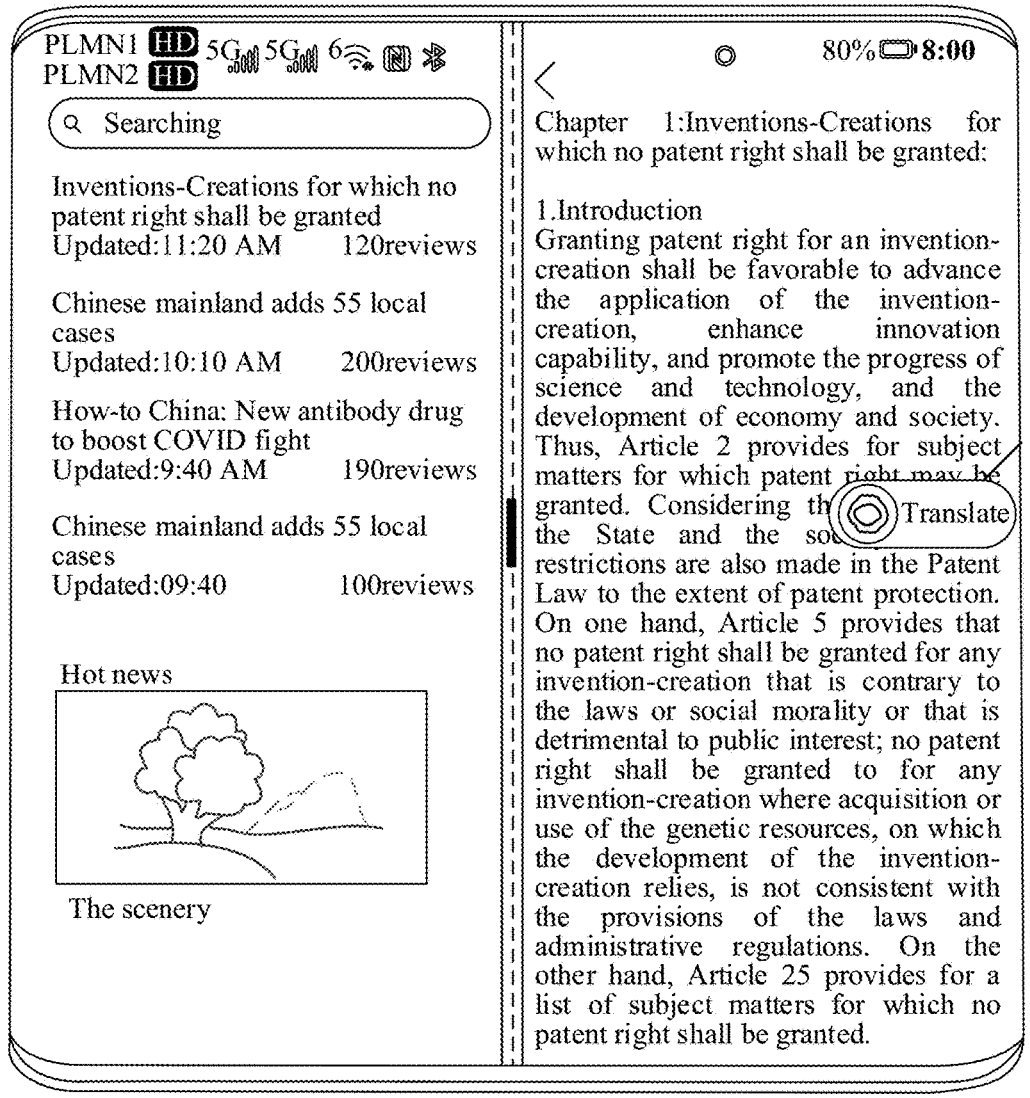

In the interface shown in FIG. 5C, the foldable screen phone may recognize an intention of the user and display an interface shown in FIG. 5D when the foldable screen phone receives, from the user, an operation of triggering the "copy" option in the option bar 503 corresponding to the word "patent". In the interface shown in FIG. 5D, the interface may include a floating ball sign 504. The floating ball sign 504 may be used to indicate that the foldable screen phone is recognizing the intention of the user, and the intention of the user recognized by the foldable screen phone may be "translate". It may be understood that, during the recognition of the foldable screen phone, the intention of the user can be recognized without an operation of the user, for example, without tapping any content on a page as shown in FIG. 5D by the user.

Figure 5E:

The foldable screen phone may display an interface shown in FIG. 5E when recognizing that the intention of the user is to translate the word "patent". The interface may include: a floating ball 505. The floating ball 505 is used to provide the user with an entry for displaying a translation result.

Figure 5F:
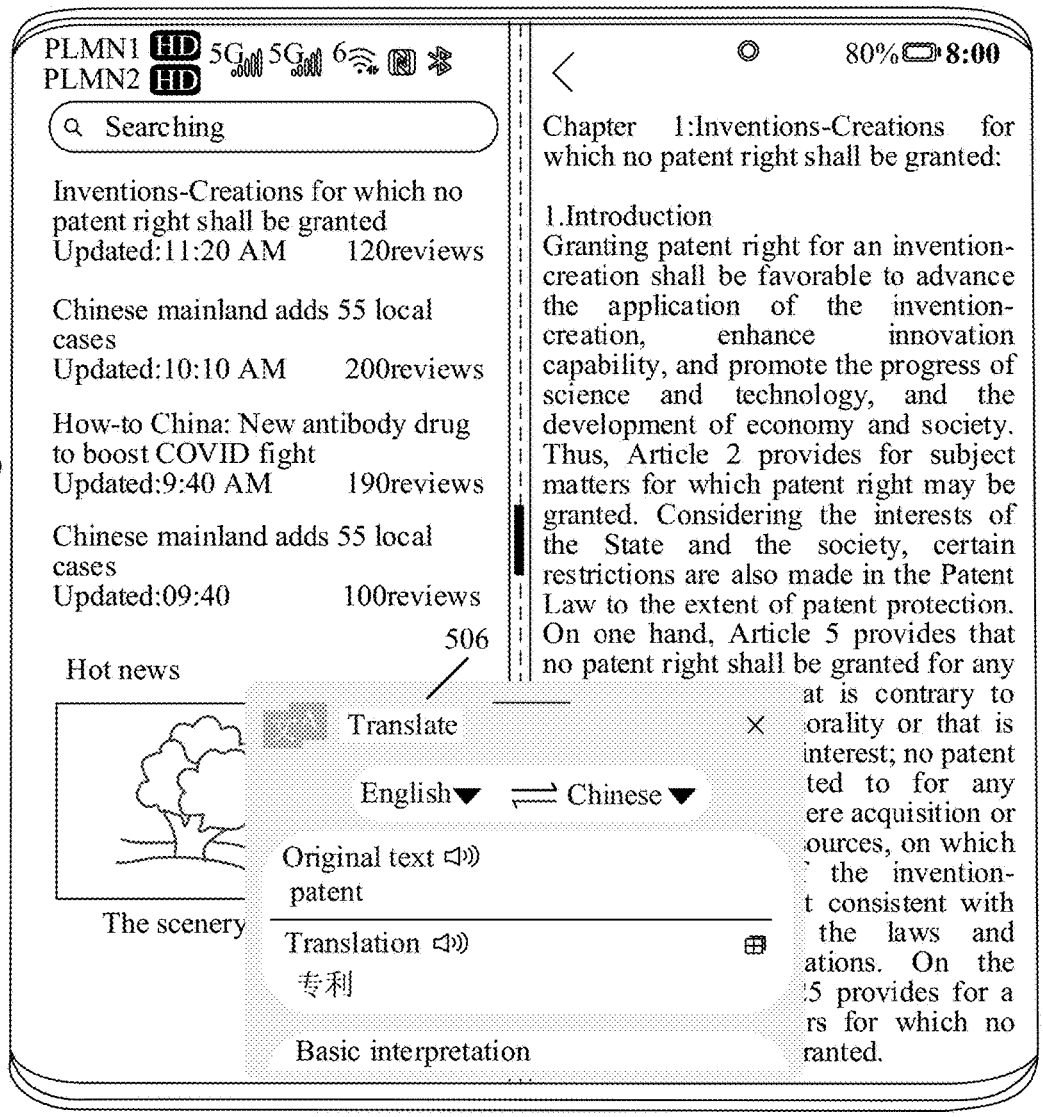

In the interface shown in FIG. 5E, the foldable screen phone may display an interface shown in FIG. 5F when the foldable screen phone receives, from the user, an operation of triggering the floating ball 505. In the interface shown in FIG. 5F, the interface may include a floating window 506, and a translation result of "patent" is displayed in the floating window 506. The translation result displayed in the floating window 506 includes a to-be-queried English word "patent" copied by the user, and a translation result of a Chinese meaning of the word, that is, "专利". The content displayed in the floating window 506 further includes: a control for voice reading, a control for copying a translation result, a control for switching a translation language, and the like.

It may be understood that the floating window 506 may be centrally displayed at the bottom of the inner screen of the foldable screen phone, and the floating window 506 has certain distances from a left side and a right side of the inner screen. The floating window 506 is an initial state of the floating window. That is, a default form displayed after the user taps the floating ball 505 is a half-screen state. For example, due to the display of the floating window 506, the floating ball 505 may not be displayed, to achieve better user experience.

In a possible implementation, the foldable screen phone may open the floating window 506 based on the interfaces shown in FIG. 5A to FIG. 5F, and in addition, the foldable screen phone may also open the floating window based on the following operations.

In the interface shown in FIG. 5C, the foldable screen phone displays the interface shown in FIG. 5F when the foldable screen phone receives, from the user, an operation of triggering the "translate" option in the option bar 503 corresponding to the word "patent". For example, the foldable screen phone may call out the floating window 506.

It may be understood that the floating window may be centrally displayed at the bottom of the screen when the user opens the floating window in a parallel horizon interface of the application.

Method 2: The Foldable Screen Phone Supports Opening the Parallel Horizon of the Application after the Triggering of the Floating Window.

In this embodiment of this application, based on the embodiment corresponding to FIG. 6, the user may open the content page of the application without opening the parallel horizon of the application, and trigger the floating window in the content page, and further, the user may open the parallel horizon of the application from the settings and open the home page and the content page of the application, so that the foldable screen phone can display the home page and the content page on left and right split screens. Moreover, the content page may include the floating ball of the floating window previously triggered, and the foldable screen phone may display the floating window based on the trigger of the floating ball by the user.

For example, FIG. 6 is a schematic diagram of another interface for displaying a floating window under a parallel horizon according to an embodiment of this application. In the embodiment corresponding to FIG. 6, descriptions are based on an example in which the floating window is opened in a news application.

Figure 6A:
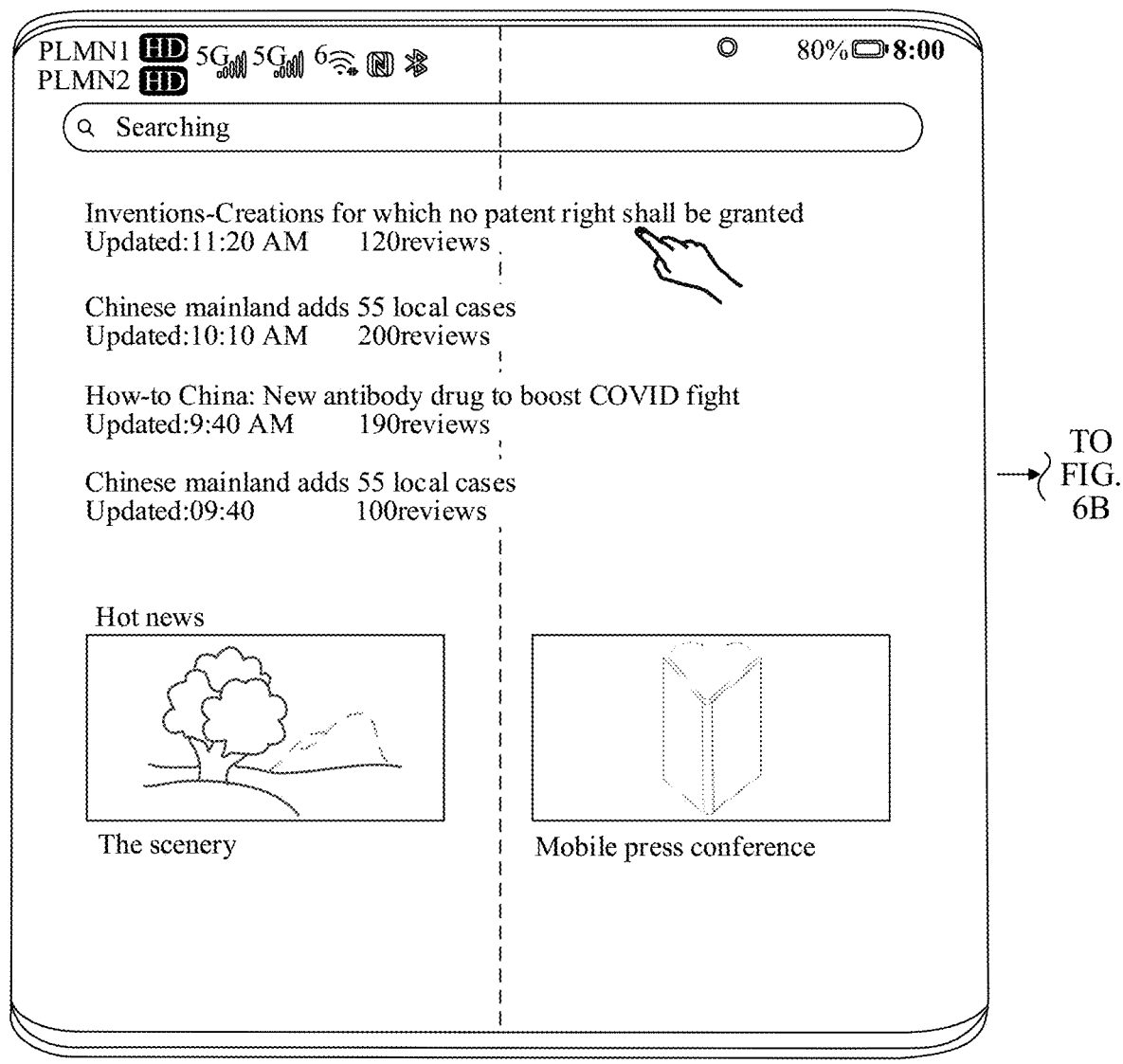
FIGS. 6A-6E are a schematic diagram of another interface for displaying a floating window under a parallel horizon according to an embodiment of this application.

If the "parallel horizon" function corresponding to the news application is not enabled, the foldable screen phone may display an interface shown in FIG. 6A when the foldable screen phone receives, from the user, an operation of opening the news application. A home page of the news application may be displayed in full screen in the interface.

Figure 6B:
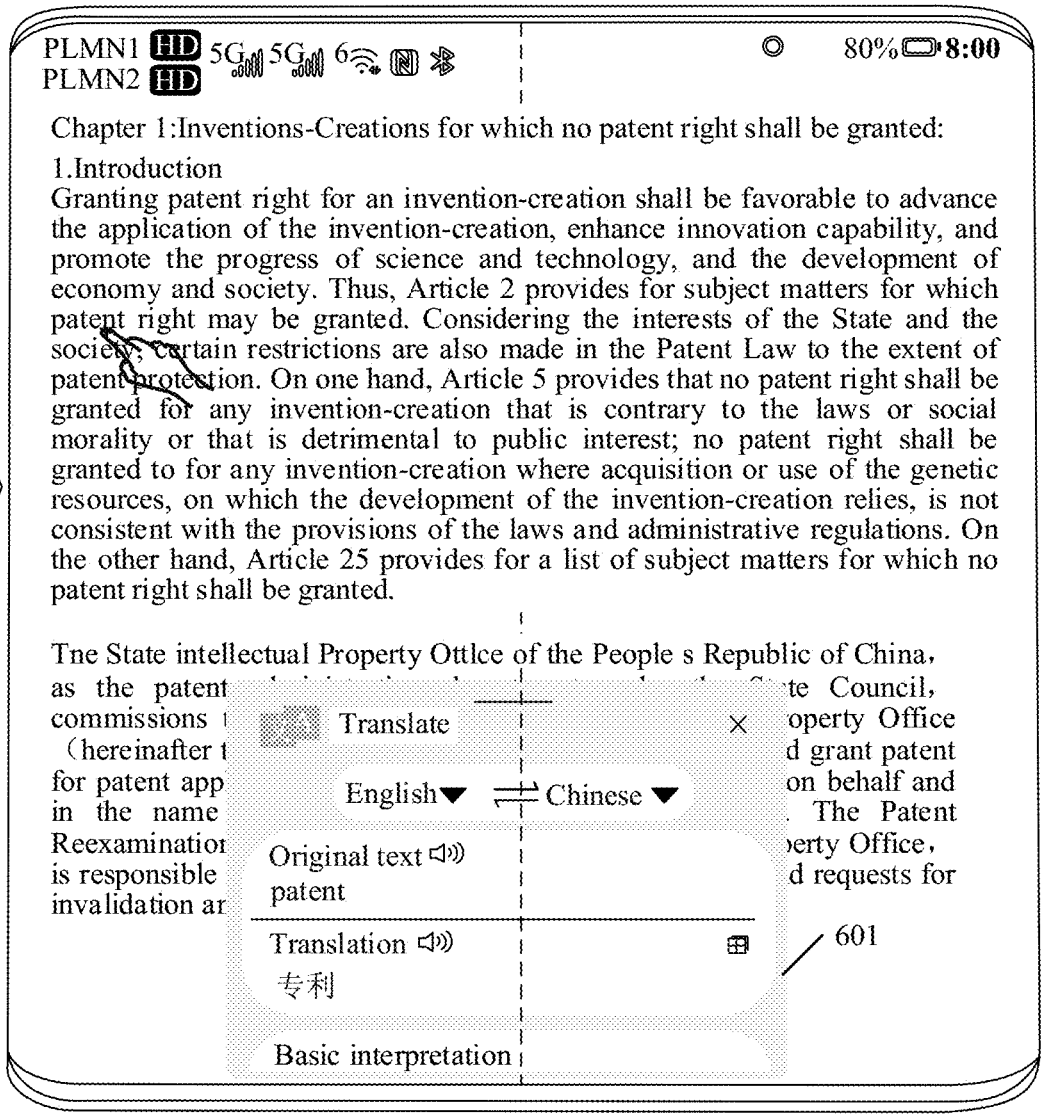

In the interface shown in FIG. 6A, the foldable screen phone may display an interface shown in FIG. 6B when the foldable screen phone receives, from the user, an operation of triggering any news. A content page of the news application may be displayed in full screen in the interface.

Further, in the interface shown in FIG. 6B, the interface may further include a floating window 601 when the foldable screen phone receives, from the user, an operation of triggering a floating window corresponding to the word "patent". It may be understood that the floating window 601 may be centrally displayed at the bottom of the inner screen of the foldable screen phone, and the floating window 601 has certain distances from a left side and a right side of the inner screen. A method for triggering the display of the floating window in the interface shown in FIG. 6B may be obtained with reference to the descriptions of the interfaces shown in FIG. 5C to FIG. 5F. Details are not described herein again.

Figure 6C:
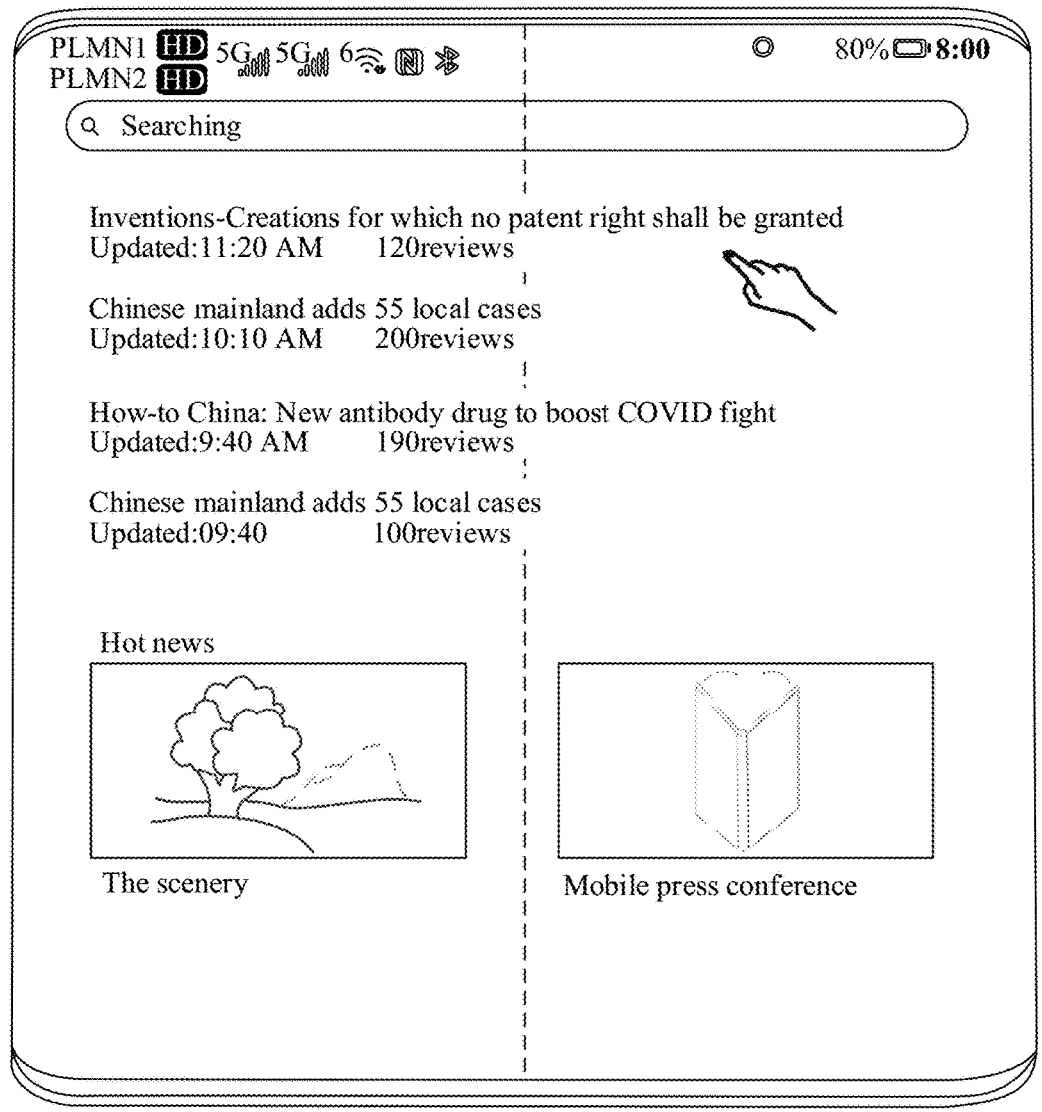

If the foldable screen phone displays the floating window 601 shown in FIG. 6B, the foldable screen phone may display an interface shown in FIG. 6C when the foldable screen phone receives, from the user, an operation of opening a settings application from the background and enabling a parallel horizon function corresponding to the news application in the settings application and receives, from the user, an operation of reopening the news application. A home page of the news application may be displayed in full screen in the interface shown in FIG. 6C.

Figure 6D:
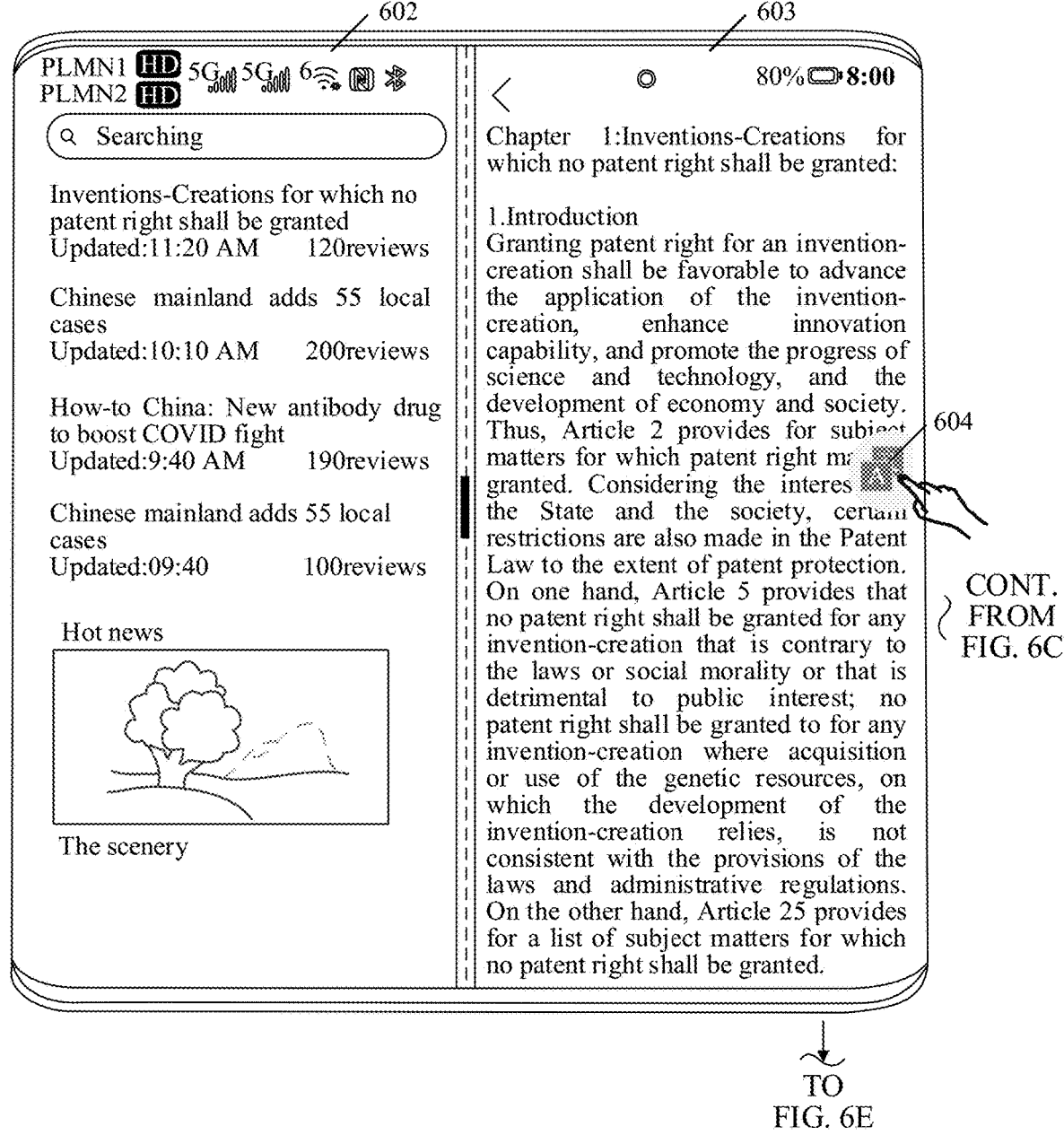

In the interface shown in FIG. 6C, the foldable screen phone may display an interface shown in FIG. 6D when the foldable screen phone receives, from the user, an operation of triggering any news. In the interface shown in FIG. 6D, a home page 602 of the news application and a content page 603 of the news application may be displayed on left and right split screens. The content page 603 may include a floating ball 604. The floating ball 604 may be another display form of the floating window displayed on the content page of the news application before the parallel horizon of the news application is opened. For example, the floating ball 604 may be another display form of the floating window 601 shown in FIG. 6B.

Figure 6E:
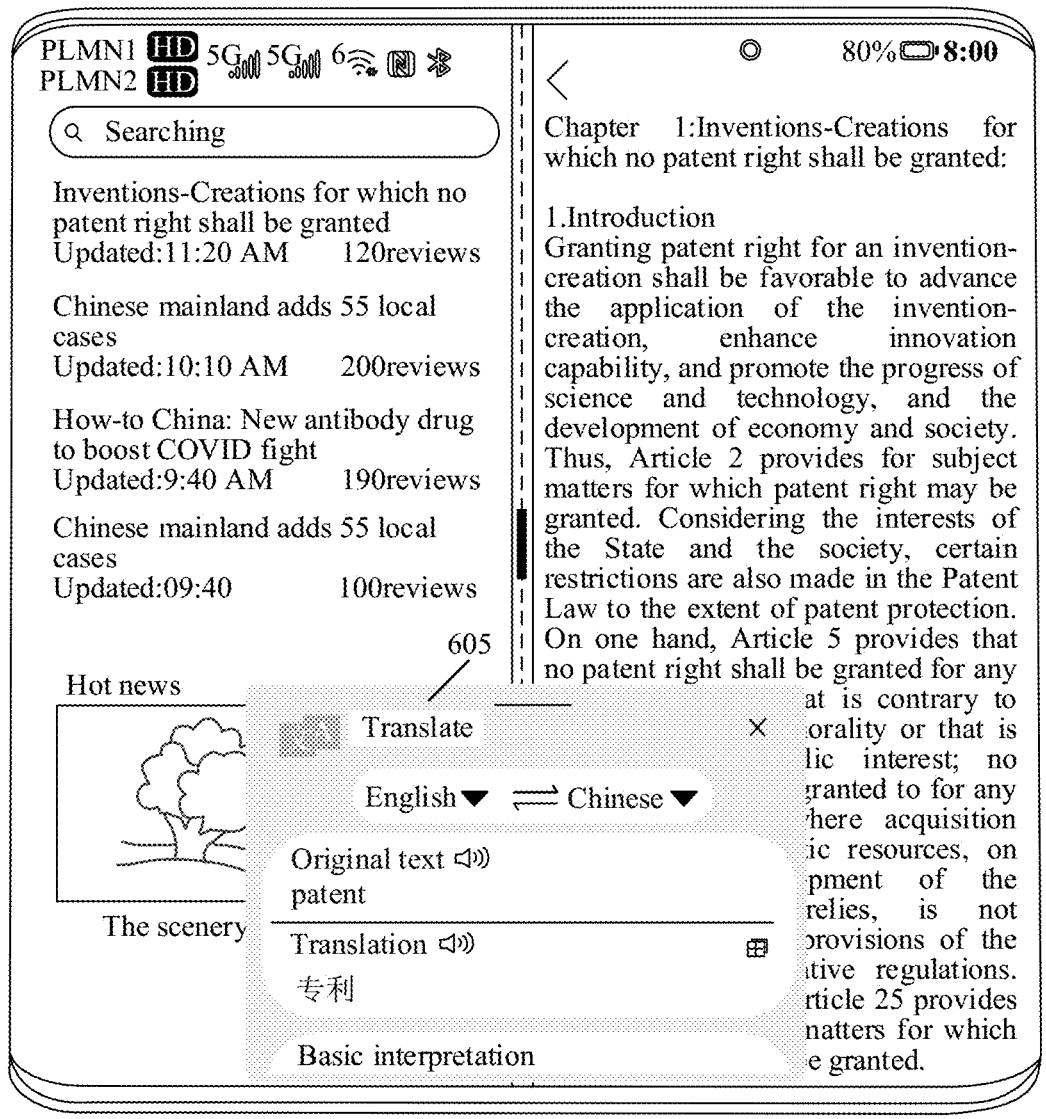

In the interface shown in FIG. 6D, the foldable screen phone may display an interface shown in FIG. 6E when the foldable screen phone receives, from the user, an operation of triggering the floating ball 604. The interface shown in FIG. 6E includes a floating window 605.

It may be understood that the floating window 605 may be centrally displayed at the bottom of the inner screen of the foldable screen phone, and the floating window 605 has certain distances from a left side and a right side of the inner screen.

In a possible implementation, in the embodiment corresponding to FIG. 5 or FIG. 6, the foldable screen phone may present three floating window states according to the user's operation on the floating window. For example, FIG. 7 is a schematic diagram of an interface for displaying a floating window in a portrait state according to an embodiment of this application.

Figure 7A:
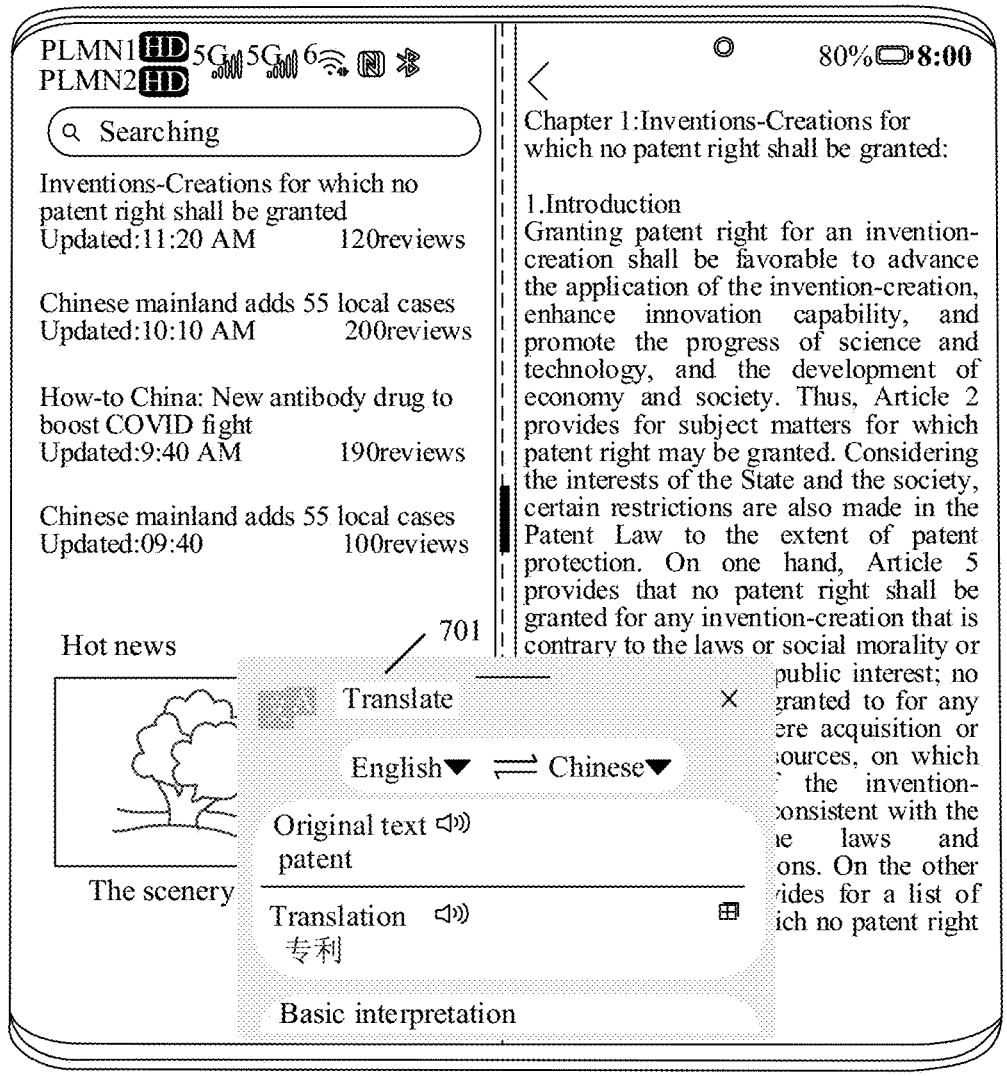
FIGS. 7A-7C are a schematic diagram of an interface for displaying a floating window in a portrait state according to an embodiment of this application.

In an interface shown in FIG. 7A, the interface may include a floating window 701 in a half-screen state displayed in an application using a parallel horizon when the foldable screen phone is in the portrait state. The floating window in the half-screen state occupies about half a size of the screen of the current application, and displays a part of translation result content. The floating window in the half-screen state may alternatively be used as a default floating window form, that is, a first floating window displayed after the user copies a text.

Figure 7B:

For example, in the interface shown in FIG. 7A, the foldable screen phone may display an interface shown in FIG. 7B when the foldable screen phone receives, from the user, an operation of tapping the floating window 701 to slide down.

In the interface shown in FIG. 7B, the interface may include a floating window 702 in a bottom state displayed in the application using the parallel horizon when the foldable screen phone is in the portrait state. The floating window in the bottom state is centrally displayed at the bottom of the screen of the current application and does not display any translation result content, which helps the user continue to access content in the current application, to improve user experience.

Figure 7C:
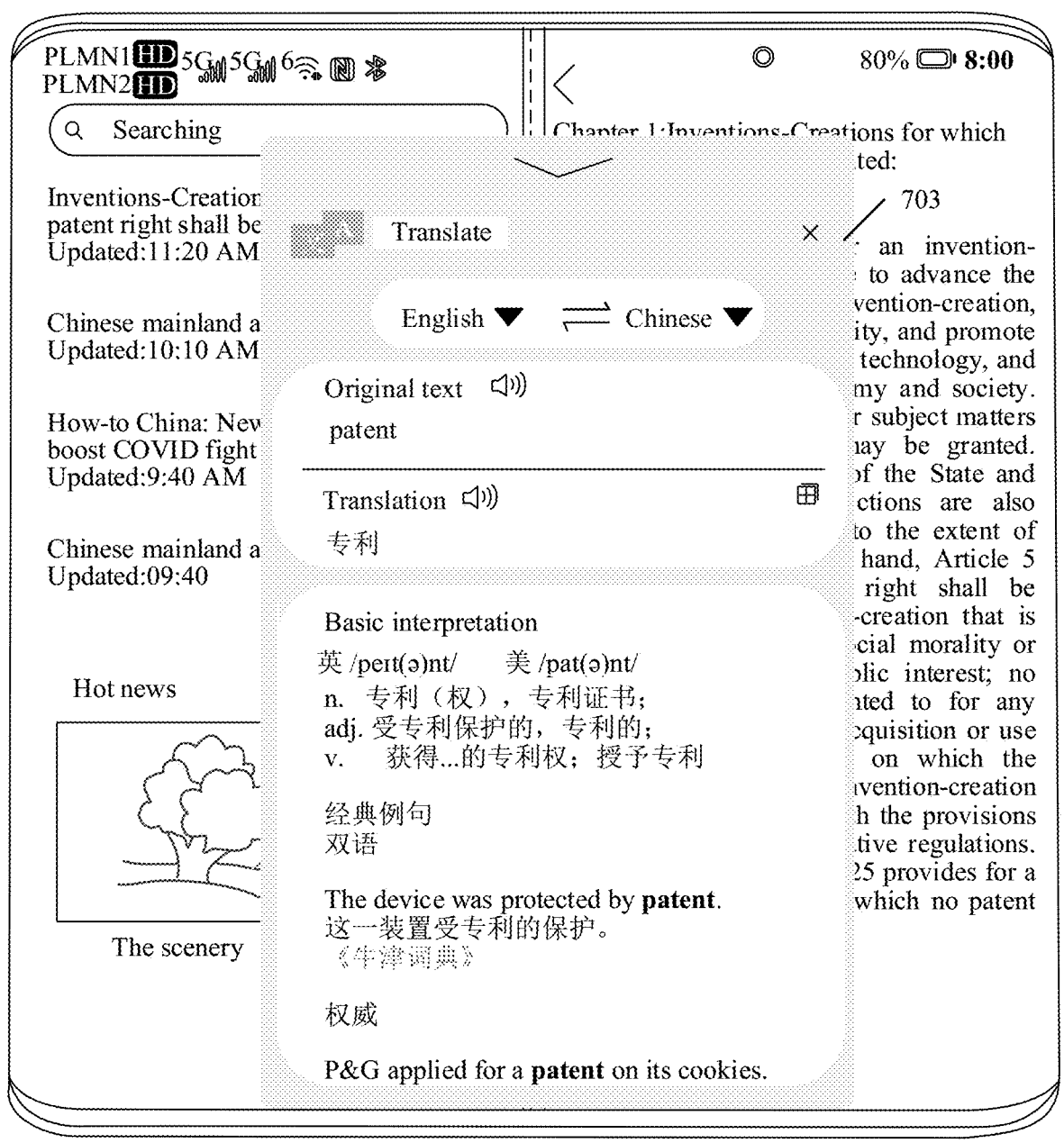

For example, in the interface shown in FIG. 7B, the foldable screen phone may display an interface shown in FIG. 7C when the foldable screen phone receives, from the user, an operation of tapping the floating window 702 to slide upwards to an upper edge of the screen.

In the interface shown in FIG. 7C, the interface may include a floating window 703 in a full-screen state displayed in the application using the parallel horizon when the foldable screen phone is in the portrait state. For example, the floating window in the full-screen state may occupy the entire screen of the current application, is expanded based on a drag operation of the user, and is used to display more translation result content than the floating window in the half-screen state, to improve user experience.

It may be understood that the foldable screen phone may also be switched in the interface shown in FIG. 7A, the interface shown in FIG. 7B, and the interface shown in FIG. 7C based on other user operations, which is not specifically limited in embodiments of this application.

It may be understood that the floating windows displayed in the interface shown in FIG. 7A, the interface shown in FIG. 7B, and the interface shown in FIG. 7C may all be centrally displayed at the bottom of the screen.

Based on the embodiment corresponding to FIG. 7, the floating window may display different forms according to different operations of the user. In this way, different requirements of the user for the floating window displayed in the application using the parallel horizon are met, and the user's experience of using a floating window function is improved.

In a possible implementation, the floating window displayed in the application using the parallel horizon may be flexibly adjusted according to a flipping requirement of the user, thereby improving the user's experience of using the floating window function in the foldable screen phone. Specifically, the foldable screen phone is in the portrait state, and when the user flips the screen in a case that the floating window displayed in the application using the parallel horizon in the foldable screen phone is in the half-screen state, the floating window in the foldable screen phone may be in the half-screen state (as shown in the embodiment corresponding to FIG. 8).

Figure 8A:
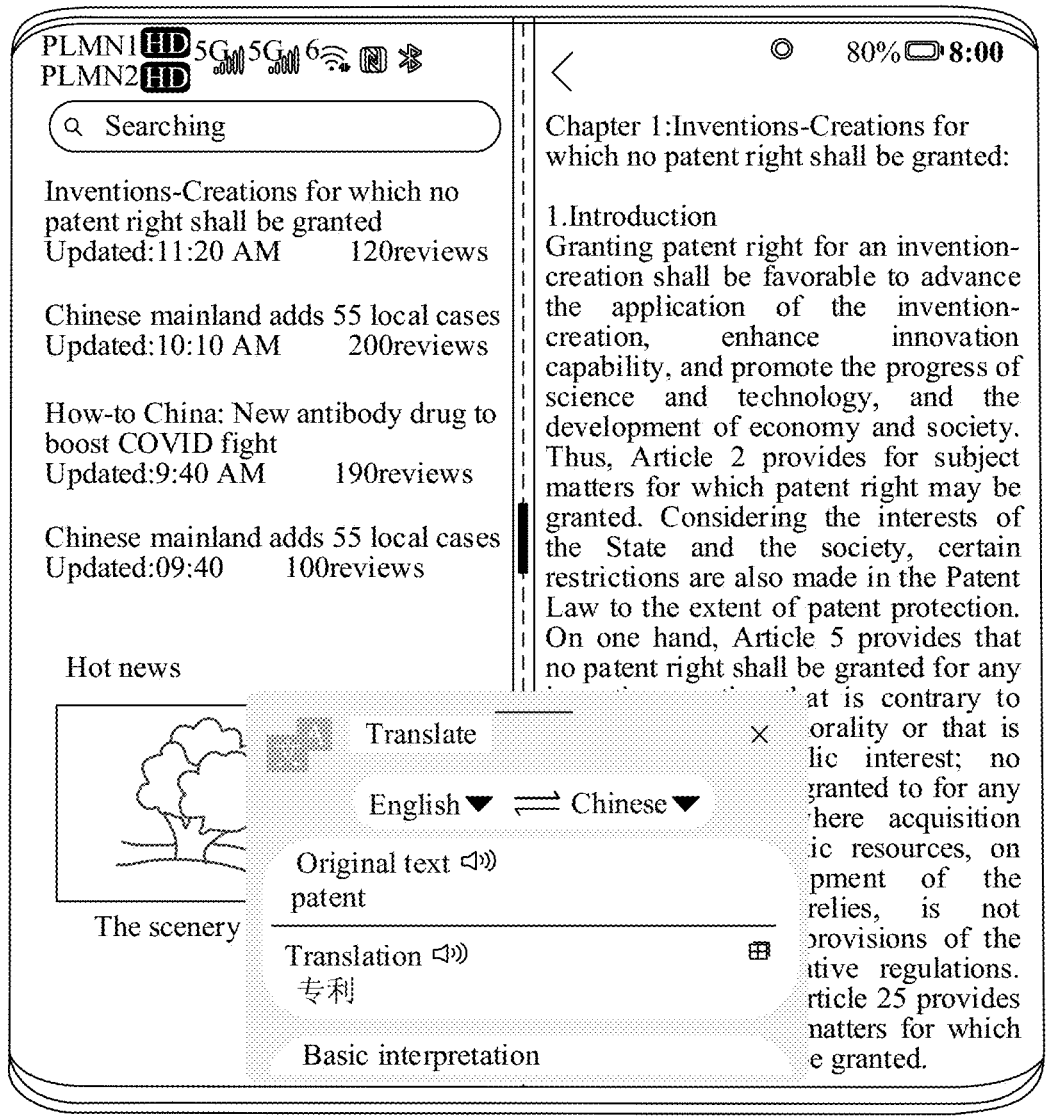
FIGS. 8A-8B are a schematic diagram of an interface for flipping a screen of a foldable screen phone according to an embodiment of this application.
Figure 8B:
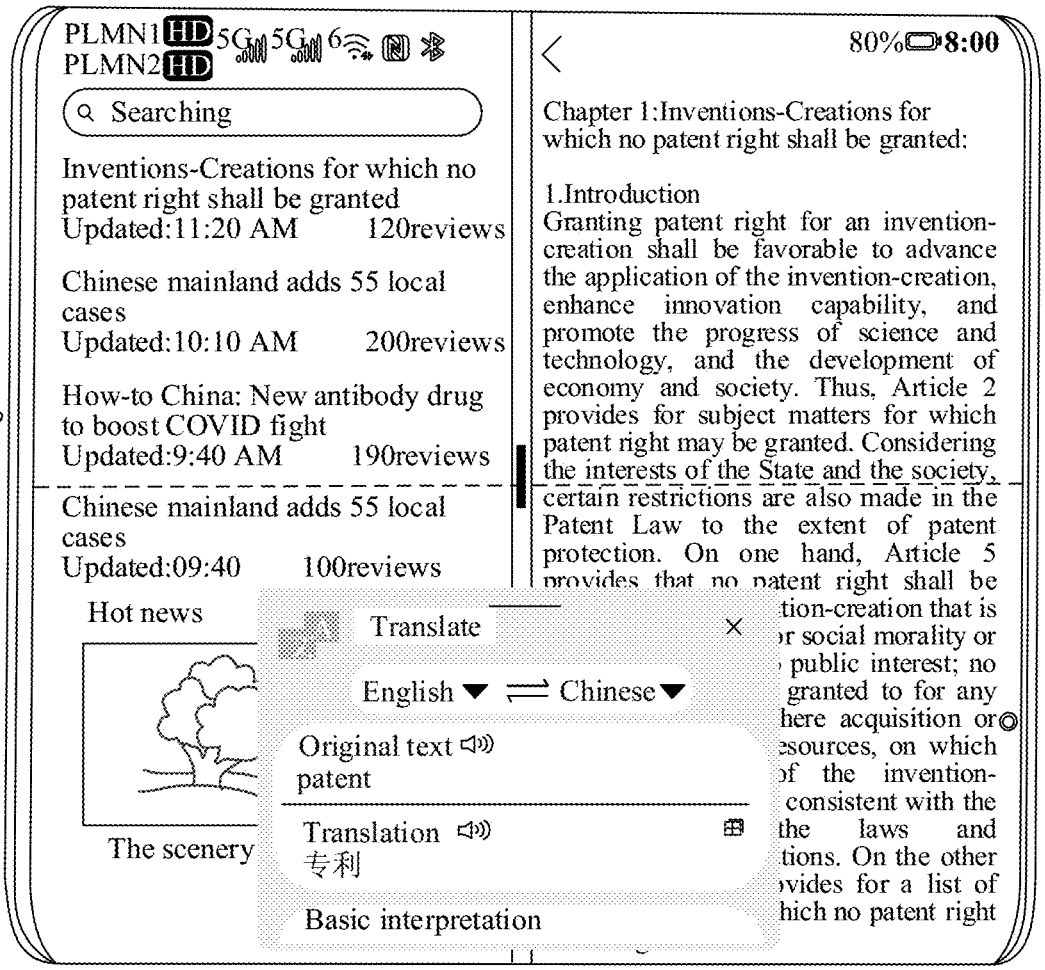

For example, FIG. 8 is a schematic diagram of an interface for flipping a screen of a foldable screen phone according to an embodiment of this application. As shown in FIG. 8A, in a case that the floating window displayed in the application using the parallel horizon in the foldable screen phone is in the half-screen state, the foldable screen phone may display an interface shown in FIG. 8B when the foldable screen phone receives, from the user, an operation of flipping the screen, for example, an operation of flipping the foldable screen phone in a portrait state to the foldable screen phone in a landscape state. In the interface shown in FIG. 8B, the floating window displayed in the foldable screen phone may be in the half-screen state.

It may be understood that, since the floating window of the foldable screen phone in the portrait state has three states, that is, a half-screen state, a bottom state, and a full-screen state, and a difference between a width and a height of the inner screen of the foldable screen phone is small, the floating window of the foldable screen phone in the landscape state may also have three states, that is, a half-screen state, a bottom state, and a full-screen state, so that the foldable screen phone can flexibly adjust, according to a flipping requirement of the user, the floating window displayed in the application using the parallel horizon.

Specifically, in a case that the floating window displayed in the application using the parallel horizon in the foldable screen phone is in the bottom state, the floating window in the foldable screen phone may be in the bottom state when the foldable screen phone receives, from the user, an operation of flipping the screen, for example, an operation of flipping the foldable screen phone in the portrait state to the foldable screen phone in the landscape state. Alternatively, in a case that the floating window displayed in the application using the parallel horizon in the foldable screen phone is in the full-screen state, the floating window in the foldable screen phone may be in the full-screen state when the foldable screen phone receives, from the user, an operation of flipping the screen, for example, an operation of flipping the foldable screen phone in the portrait state to the foldable screen phone in the landscape state.

In a possible implementation, the floating window displayed in the application using the parallel horizon in the foldable screen phone may satisfy non-modality (or called a non-modal dialog box). For example, FIG. 9 is a schematic diagram of a non-modal interface according to an embodiment of this application. The "non-modal" may be understood as that when the floating window exists, the user can touch or tap a region other than the floating window.

Figure 9A:
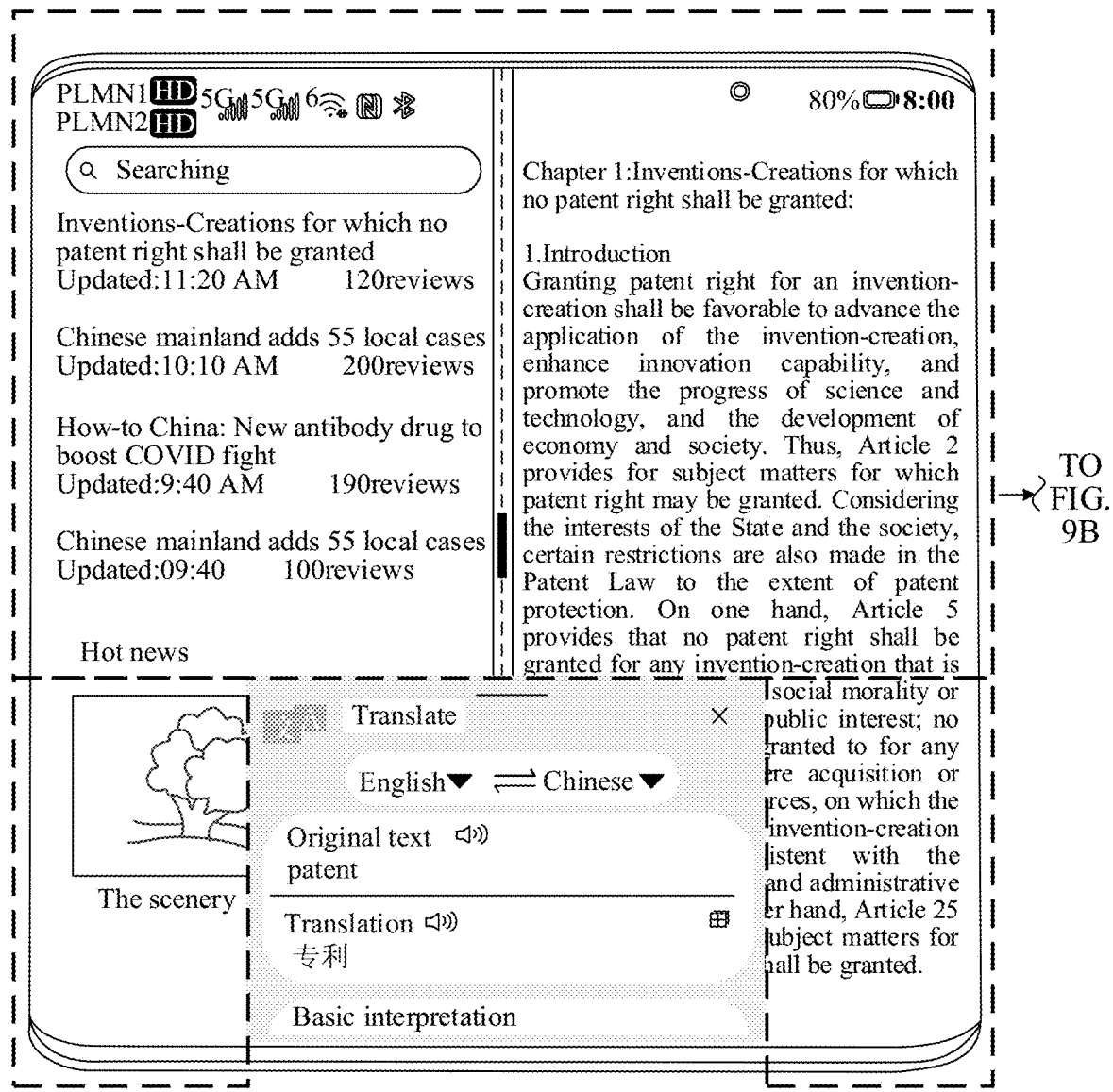
FIGS. 9A-9B are a schematic diagram of a non-modal interface according to an embodiment of this application.
Figure 9B:
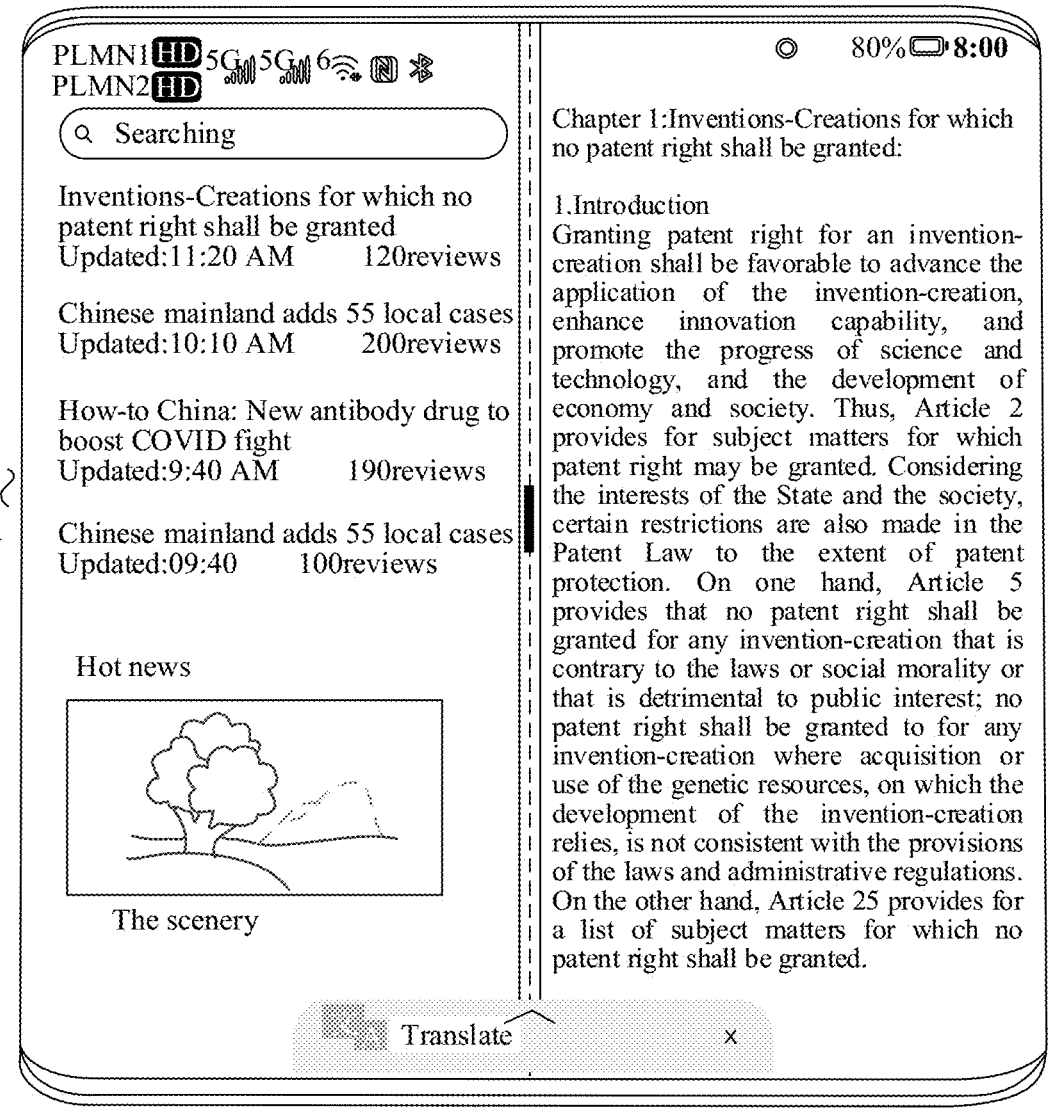

As shown in FIG. 9A, in a case that the floating window displayed in the application using the parallel horizon in the foldable screen phone is in the half-screen state, the foldable screen phone may display the interface shown in FIG. 9B when the foldable screen phone receives, from the user, an operation of flipping the screen, for example, an operation of triggering the region other than the floating window (a region where a dotted box shown in FIG. 9A is located). The floating window in the interface shown in FIG. 9B may be in the bottom state.

It may be understood that the non-modal floating window enables the user to browse and trigger regions other than the floating window without closing the floating window of the foldable screen phone, thereby improving the user experience.

When a non-modal dialog box is displayed, switching to another task in a program is allowed, without closing the dialog box. In this case, a window attribute of the floating window is set to FLAG_NOT_TOUCH_MODAL. Therefore, in this mode, the system may transfer a touch or tap/click event other than a current window region to an underlying window, and a single tap/click event in the current window region is processed in a current window.

Specifically, when the floating window is in the half-screen state and the full-screen state, the window attribute of the floating window is set to FLAG_NOT_TOUCH_MODAL to control process of a focus event. When the floating window is in the bottom state, the window attribute of the floating window is set to FLAG_NOT_FOCUSABLE to deliver the focus event to an original text of a current application for processing. The current application is a read application currently used by the user in the implementation of this application.

FLAG_NOT_FOCUSABLE indicates that the current window does not need to obtain a focus or receive various input events. FLAG_NOT_TOUCH_MODAL is enabled for this flag at the same time, and a final event is directly transferred to a window of a specific focus at a lower layer.

FLAG_NOT_TOUCH_MODAL indicates that in this mode, the system may transfer a touch or tap event other than the current window region to an underlying window, and a single tap event in the current window region is processed in the current window. This flag is important. Generally, this flag needs to be enabled. Otherwise, another window cannot receive any touch or tap event.

In a possible implementation, when the foldable screen phone receives, from the user, an operation of resizing a window in the parallel horizon, the floating window displayed in the application using the parallel horizon in the foldable screen phone may be centrally kept. For example, FIG. 10 is a schematic diagram of an interface for resizing a window in a parallel horizon according to an embodiment of this application.

Figure 10A:
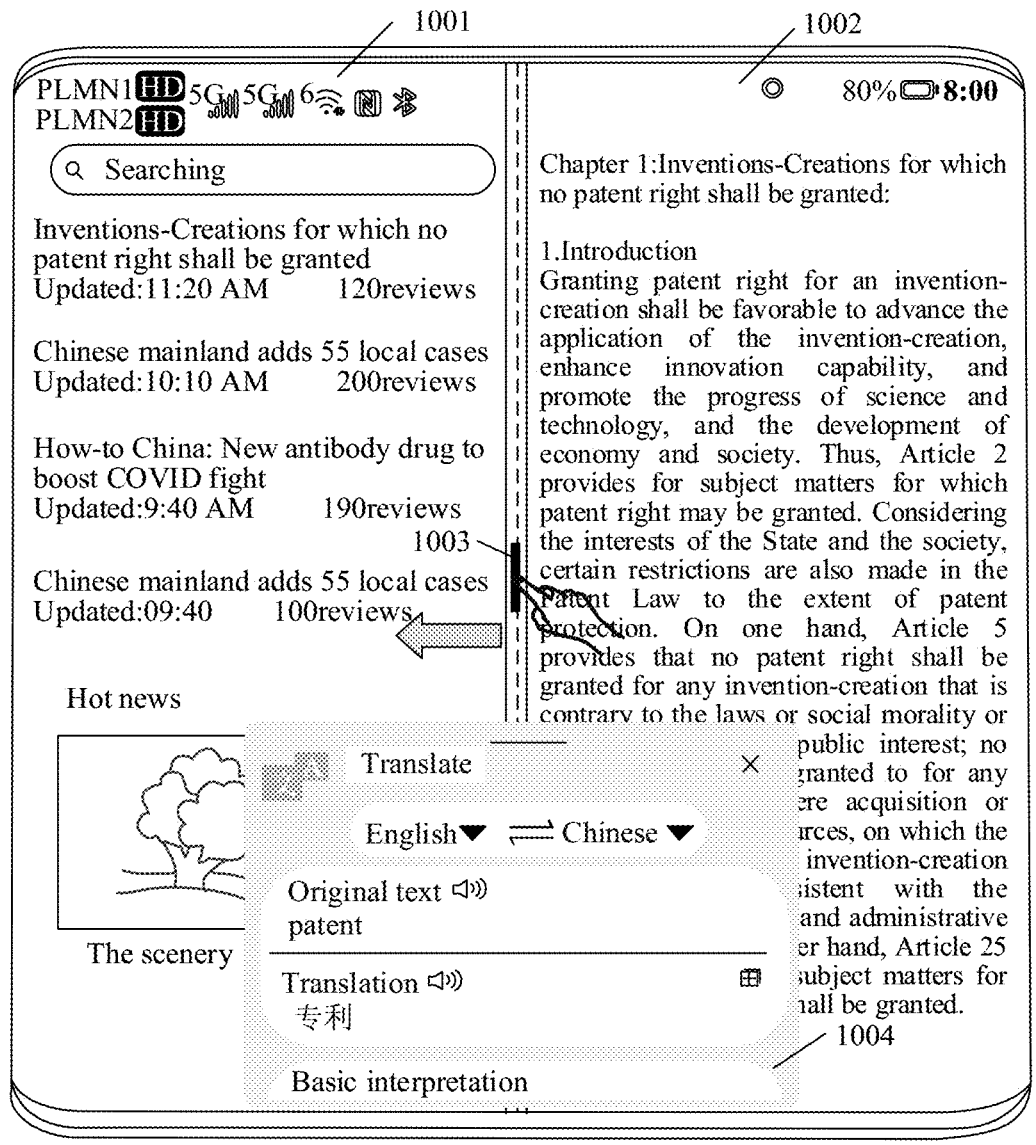
FIGS. 10A-10B are a schematic diagram of an interface for resizing a window in a parallel horizon according to an embodiment of this application.

In an interface shown in FIG. 10A, the interface may include: a home page 1001 (or called a window 1001) and a content page 1002 (or called a window 1002) displayed on left and right split screens. A slide bar 1003 configured to resize the window may be disposed between the home page 1001 and the content page 1002. The interface may include a floating window 1004 centrally displayed at the bottom of an inner screen of a foldable screen.

Figure 10B:
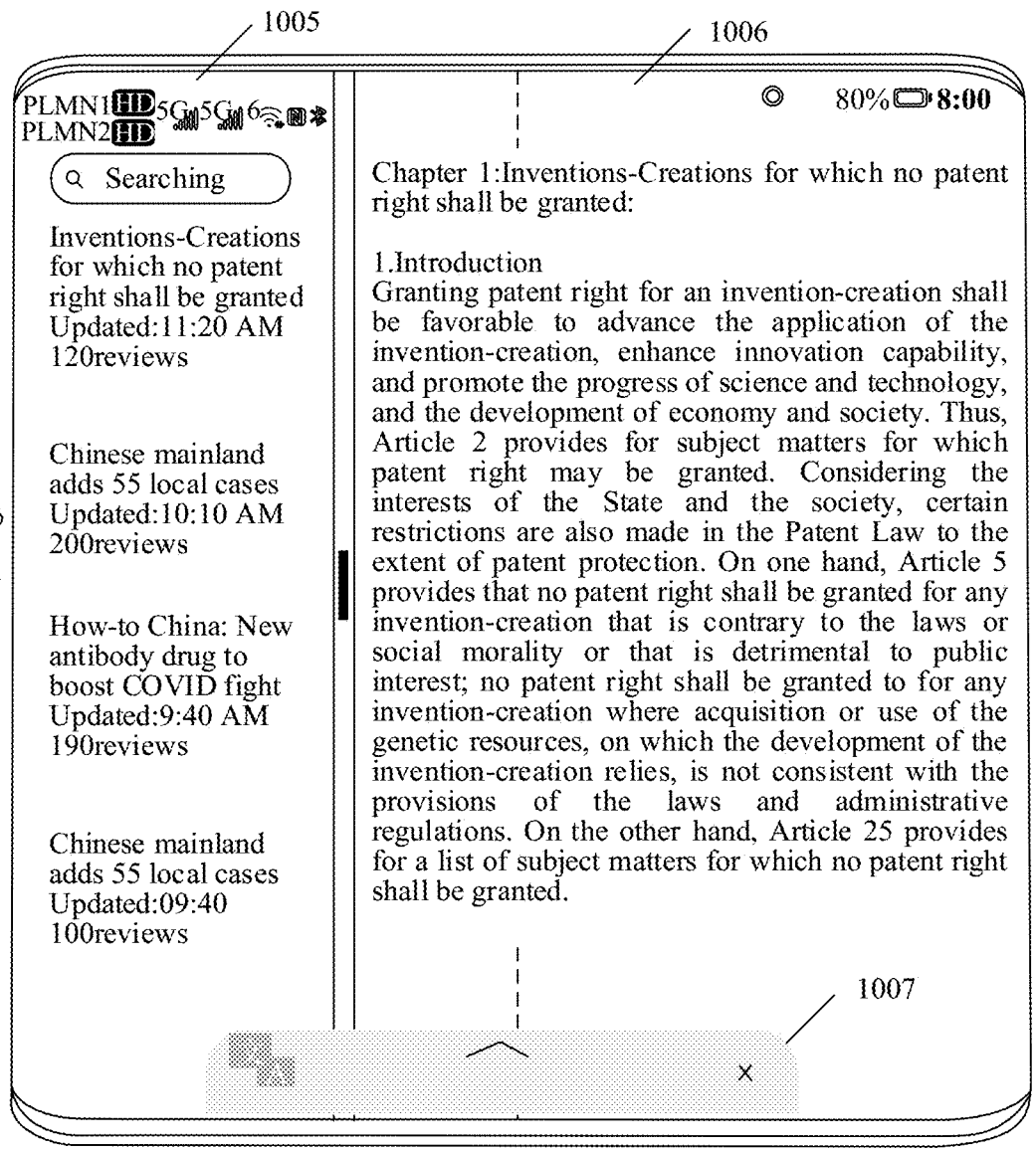

In the interface shown in FIG. 10A, the foldable screen phone may display an interface shown in FIG. 10B when the foldable screen phone receives from the user, an operation of resizing the window, for example, an operation of tapping the slide bar 1003 to slide left.

It may be understood that an area (or a width) of the home page 1005 in the interface shown in FIG. 10B is less than an area (or a width) of the home page 1001 in the interface shown in FIG. 10A. An area (or a width) of the content page 1006 in the interface shown in FIG. 10B is greater than an area (or a width) of the content page 1002 in the interface shown in FIG. 10A. A foldable screen 1007 in the interface shown in FIG. 10B is in the bottom state.

It may be understood that, in the case of the floating window displayed in the application using the parallel horizon in the foldable screen phone, the user resizes the window in the parallel horizon, which may not affect a position of the floating window.

In a possible implementation, in a case that the inner screen of the foldable screen phone uses the parallel horizon and displays a floating window, the foldable screen phone may display a right window in the parallel horizon when the foldable screen phone receives, from the user, an operation of folding the screen, for example, an operation of switching from the inner screen of the foldable screen phone to the outer screen of the foldable screen phone. For example, FIG. 11 is a schematic diagram of an interface for switching a screen of a foldable screen phone according to an embodiment of this application.

Figure 11A:
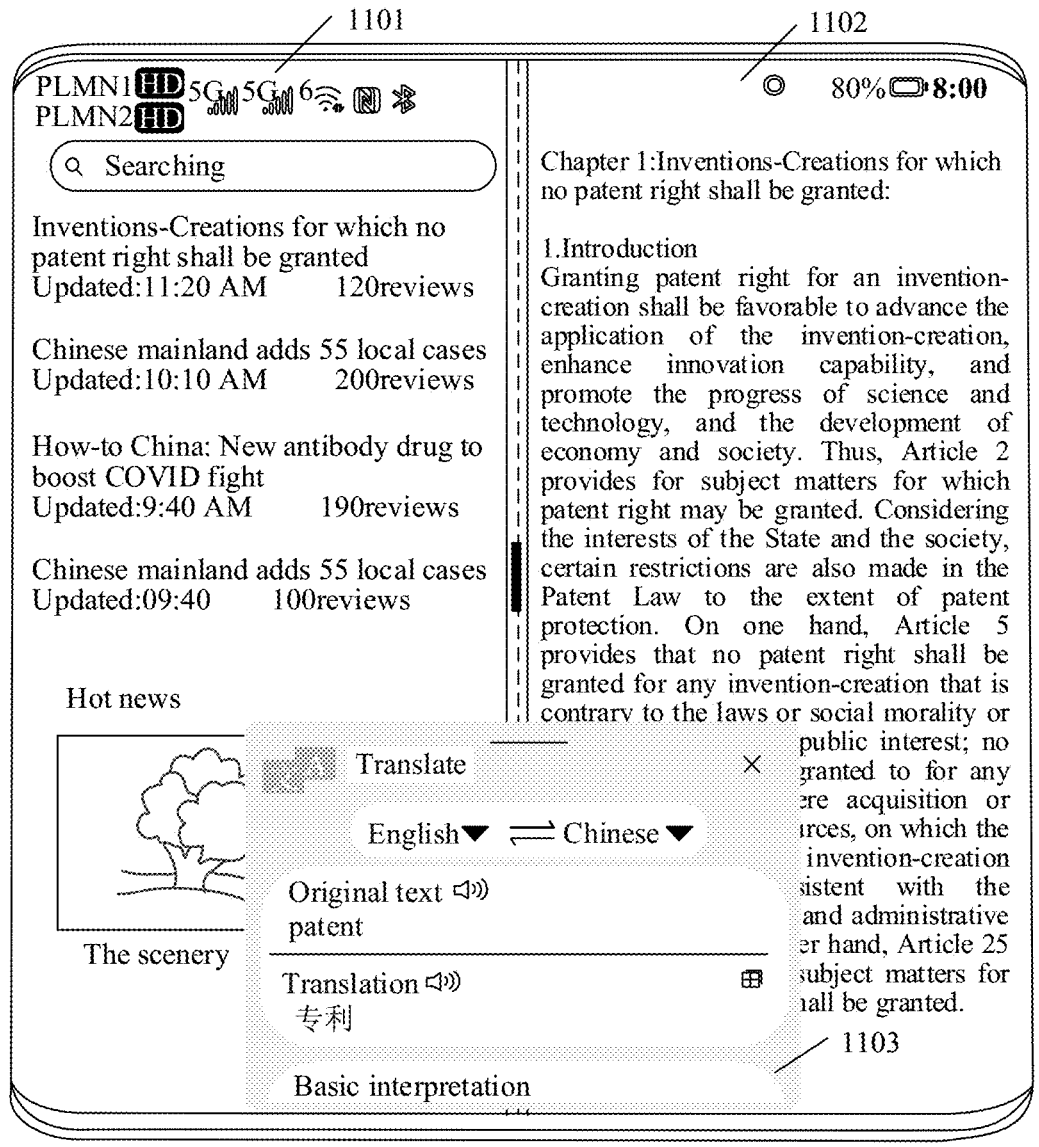
FIGS. 11A-11B are a schematic diagram of an interface for switching a screen of a foldable screen phone according to an embodiment of this application.
Figure 11B:
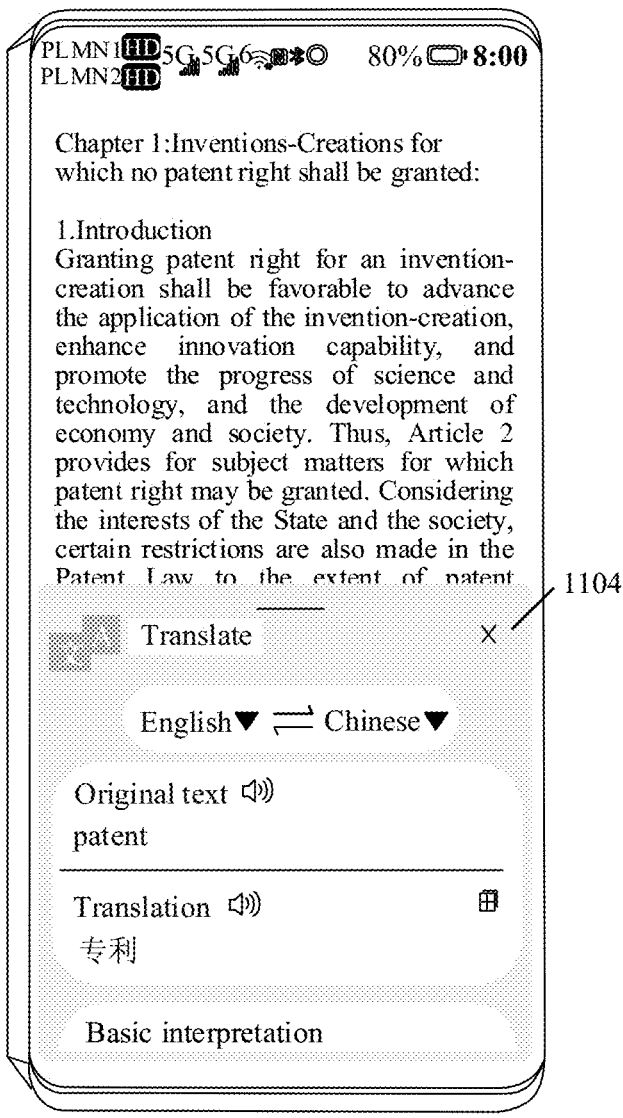

In a case that a window 1101, a window 1102, and a floating window 1103 are displayed on the inner screen of the foldable screen phone shown in FIG. 11A, the foldable screen phone may turn off the display on the inner screen and display an interface shown in FIG. 11B on the outer screen when the foldable screen phone receives, from the user, an operation of folding the screen of the phone (or understood as that an angle of the foldable screen meets 0° to 70°). Content in the window 1102 of the inner screen of the foldable screen phone and a floating window 1104 may be displayed in the interface.

It may be understood that the floating window 1103 shown in FIG. 11A is in a half-screen state, and the floating window 1103 is centrally displayed at the bottom of the inner screen. A width of the floating window 1104 is less than that of the inner screen. The floating window shown in FIG. 11B is also in a half-screen state, and the floating window 1104 is displayed at the bottom of the inner screen. A width of the floating window 1104 is equal to that of the outer screen. As can be seen, the state of the floating window during the folding of the foldable screen phone, for example, the half-screen state of the floating window, does not change.

Scenario 2: The Foldable Screen Phone Displays the Floating Window on an Application Split-Screen Display Interface.

In Scenario 2, the foldable screen phone may open the application split screen based on the embodiment corresponding to FIG. 12, and open floating windows in different applications respectively based on the embodiment corresponding to FIG. 13.

For example, FIG. 12 is a schematic diagram of an interface of application split-screen display according to an embodiment of this application.

Figure 12A:
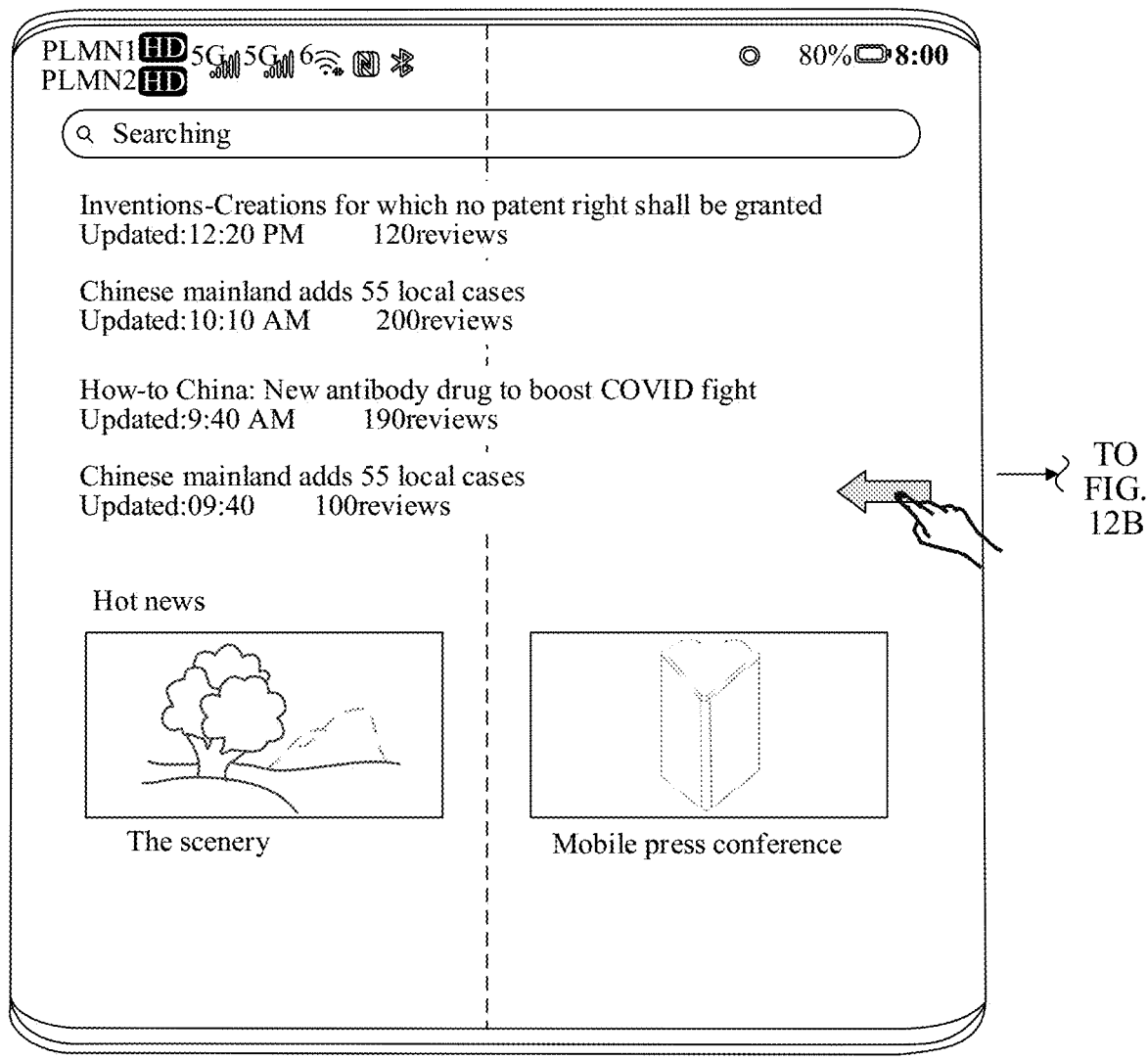
FIGS. 12A-12D are a schematic diagram of an interface of application split-screen display according to an embodiment of this application.

The foldable screen phone may display an interface shown in FIG. 12A when the foldable screen phone receives, from the user, an operation of opening the news application. A home page of the news application may be displayed in full screen in the interface.

Figure 12B:
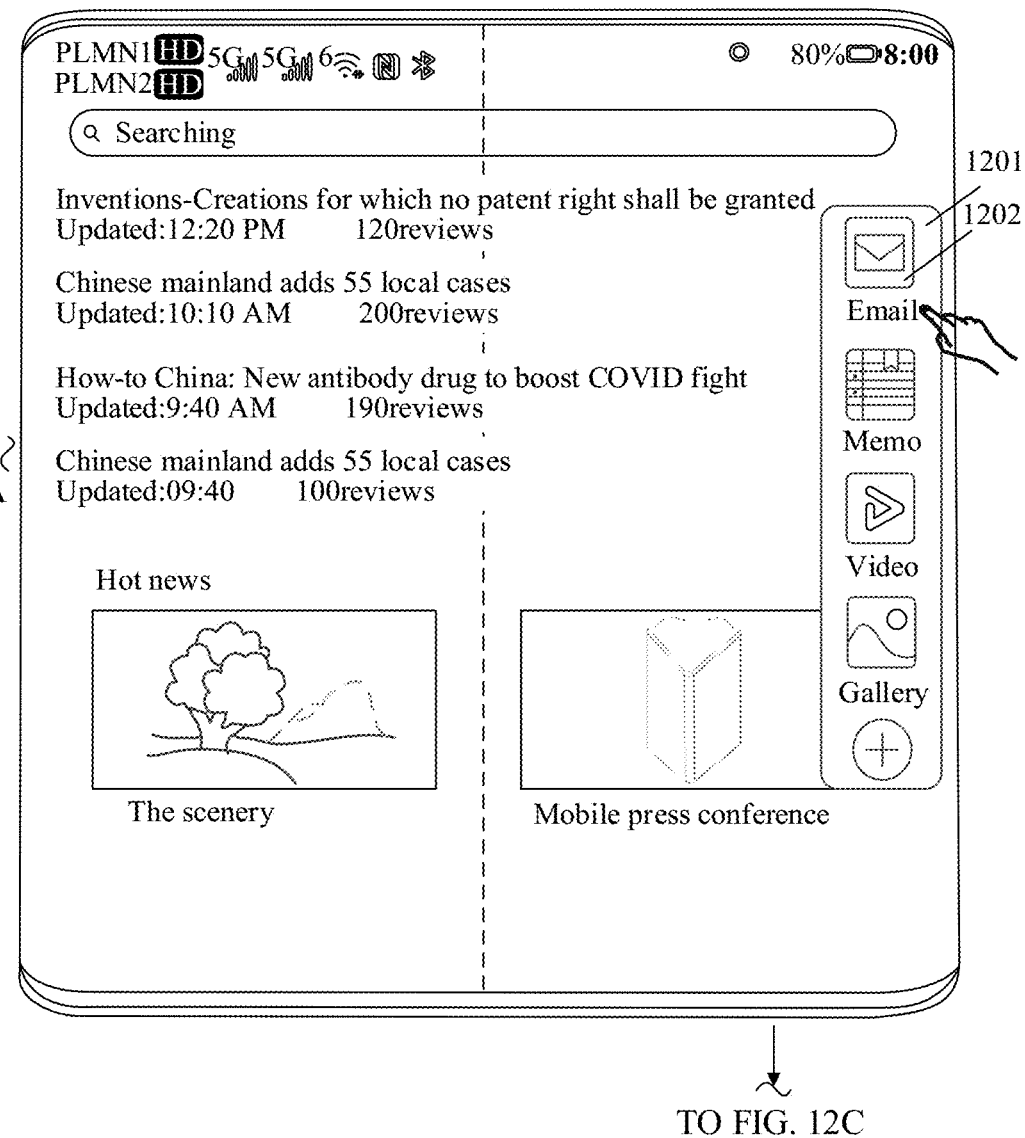

In the interface shown in FIG. 12A, the foldable screen phone may display an interface shown in FIG. 12B when the foldable screen phone receives, from the user, an operation of sliding inwards along an edge of a right screen. The interface shown in FIG. 12B may include a smart multi-window (or called a dock (dock) bar) 1201. The smart multi-window 1201 may include: a control 1202 corresponding to an email application, a control corresponding to a memo application, a control corresponding to a video application, a control corresponding to a gallery application, and a control for adding applications to or deleting applications from the smart multi-window.

Figure 12C:
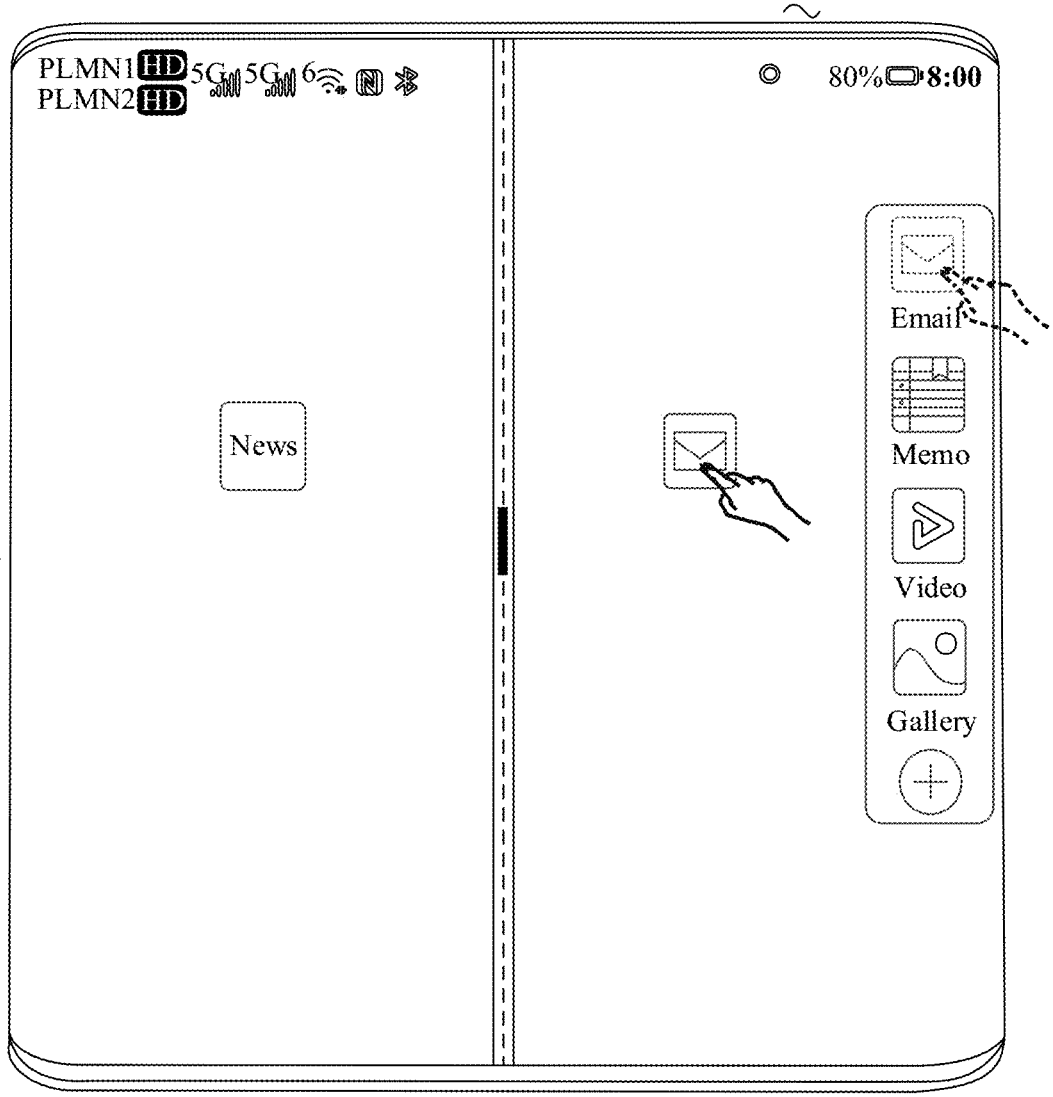
Figure 12D:
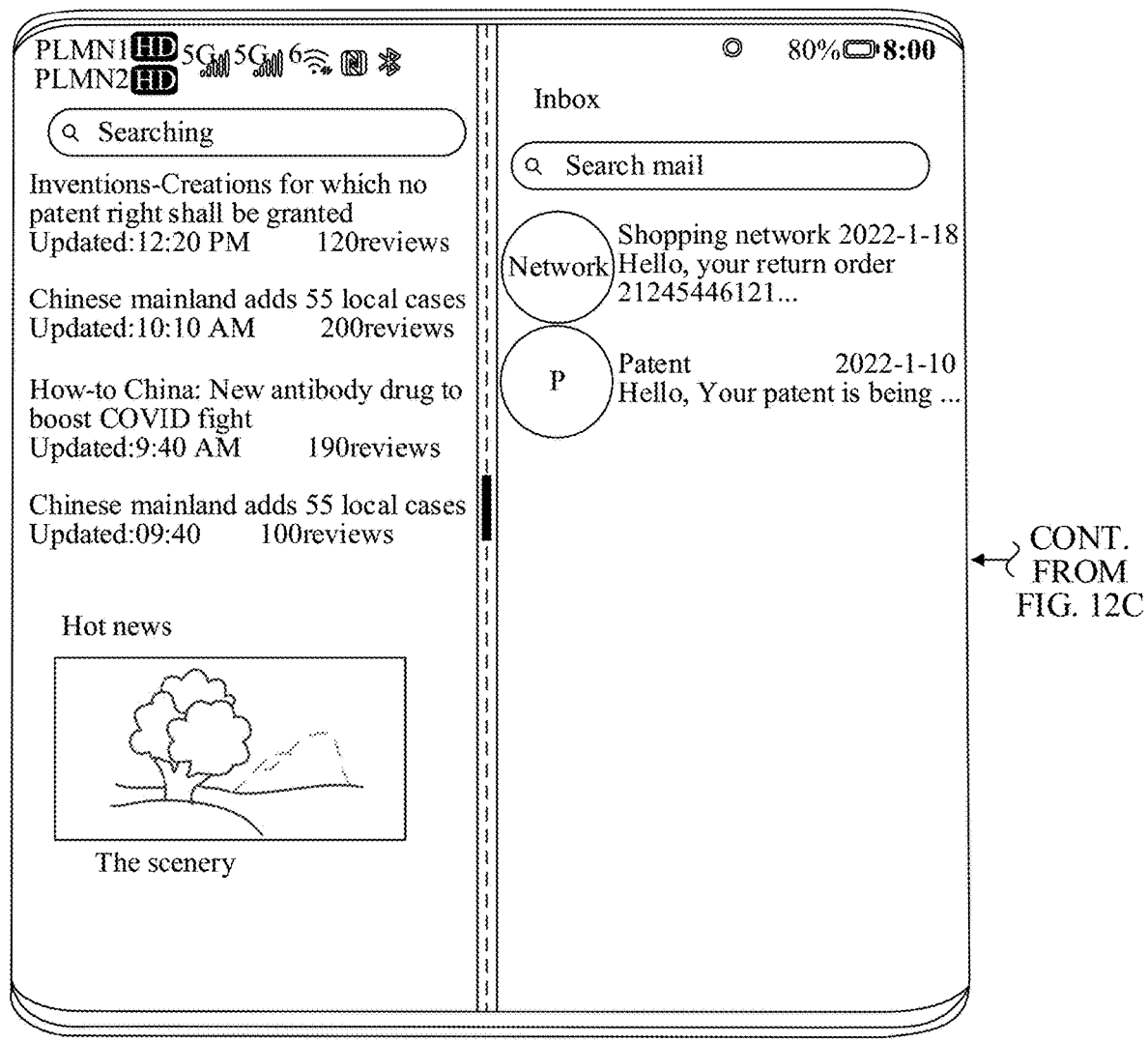

In the interface shown in FIG. 12B, the foldable screen phone may briefly display an interface shown in FIG. 12C and then jump to an interface shown in FIG. 12D when the foldable screen phone receives, from the user, an operation of tapping the control 1202 corresponding to the email application in the smart multi-window 1201 and continuously dragging the control 1202 corresponding to the email application to a right region of the screen. An icon of the news application and an icon of an email may be displayed on left and right split screens in the interface shown in FIG. 12C. A window corresponding to the news application and a window corresponding to the email application may be displayed on left and right split screens in the interface shown in FIG. 12D.

Further, in a case that the application split-screen display is enabled, the foldable screen phone may open floating windows in different applications based on the embodiment corresponding to FIG. 13. For example, FIG. 13 is a schematic diagram of an interface for opening a floating window by application split-screen display according to an embodiment of this application.

Figure 13A:
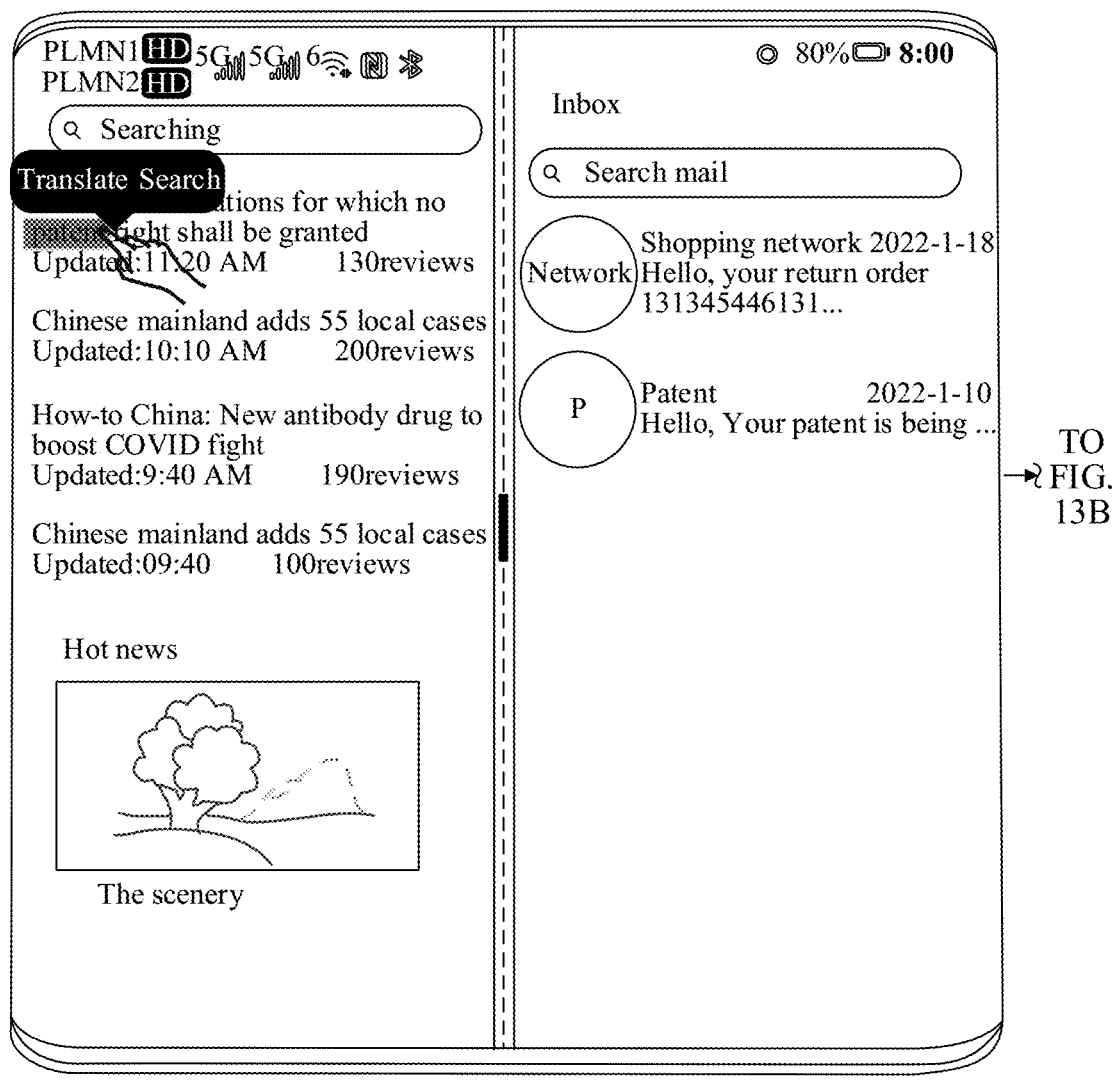
FIGS. 13A-13D are a schematic diagram of an interface for opening a floating window by application split-screen display according to an embodiment of this application.
Figure 13B:
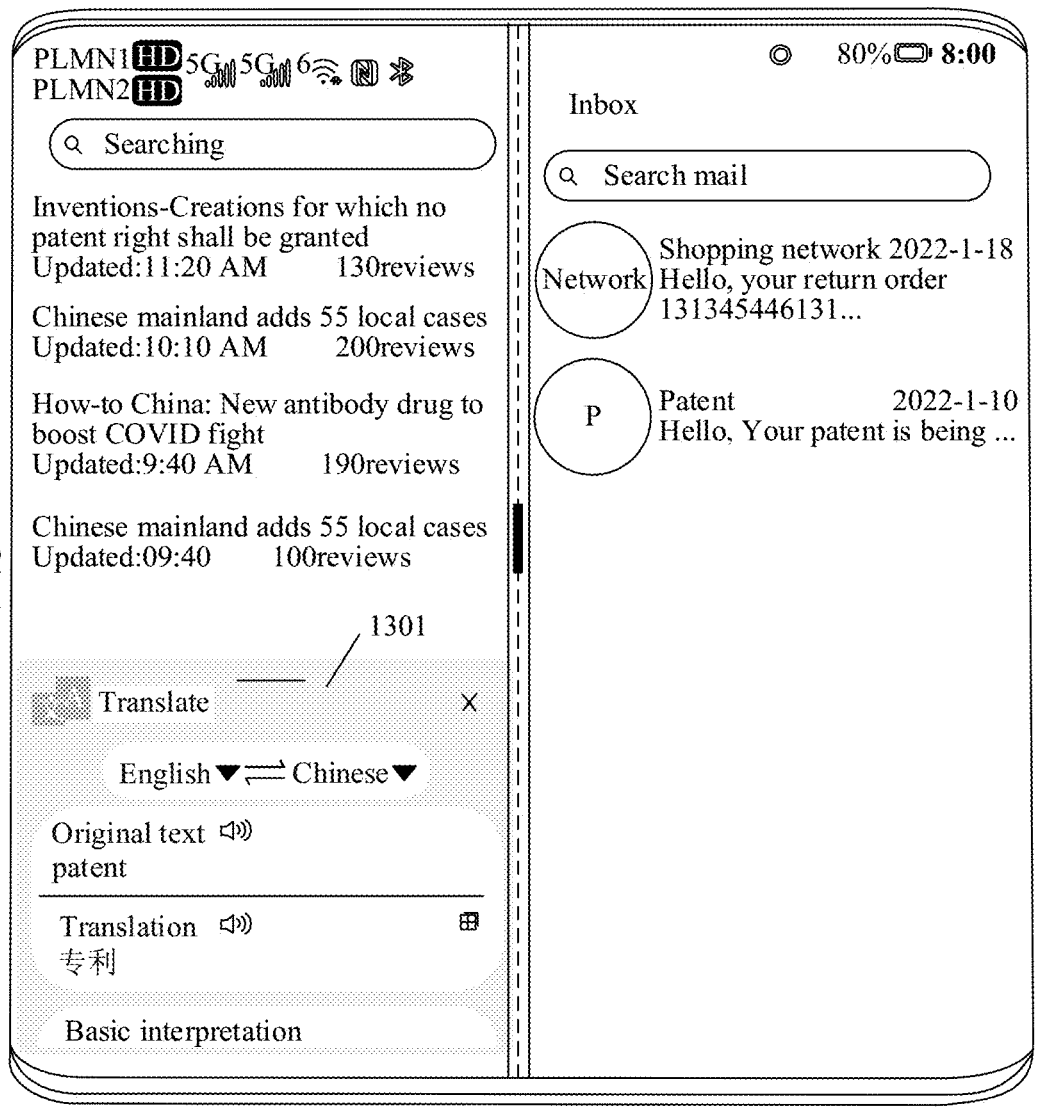

In a case that the application split-screen display is enabled as shown in FIG. 13A, the foldable screen phone may display an interface shown in FIG. 13B when the foldable screen phone receives, from the user, an operation of triggering the "translation" option in the option bar corresponding to the word "patent" in the window corresponding to the news application. A floating window 1301 may be displayed in the interface shown in FIG. 13B. The floating window 1301 may be displayed at the bottom of the window corresponding to the news application, and a width of the floating window 1301 is consistent with that of the window corresponding to the news application.

It may be understood that since the user has not triggered the floating window in the window corresponding to the email application at this time, the floating window may not be displayed in the floating window corresponding to the email application.

Figure 13C:
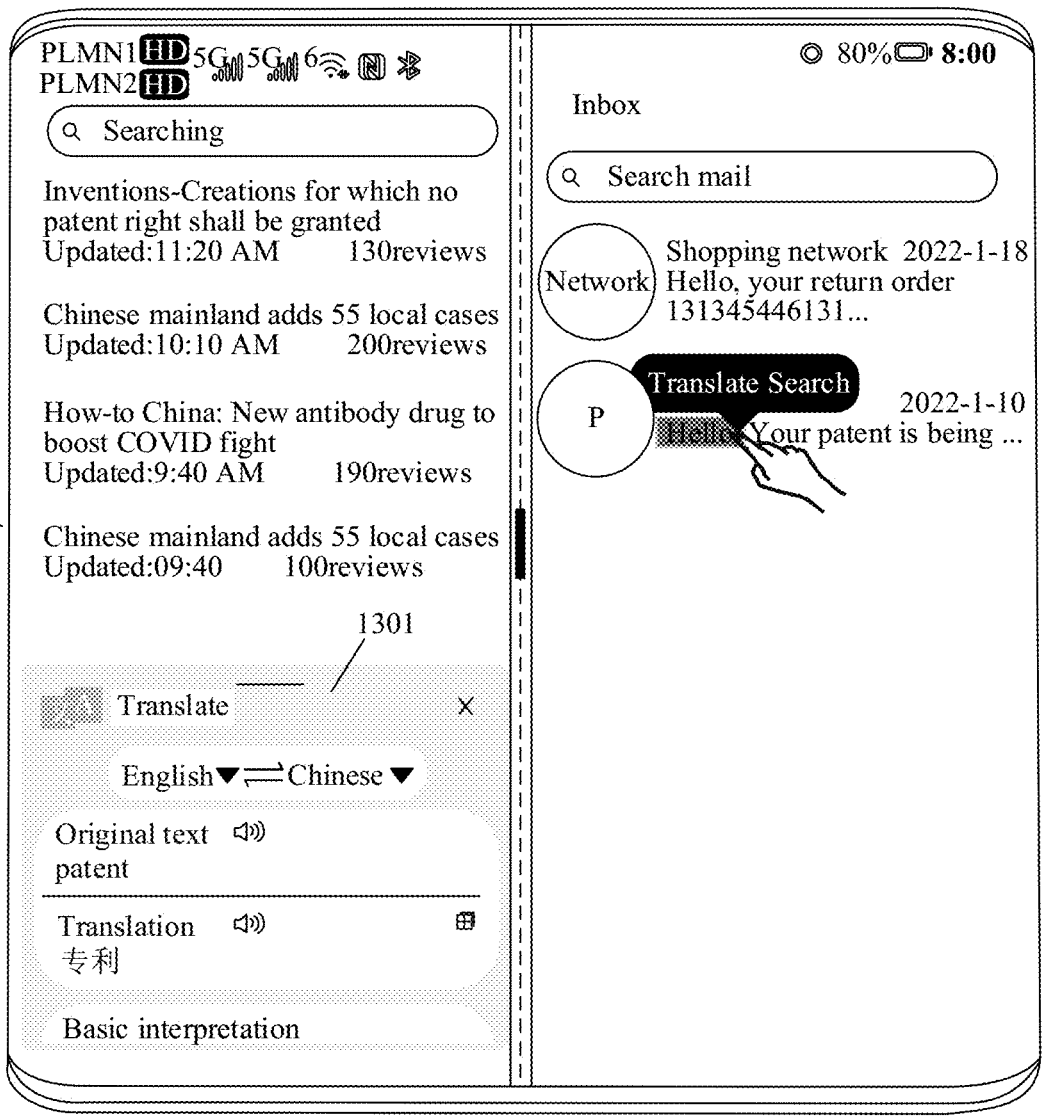
Figure 13D:
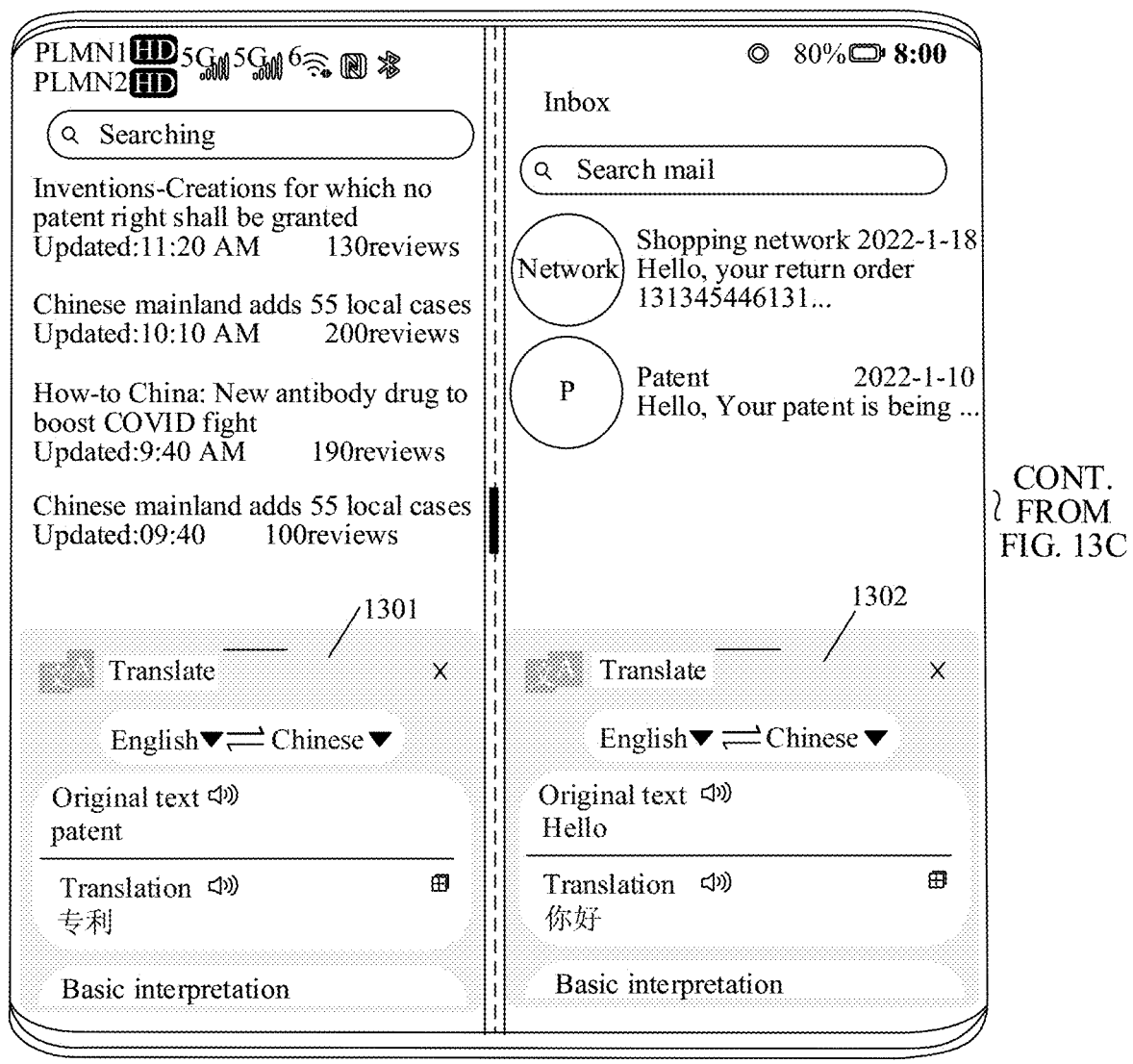

Similarly, in a case that the floating window 1301 is displayed in the window corresponding to the news application as shown in FIG. 13C, the foldable screen phone may display an interface shown in FIG. 13D when the foldable screen phone receives, from the user, an operation of triggering a "translation" option in an option bar corresponding to a word "hello" in the window corresponding to the email application. The floating window 1301 and a floating window 1302 may be displayed in the interface shown in FIG. 13D. The floating window 1302 may be displayed at a bottom end of the window corresponding to the email application, and a width of the floating window 1302 is consistent with that of the window corresponding to the news application.

It may be understood that the floating window in each window meets a half-screen state when the floating window is opened by default.

It may be understood that when the user opens the floating window in each window of the application split-screen display, the floating window may be displayed at the bottom of each window, and a width of the floating window is the same as that of the window where the application split screen is located.

In a possible implementation, in the embodiment corresponding to FIG. 14, the foldable screen phone may present three floating window states in any window according to the user's operation on the floating window in any window.

For example, FIG. 14 is a schematic diagram of another interface for displaying a floating window in a portrait state according to an embodiment of this application. In the embodiment corresponding to FIG. 14, descriptions are based on an example in which three states of the floating window are displayed in a left window 1401 of the foldable screen phone, and the three states of the floating window may also be displayed in a right window 1402 of the foldable screen phone. Details are not described hereinafter.

Figure 14A:
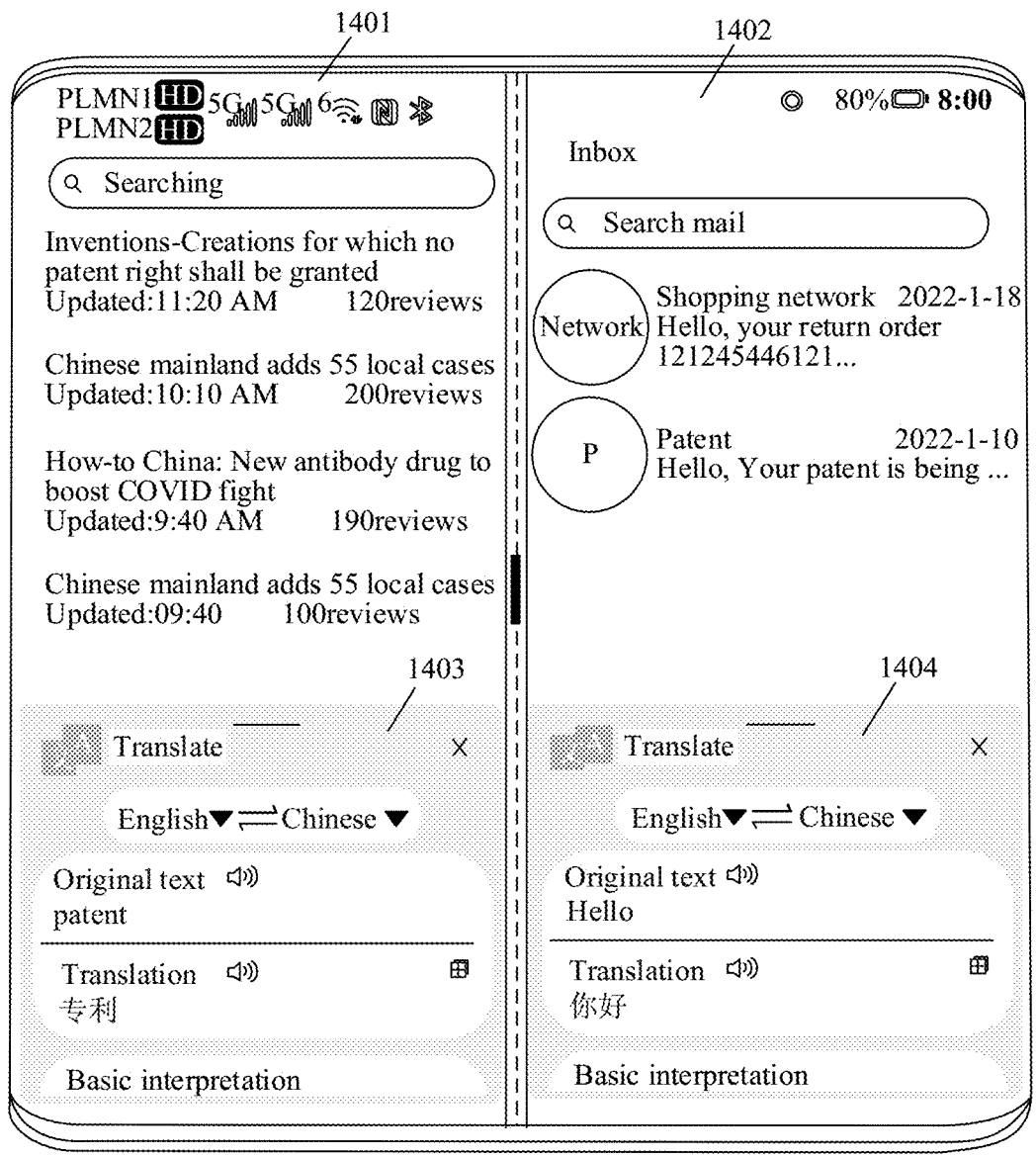
FIGS. 14A-14C are a schematic diagram of another interface for displaying a floating window in a portrait state according to an embodiment of this application.

In an interface shown in FIG. 14A, the interface may include floating windows in a half-screen state displayed separately in an application split-screen display interface when the foldable screen phone is in the portrait state, for example, a floating window 1403 in a half-screen state displayed in the window 1401 and a floating window 1404 in a half-screen state displayed in the window 1402. Any floating window in the half-screen state occupies about half of a size of a window where a current split-screen application is located, and displays a part of translation result content. The floating window in the half-screen state may alternatively be used as a default floating window form, that is, a first floating window displayed after the user copies a text.

Figure 14B:
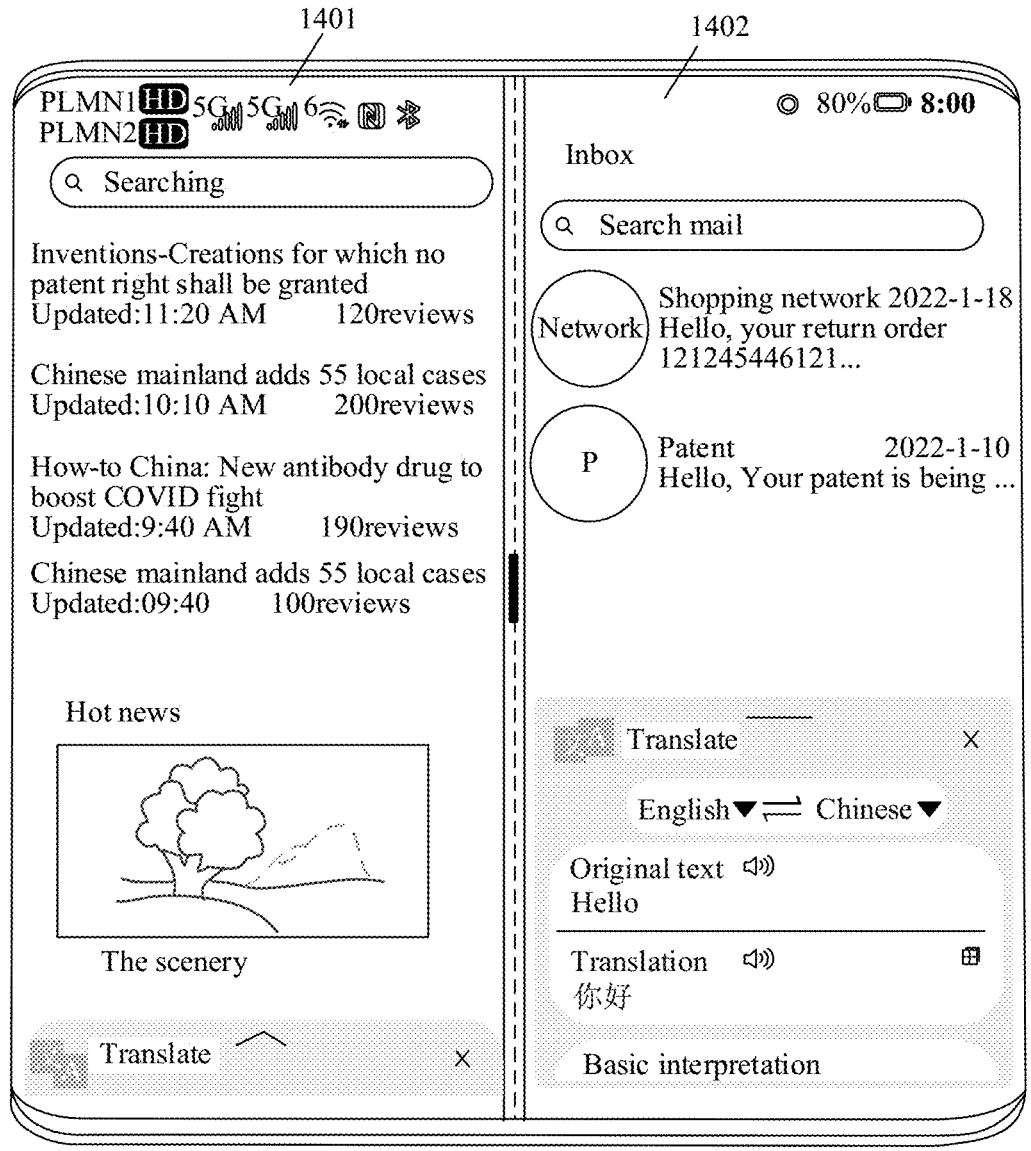

For example, in the interface shown in FIG. 14A, the foldable screen phone may display an interface shown in FIG. 14B when the foldable screen phone receives, from the user, an operation of tapping the floating window in the window 1401 to slide down.

In the interface shown in FIG. 14B, the interface may include a floating window in a bottom state displayed in the window 1401 when the foldable screen phone is in the portrait state. In this case, since the user does not trigger the floating window in the window 1402, the floating window in the window 1402 may not change. The floating window in the bottom state is located at the bottom of the window where the current split-screen application is located and does not display any translation result content, which helps the user continue to access content in the current application, to improve user experience.

Figure 14C:
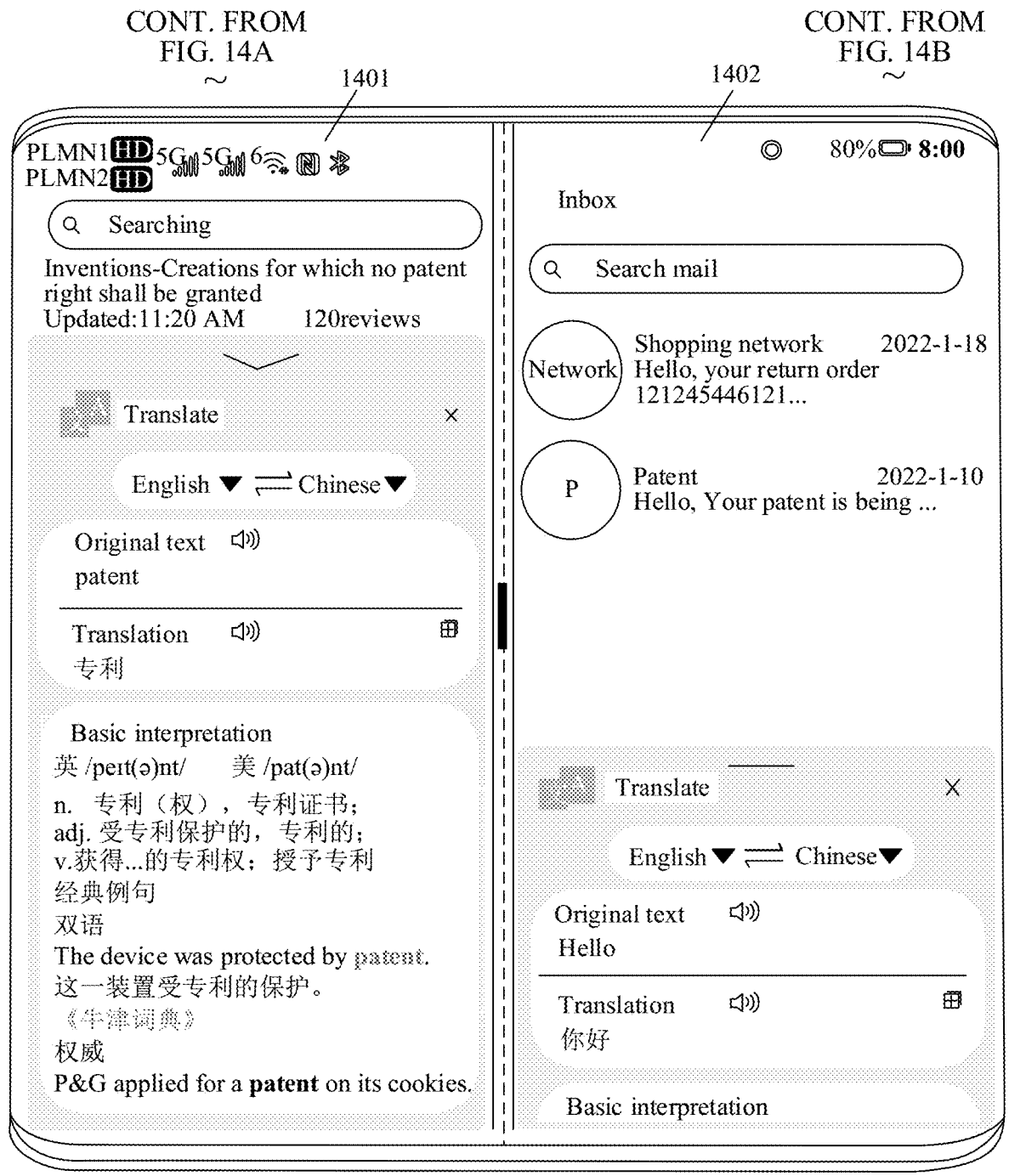

For example, in the interface shown in FIG. 14B, the foldable screen phone may display an interface shown in FIG. 14C when the foldable screen phone receives, from the user, an operation of tapping the floating window in the window 1401 to slide upwards to an upper edge of the screen in the portrait state.

In the interface shown in FIG. 14C, the interface may include a floating window in a full-screen state displayed in the window 1401 when the foldable screen phone is in the portrait state. In this case, since the user does not trigger the floating window in the window 1402, the floating window in the window 1402 may not change. For example, the floating window in the full-screen state may be displayed in the window where the current split-screen application is located, is expanded based on a drag operation of the user, and is used to display more translation result content than the floating window in the half-screen state, to improve user experience.

It may be understood that the foldable screen phone may also be switched in the interface shown in FIG. 14A, the interface shown in FIG. 14B, and the interface shown in FIG. 14C based on other user operations, which is not specifically limited in embodiments of this application.

It may be understood that the floating windows displayed in the interface shown in FIG. 14A, the interface shown in FIG. 14B, and the interface shown in FIG. 14C may all be displayed at the bottom of the window where the split-screen application is located, and a width of each floating window is consistent with that of the window where the split-screen application is located.

Based on the embodiment corresponding to FIG. 14, the floating window may display different forms according to different operations of the user. In this way, different requirements of the user for each floating window displayed in the application split-screen display interface are met, and the user's experience of using a floating window function is improved.

In a possible implementation, each floating window displayed in the application split-screen display interface may be flexibly adjusted according to a flipping requirement of the user, thereby improving the user's experience of using the floating window function in the foldable screen phone. Specifically, the foldable screen phone is in the portrait state, and when the user flips the screen in a case that the floating window displayed in each application split screen in the foldable screen phone is in the half-screen state, each floating window in the foldable screen phone may be in the half-screen state (as shown in the embodiment corresponding to FIG. 15).

Figure 15A:
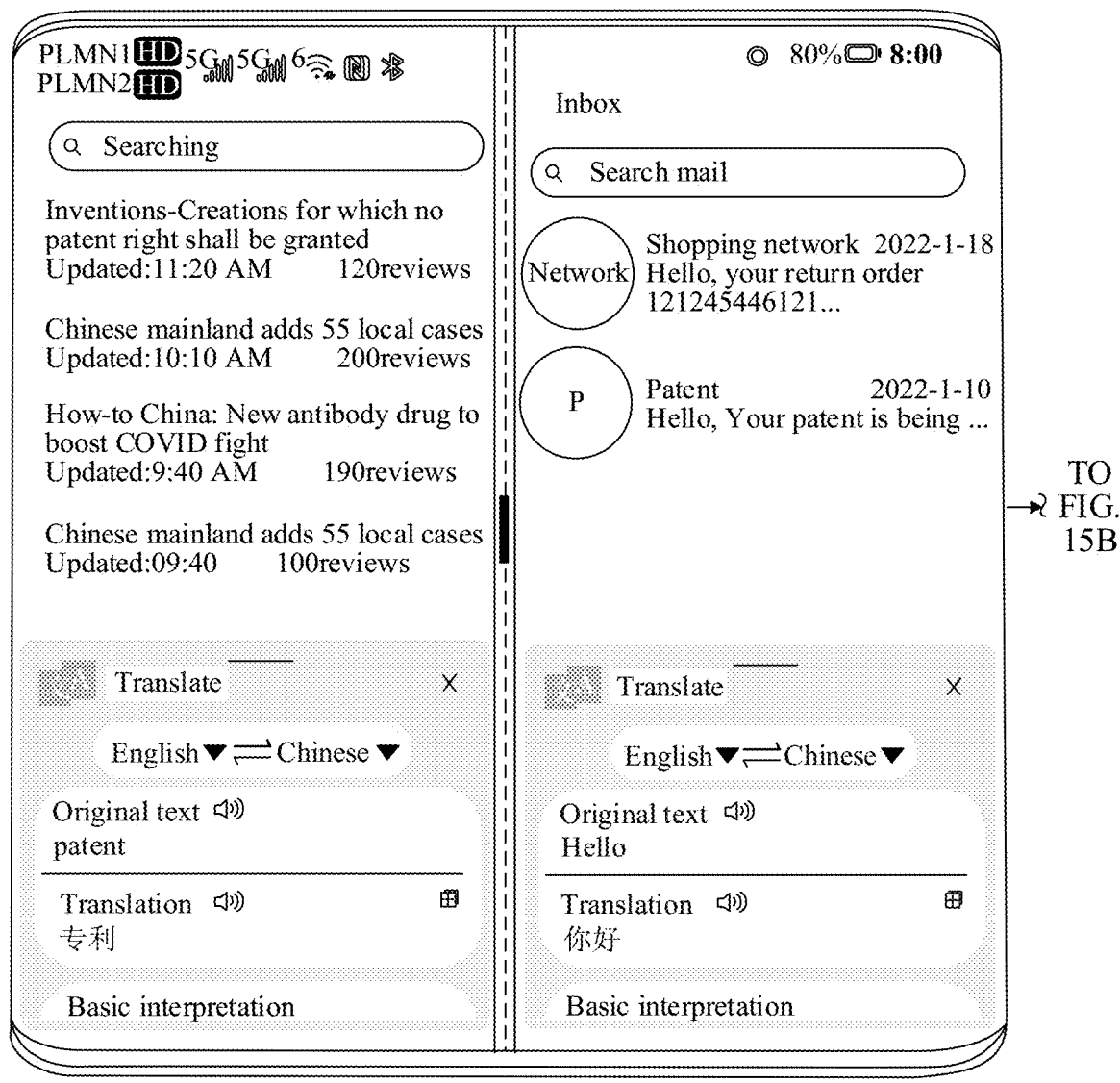
FIGS. 15A-15B are a schematic diagram of another interface for flipping a screen of a foldable screen phone according to an embodiment of this application.
Figure 15B:
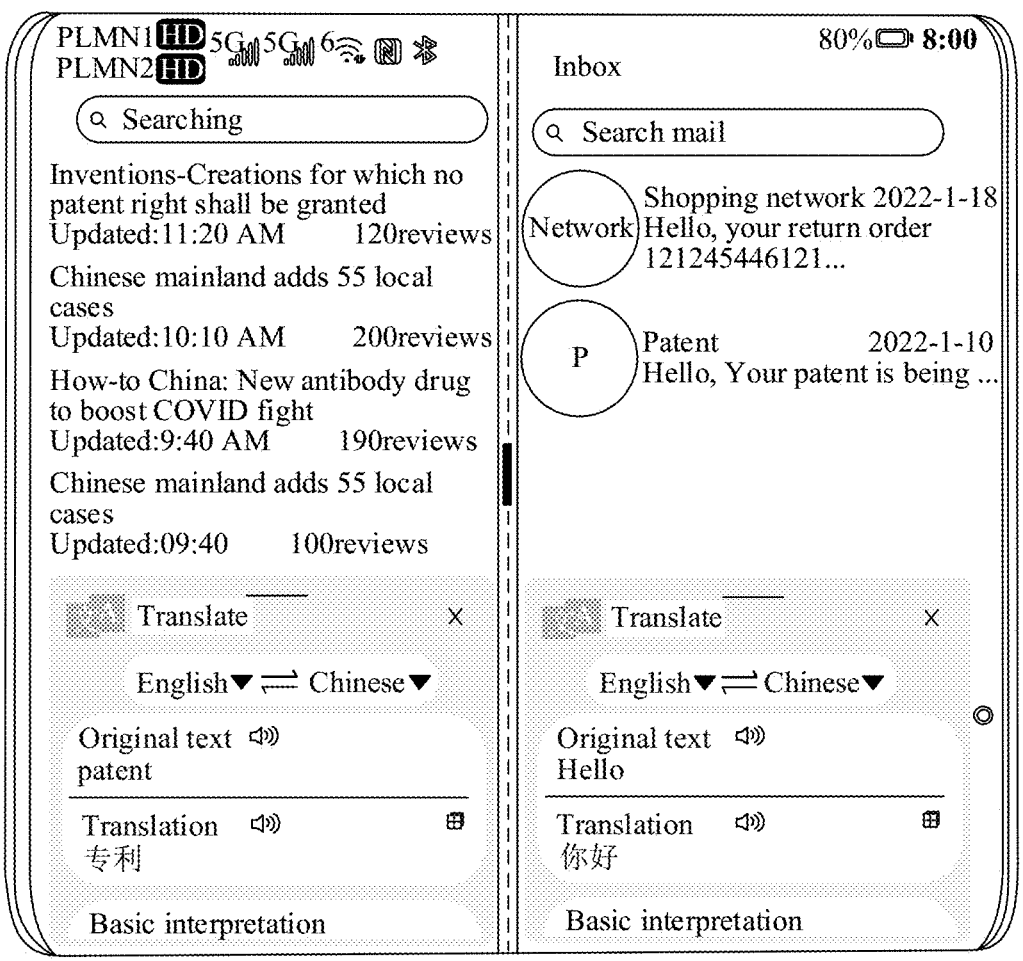

For example, FIG. 15 is a schematic diagram of another interface for flipping a screen of a foldable screen phone according to an embodiment of this application. As shown in FIG. 15A, in a case that the floating window displayed in each application split screen in the foldable screen phone is in the half-screen state, the foldable screen phone may display an interface shown in FIG. 15B when the foldable screen phone receives, from the user, an operation of flipping the screen, for example, an operation of flipping the foldable screen phone in a portrait state to the foldable screen phone in a landscape state. In the interface shown in FIG. 15B, each floating window displayed in the foldable screen phone may be in the half-screen state.

It may be understood that, since the floating window of the foldable screen phone in the portrait state has three states, that is, a half-screen state, a bottom state, and a full-screen state, and a difference between a width and a height of the inner screen of the foldable screen phone is small, the floating window of the foldable screen phone in the landscape state may also have three states, that is, a half-screen state, a bottom state, and a full-screen state, so that the foldable screen phone can flexibly adjust, according to a flipping requirement of the user, each floating window displayed in the application split screen.

Specifically, in a case that the floating windows displayed in each application split screen in the foldable screen phone are all in the bottom state, each floating window in the foldable screen phone may be in the bottom state when the foldable screen phone receives, from the user, an operation of flipping the screen, for example, an operation of flipping the foldable screen phone in the portrait state to the foldable screen phone in the landscape state. Alternatively, in a case that the floating windows displayed in each application split screen in the foldable screen phone are all in the full-screen state, each floating window in the foldable screen phone may be in the full-screen state when the foldable screen phone receives, from the user, an operation of flipping the screen, for example, an operation of flipping the foldable screen phone in the portrait state to the foldable screen phone in the landscape state.

In a possible implementation, each floating window displayed in the application split screen in the foldable screen phone may satisfy non-modality. For example, FIG. 16 is a schematic diagram of another non-modal interface according to an embodiment of this application.

Figure 16A:
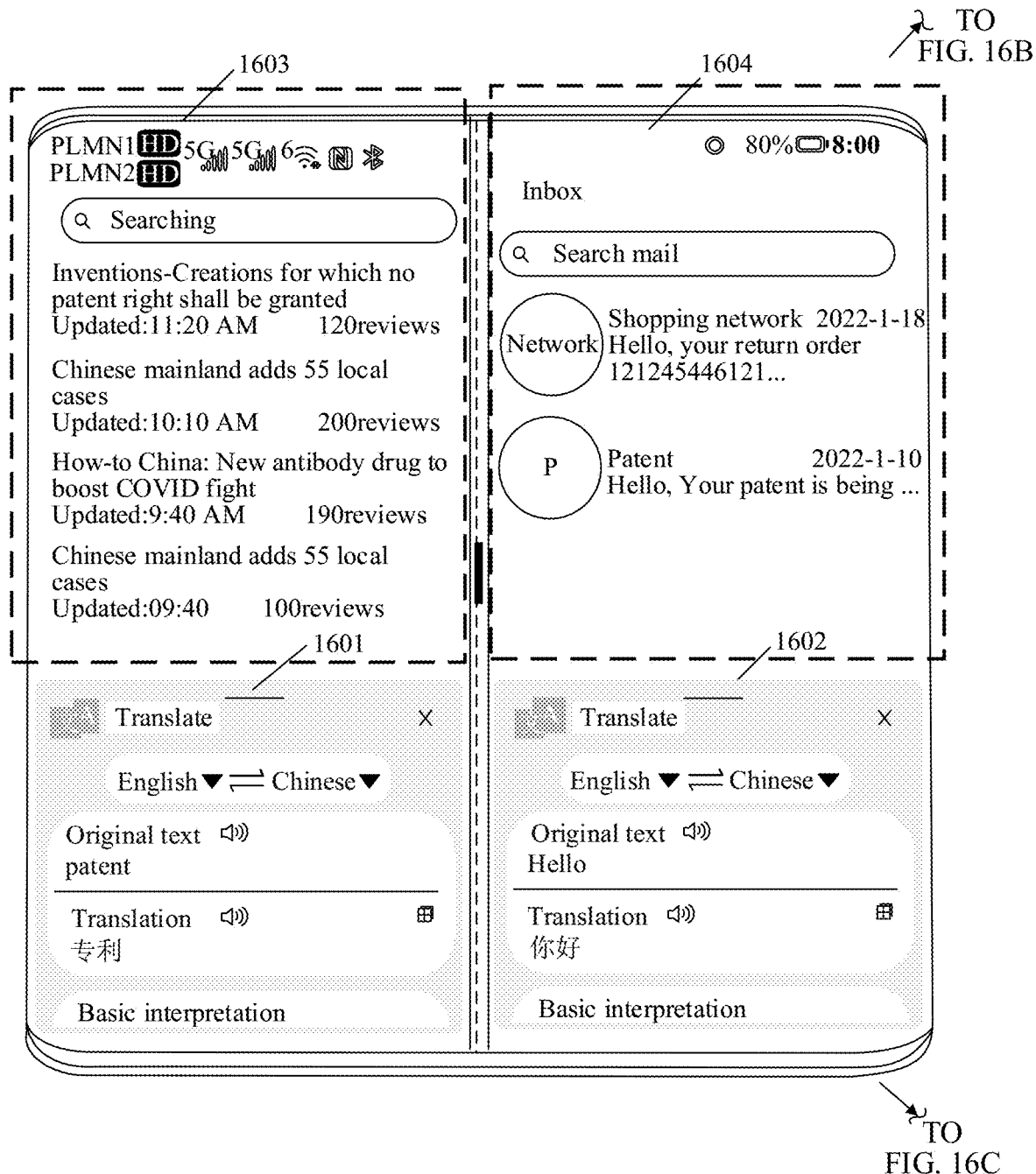
FIGS. 16A-16C are a schematic diagram of another non-modal interface according to an embodiment of this application.
Figure 16B:
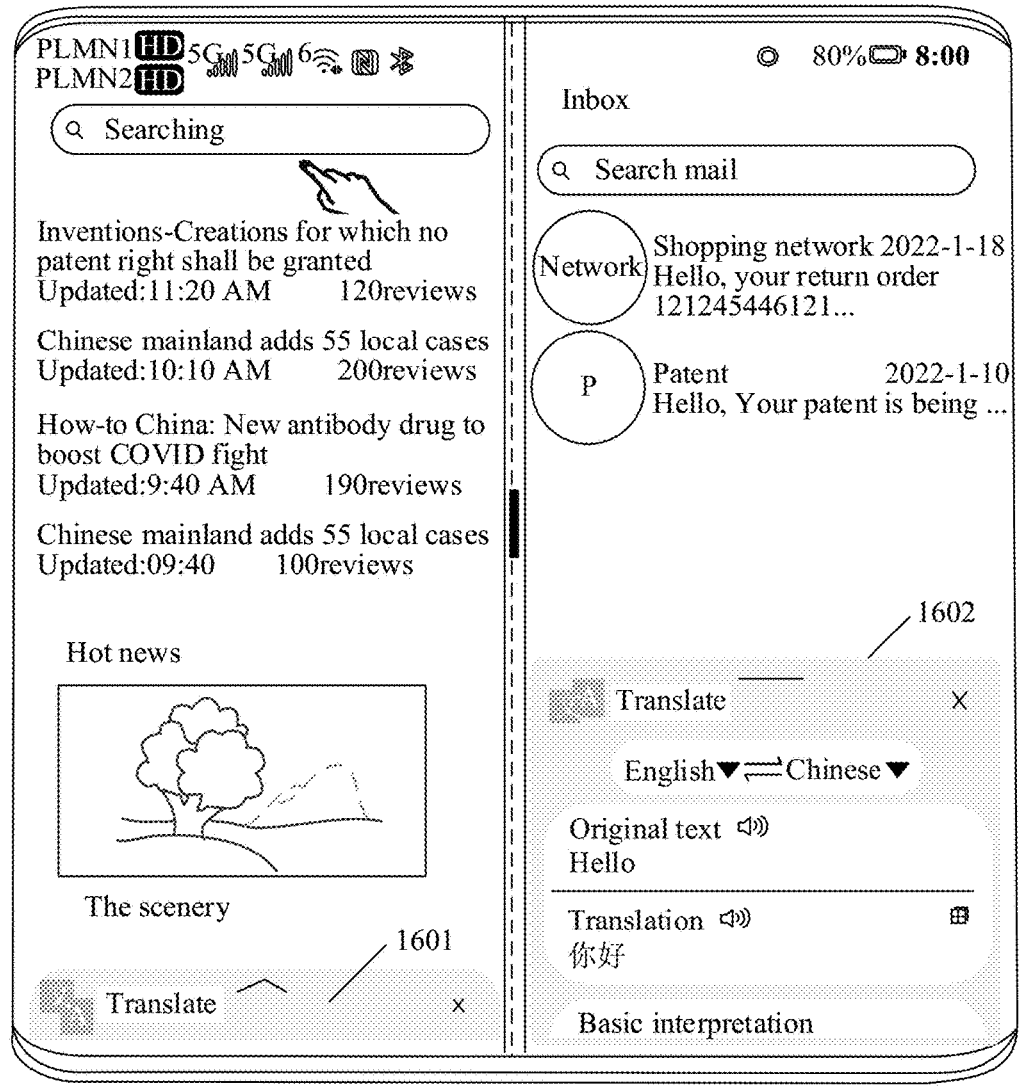

As shown in FIG. 16A, in a case that the floating windows (e.g., a floating window 1601 and a floating window 1602) displayed in each application split screen in the foldable screen phone are both in a half-screen state, the foldable screen phone may display the interface shown in FIG. 16B when the foldable screen phone receives, from the user, an operation of triggering a region other than the floating window 1601 (a region where a dotted box 1603 shown in FIG. 16A is located) in the window corresponding to the news application. In the interface shown in FIG. 16B, the floating window 1601 in the window corresponding to the news application may be in a bottom state, and the floating window 1602 in the window corresponding to the email application may be in the half-screen state.

Figure 16C:
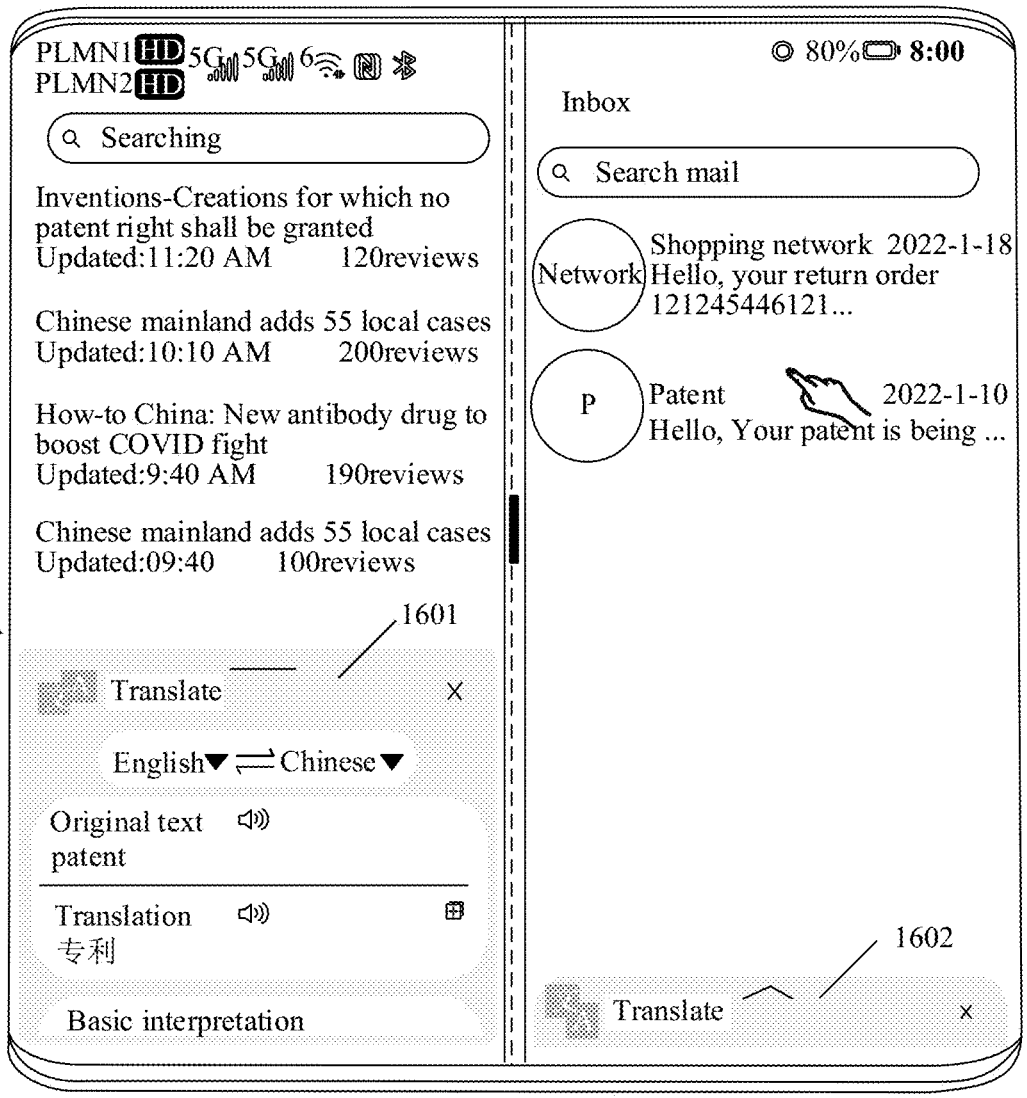

Alternatively, as shown in FIG. 16A, in a case that the floating windows (e.g., the floating window 1601 and the floating window 1602) displayed in each application split screen in the foldable screen phone are both in the half-screen state, the foldable screen phone may display the interface shown in FIG. 16C when the foldable screen phone receives, from the user, an operation of triggering a region other than the floating window 1602 (a region where a dotted box 1604 shown in FIG. 16A is located) in the window corresponding to the email application. In the interface shown in FIG. 16C, the floating window 1602 in the window corresponding to the email application may be in a bottom state, and the floating window 1601 in the window corresponding to the news application may be in the half-screen state.

It may be understood that each floating window in the application split-screen display interface satisfies non-modality, and the non-modal floating window enables the user to browse and trigger regions other than the floating window in each application split-screen window, thereby improving the user experience.

In a possible implementation, when the foldable screen phone receives, from the user, an operation of resizing a window in the application split-screen display interface, the floating window in each window may be adaptively adjusted according to the user's operation. For example, FIG. 17 is a schematic diagram of an interface for resizing a window in an application split-screen display interface according to an embodiment of this application.

Figure 17A:
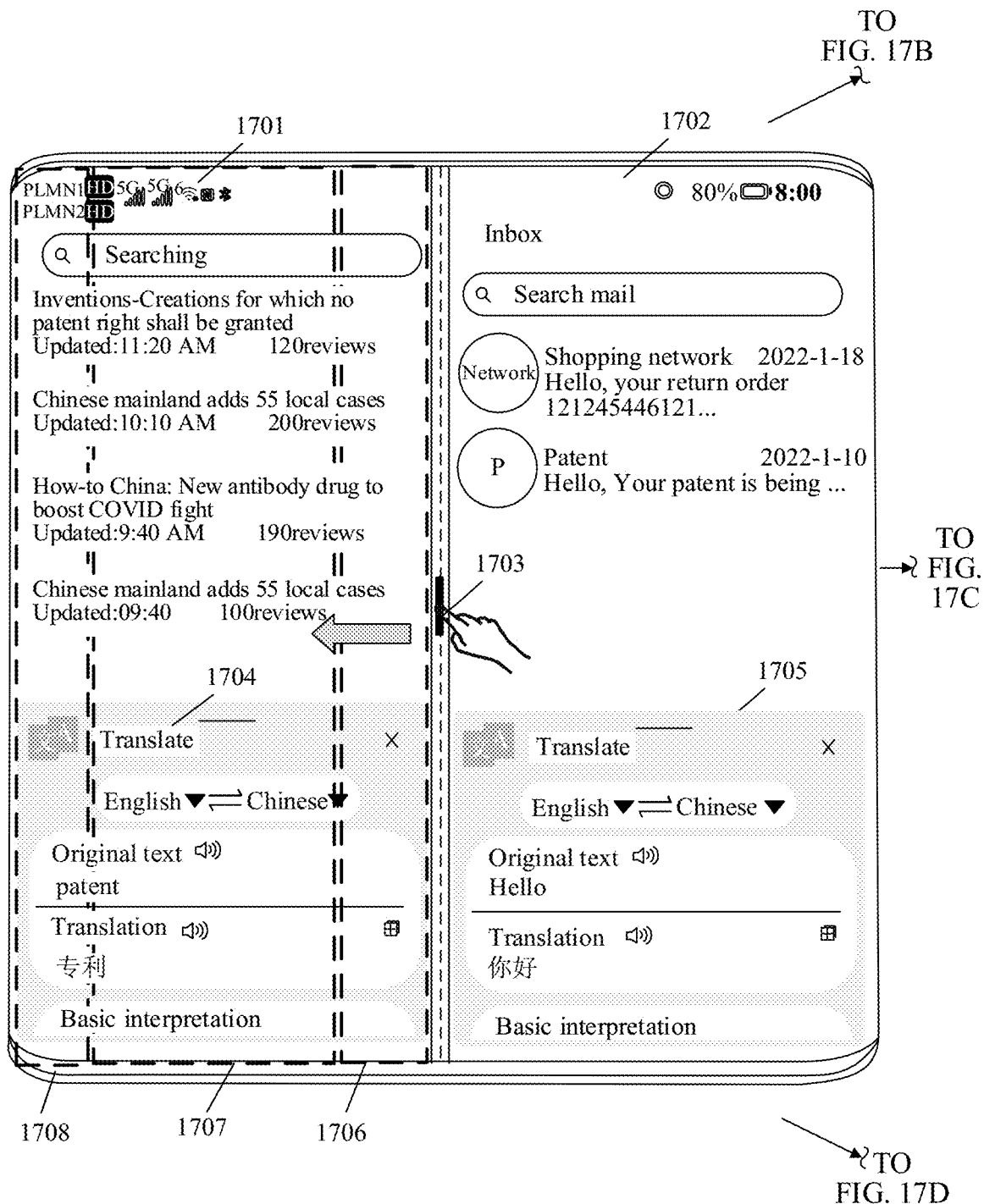
FIGS. 17A-17D is a schematic diagram of an interface for resizing a window in an application split-screen display interface according to an embodiment of this application.

In an interface shown in FIG. 17A, the interface may include: a window 1701 on the left side of the screen and corresponding to the news application (or referred to as the window 1701 for short), a floating window 1704 in the window 1701, a window 1702 on the right side of the screen and corresponding to the email application (or referred to as the window 1702 for short), a floating window 1705 in the window 1702, and a slide bar 1703.

Figure 17B:
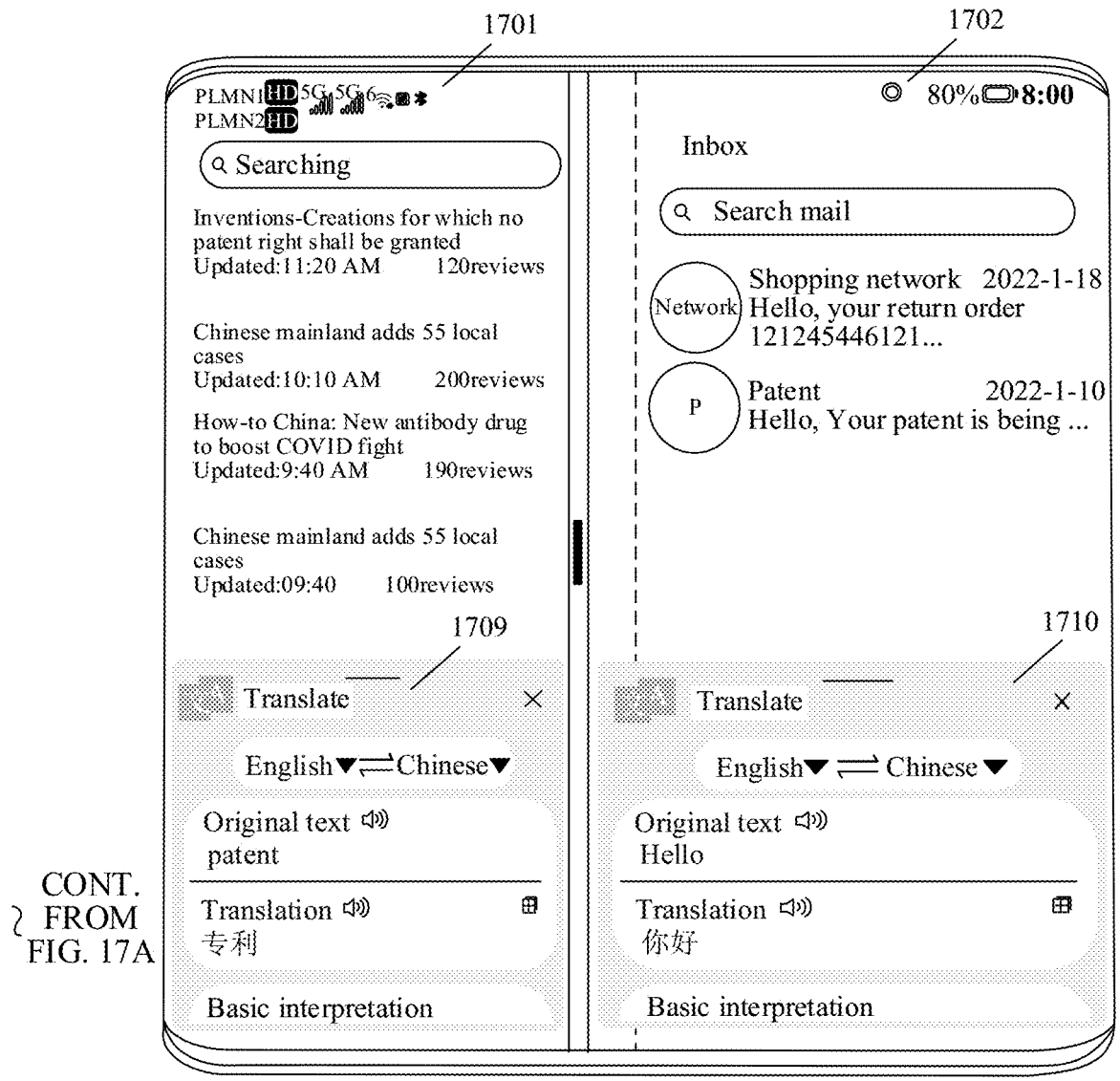

In an implementation, in the interface shown in FIG. 17A, the foldable screen phone may display an interface shown in FIG. 17B when the foldable screen phone receives, from the user, an operation of resizing the window, for example, an operation of tapping the slide bar 1703 to slide left (e.g., slide to a region where a dotted box 1706 is located). A width of a floating window 1709 in the interface shown in FIG. 17B is less than that of the floating window 1704 shown in FIG. 17A, and a width of a floating window 1710 in the interface shown in FIG. 17B is greater than that of the floating window 1705 shown in FIG. 17A.

It may be understood that when the user slides the slide bar 1703 slightly in the interface shown in FIG. 17A to change widths of left and right split-screen windows, since the widths of the two split-screen windows change little, each floating window in the two split-screen windows can be adaptively adjusted according to changes in the window widths, and the foldable screen phone may display the interface shown in FIG. 17B.

Figure 17C:
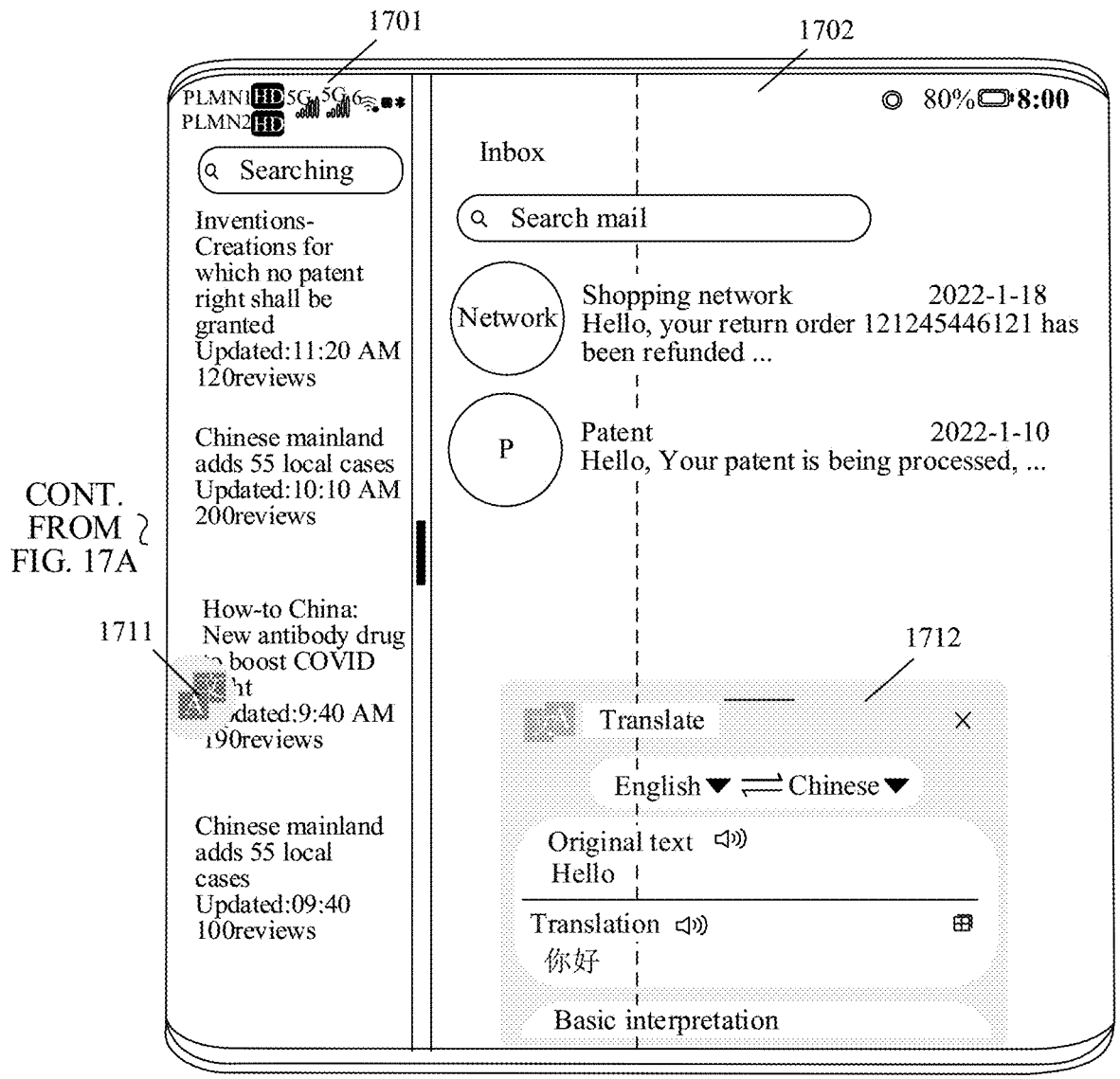

In another implementation, in the interface shown in FIG. 17A, the foldable screen phone may display an interface shown in FIG. 17C when the foldable screen phone receives, from the user, an operation of resizing the window, for example, an operation of tapping the slide bar 1703 to slide left (e.g., slide to a region where a dotted box 1707 is located). A floating ball 1711 may be displayed in the window 1701 in the interface shown in FIG. 17C, a floating window 1712 may be displayed in the window 1702, and the floating window 1712 may be centrally displayed at a bottom end of the window 1702.

It may be understood that when the user slides, in the interface shown in FIG. 17A, the slide bar 1703 to a region to change the widths of the left and right split-screen windows and reduce the width of any window (e.g., the width of the window 1701 shown in FIG. 17C) to a certain width threshold, since the widths of the two split-screen windows change greatly, the floating window in the window with a reduced with may be replaced with a floating ball for display, and the floating window in the window with an increased width may be centrally displayed, which prevents an influence on the user's viewing of content in the floating window when the floating window is reduced to a certain width.

Figure 17D:
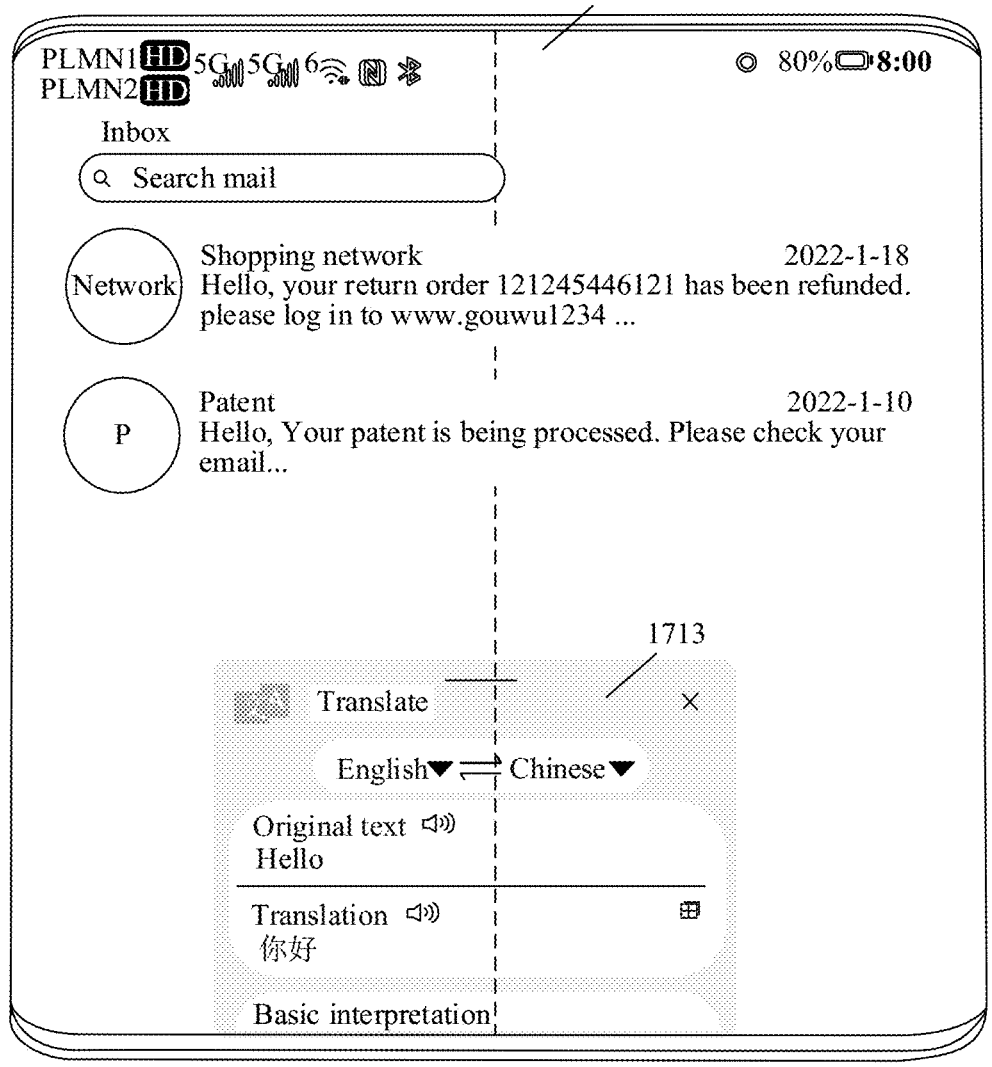

In another implementation, in the interface shown in FIG. 17A, the foldable screen phone may display an interface shown in FIG. 17D when the foldable screen phone receives, from the user, an operation of resizing the window, for example, an operation of tapping the slide bar 1703 to slide left (e.g., slide to a region where a dotted box 1708 is located). A floating window 1713 may be centrally displayed in the window 1702 in the interface shown in FIG. 17D.

It may be understood that when the user slides the slide bar 1703 to a left edge of the screen in the interface shown in FIG. 17A, it may be understood that the user no longer needs the content in the window 1701, so that the window 1702 may be displayed in full screen in the interface shown in FIG. 17D, and the floating window 1713 in the window 1702 may be centrally displayed at a bottom end of the screen.

It may be understood that positions of the dotted box 1706, the dotted box 1707, and the dotted box 1708) in the interface shown in FIG. 17A are merely examples, which are not specifically limited in this embodiment of this application.

In a possible implementation, on the basis of the interface shown in FIG. 17C, floating balls can all be displayed in the application split-screen interface of the foldable screen phone when the foldable screen phone receives, from the user, an operation of triggering the slide bar to slide right to a certain region.

For example, FIG. 18 is a schematic diagram of another interface for resizing a window in an application split-screen display interface according to an embodiment of this application.

Figure 18A:
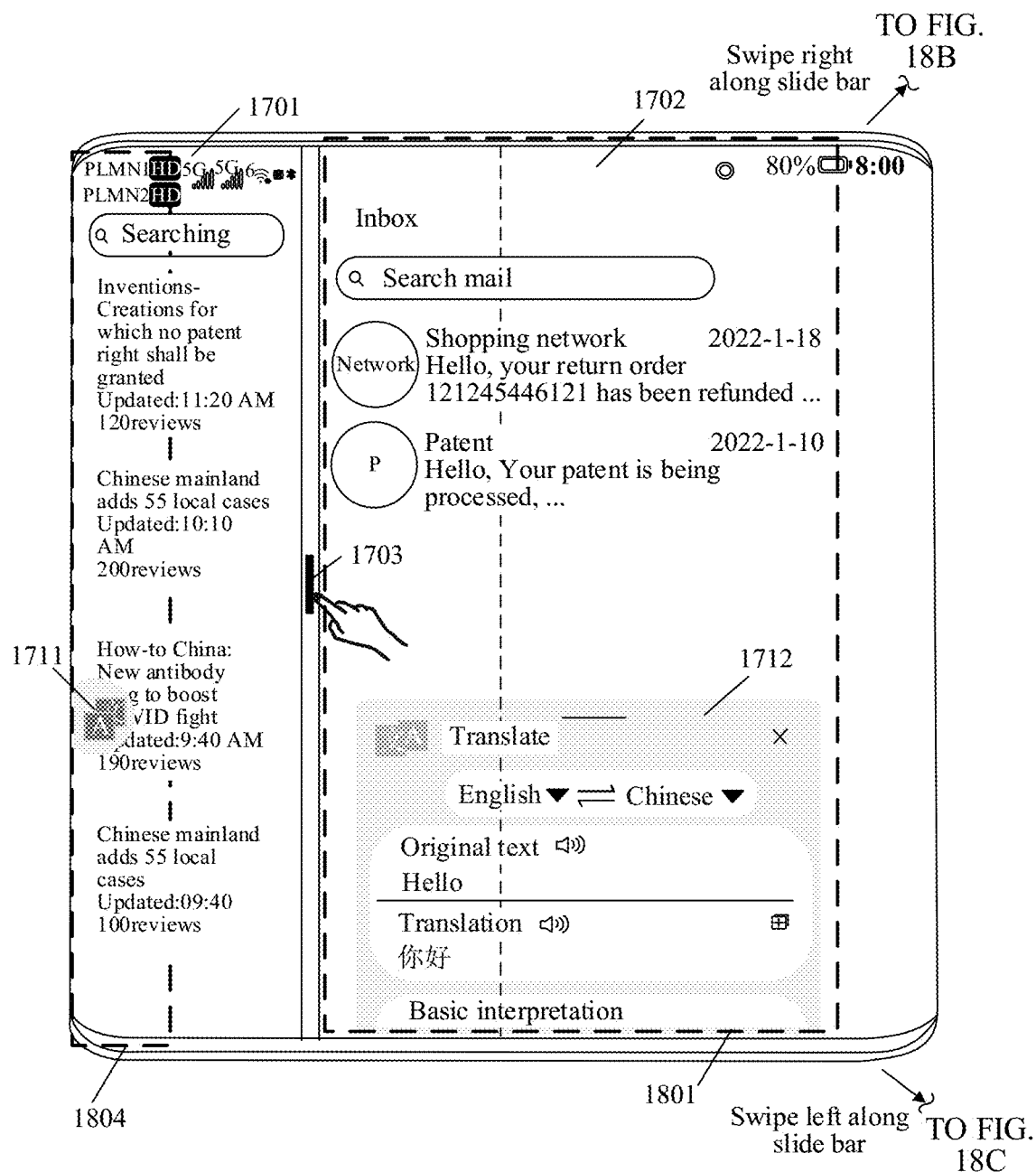
FIGS. 18A-18D are a schematic diagram of another interface for resizing a window in an application split-screen display interface according to an embodiment of this application.
Figure 18B:
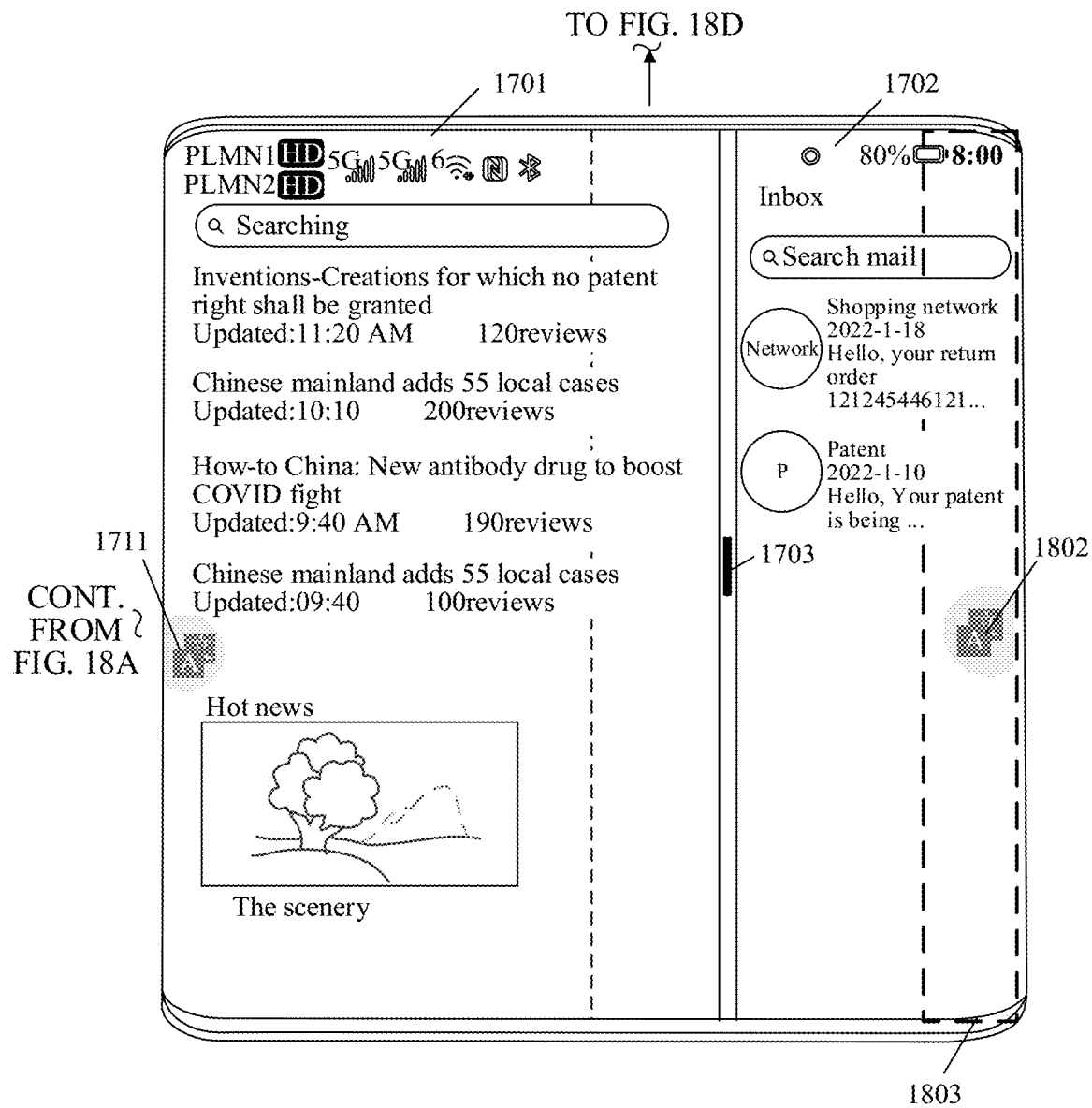

In an interface shown in FIG. 18A, the foldable screen phone may display an interface shown in FIG. 18B when the foldable screen phone receives, from the user, an operation of resizing the window, for example, an operation of tapping the slide bar 1703 to slide right (e.g., slide to a region where a dotted box 1801 is located). The interface shown in FIG. 18B may include: a floating ball 1802 displayed in the window 1702, and a floating ball 1711 displayed in the window 1701. Content displayed in the interface shown in FIG. 18A is consistent with that displayed in the interface shown in FIG. 17C. Details are not described herein again.

It may be understood that when the user slides, in the interface shown in FIG. 18A, the slide bar 1703 to a region to change widths of left and right split-screen windows and reduce the width of any window (e.g., the width of the window 1702 shown in FIG. 18B) to a certain width threshold, since the widths of the two split-screen windows change greatly, the floating window in the window with a reduced with may be replaced with a floating ball for display, which prevents an influence on the user's viewing of content in the floating window when the floating window is reduced to a certain width.

Figure 18C:
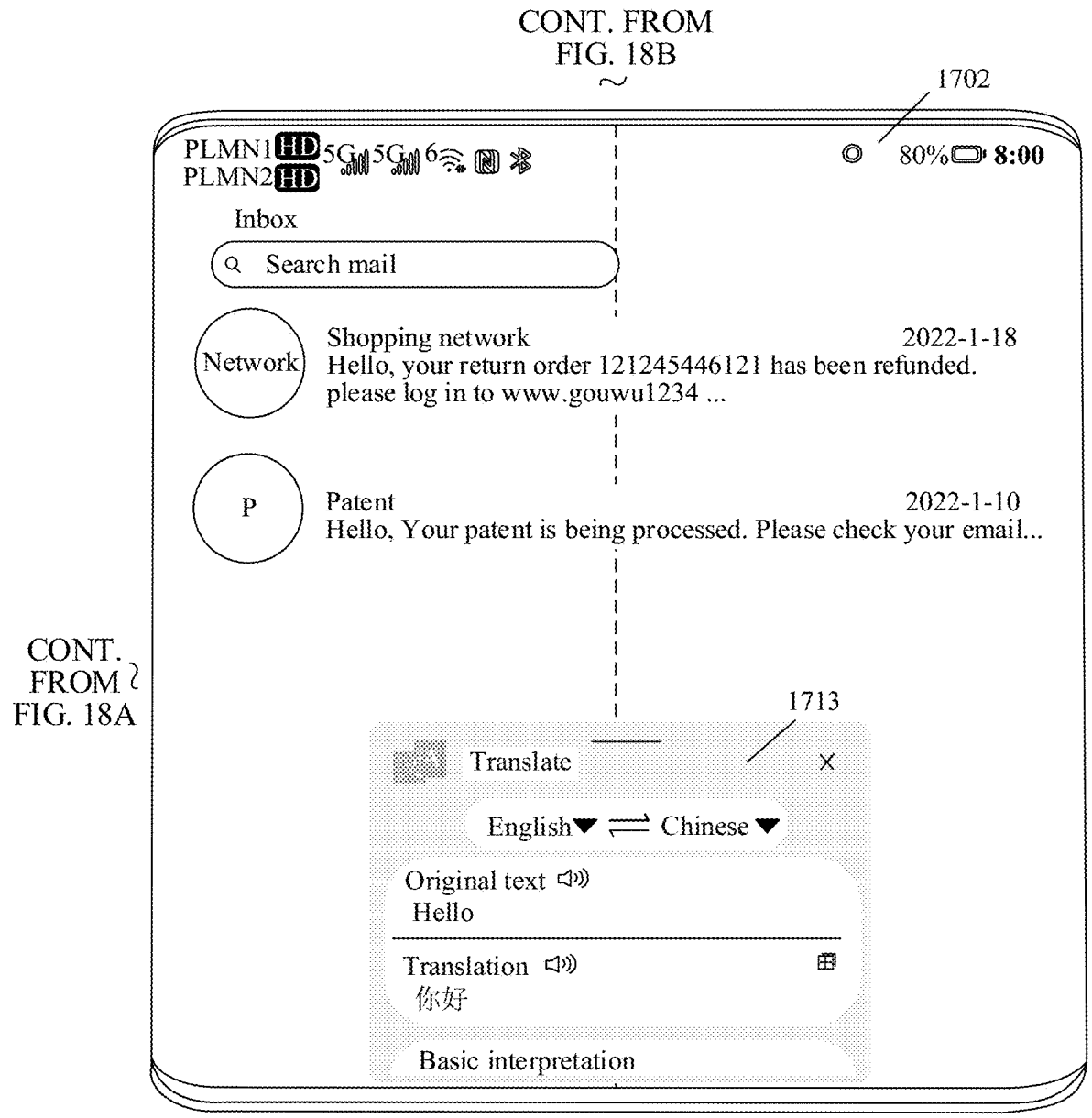
Figure 18D:
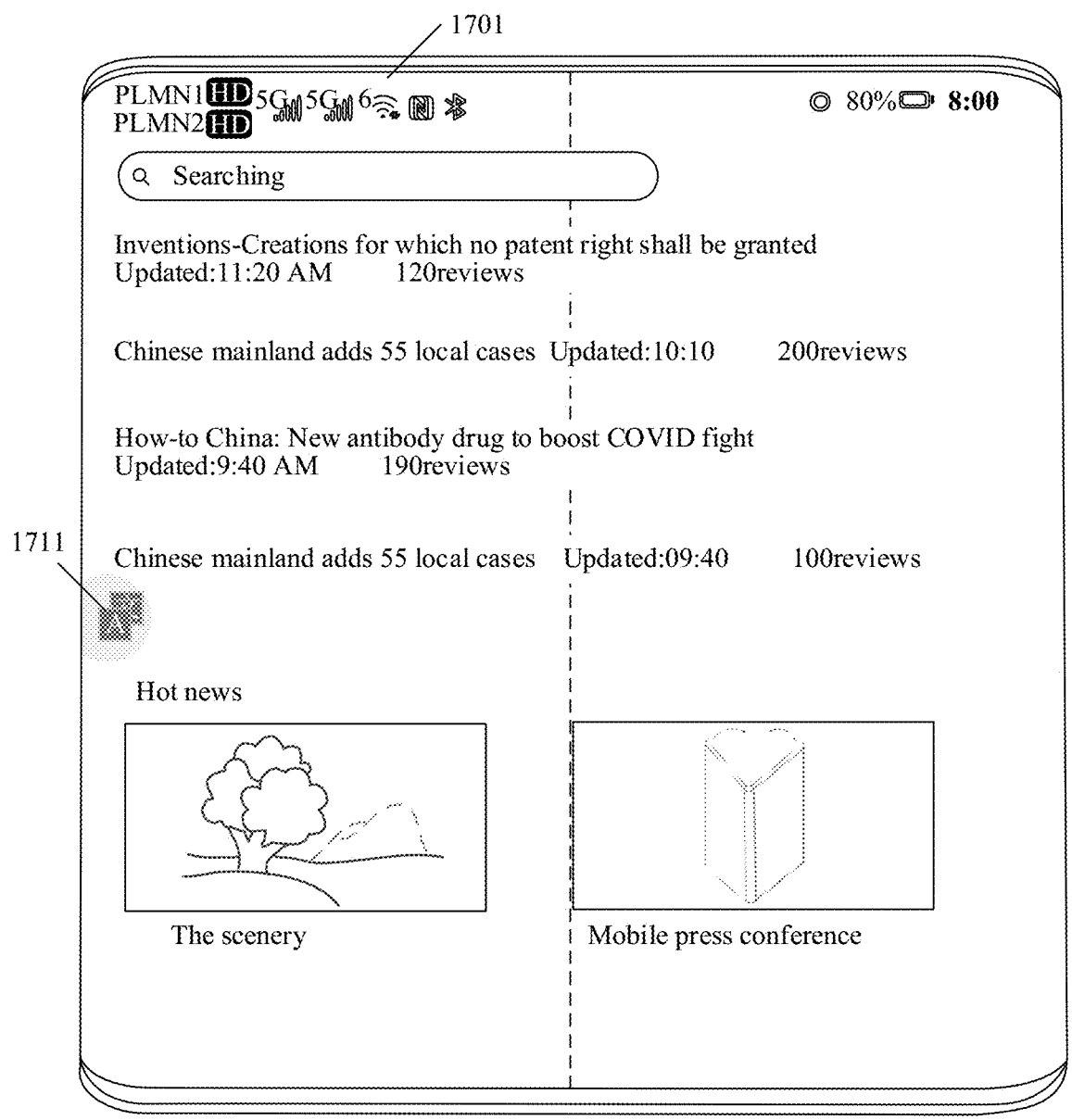

In a possible implementation, in an interface shown in FIG. 18B, the foldable screen phone may display an interface shown in FIG. 18D when the foldable screen phone receives, from the user, an operation of resizing the window, for example, an operation of tapping the slide bar 1703 to slide right (e.g., slide to a region where a dotted box 1803 is located). The window 1701 may be displayed in full screen in the interface shown in FIG. 18D, and the window 1701 includes the floating ball 1711.

In a possible implementation, in the interface shown in FIG. 18A, the foldable screen phone may display an interface shown in FIG. 18C when the foldable screen phone receives, from the user, an operation of resizing the window, for example, an operation of tapping the slide bar 1703 to continuously slide right (e.g., slide to a region where a dotted box 1804 is located). The window 1702 may be displayed in full screen in the interface shown in FIG. 18C, and the window 1702 includes a floating window 1713.

It may be understood that positions of the dotted box 1801 and the dotted box 1804 in the interface shown in FIG. 18A and the dotted box 1803 in the interface shown in FIG. 18B are merely examples, which are not specifically limited in this embodiment of this application.

In a possible implementation, in a case that the inner screen of the foldable screen phone uses a split-screen display function and floating windows are displayed in any split-screen window, the foldable screen phone may display windows in the inner screen in a top-bottom screen splitting manner on the outer screen when the foldable screen phone receives, from the user, an operation of folding the screen, for example, an operation of switching from the inner screen of the foldable screen phone to the outer screen of the foldable screen phone. For example, FIG. 19 is a schematic diagram of another interface for switching a screen of a foldable screen phone according to an embodiment of this application.

Figure 19A:
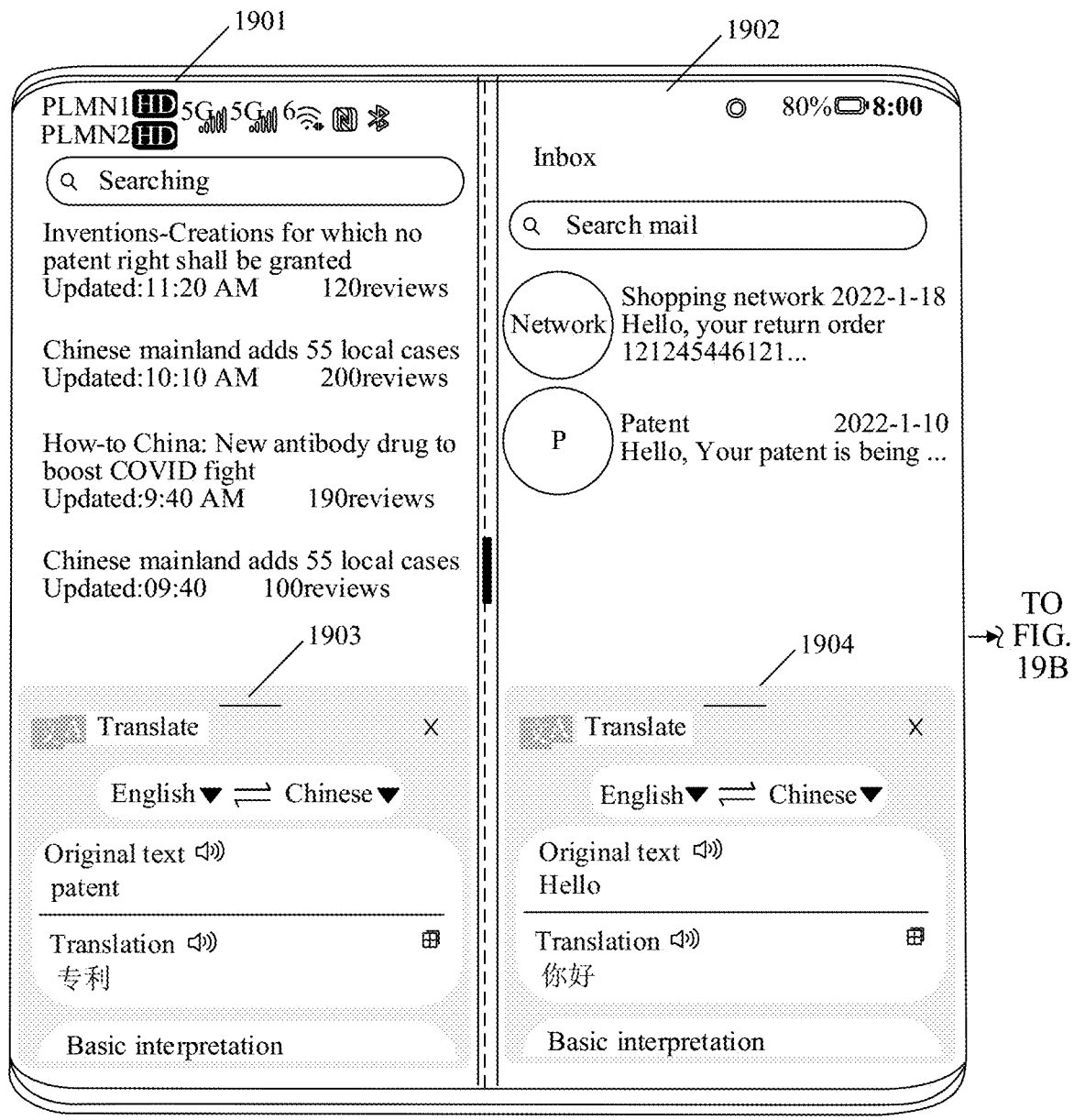
FIGS. 19A-19B are a schematic diagram of another interface for switching a screen of a foldable screen phone according to an embodiment of this application.
Figure 19B:
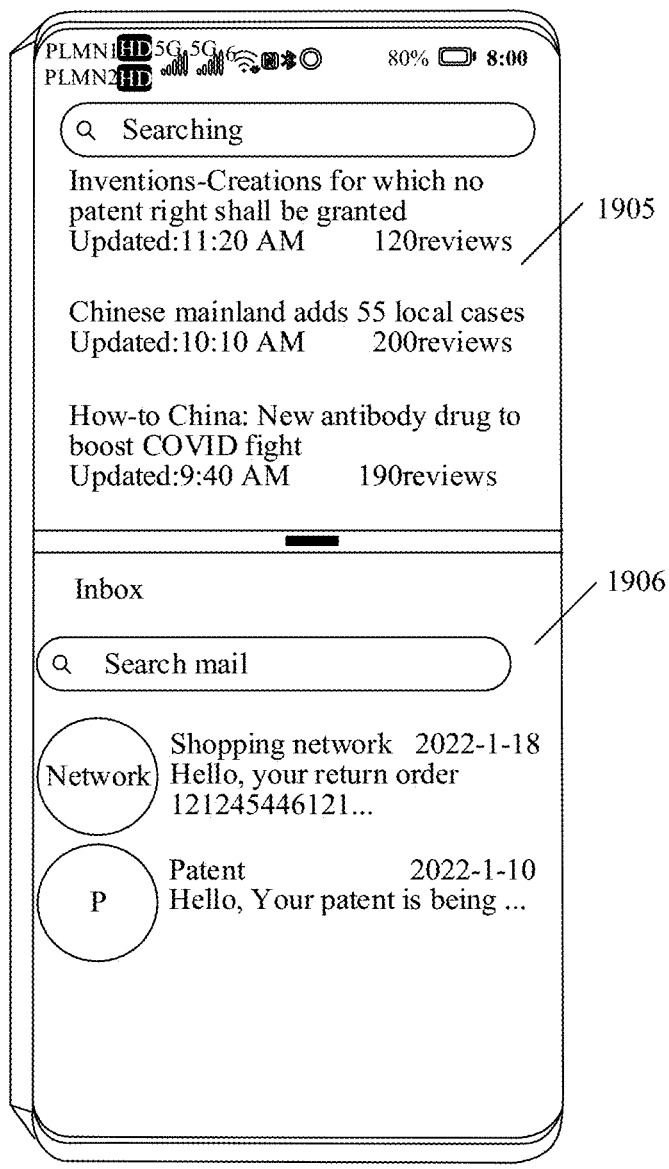

In a case that a window 1901 and a window 1902 are displayed on the inner screen of the foldable screen phone, a floating window 1903 is displayed in the window 1901, and a floating window 1904 is displayed in the window 1902 as shown in FIG. 19A, the foldable screen phone may turn off the display on the inner screen and display an interface shown in FIG. 19B on the outer screen when the foldable screen phone receives, from the user, an operation of folding the screen of the phone (or understood as that an angle of the foldable screen meets 0° to 70°). A window 1905 and a window 1906 may be displayed in a top-bottom screen splitting manner in the interface.

It may be understood that due to a limited outer screen of the mobile phone, the floating window cannot be displayed when the windows are supported to be displayed in a top-bottom screen splitting manner.

Figure 20:
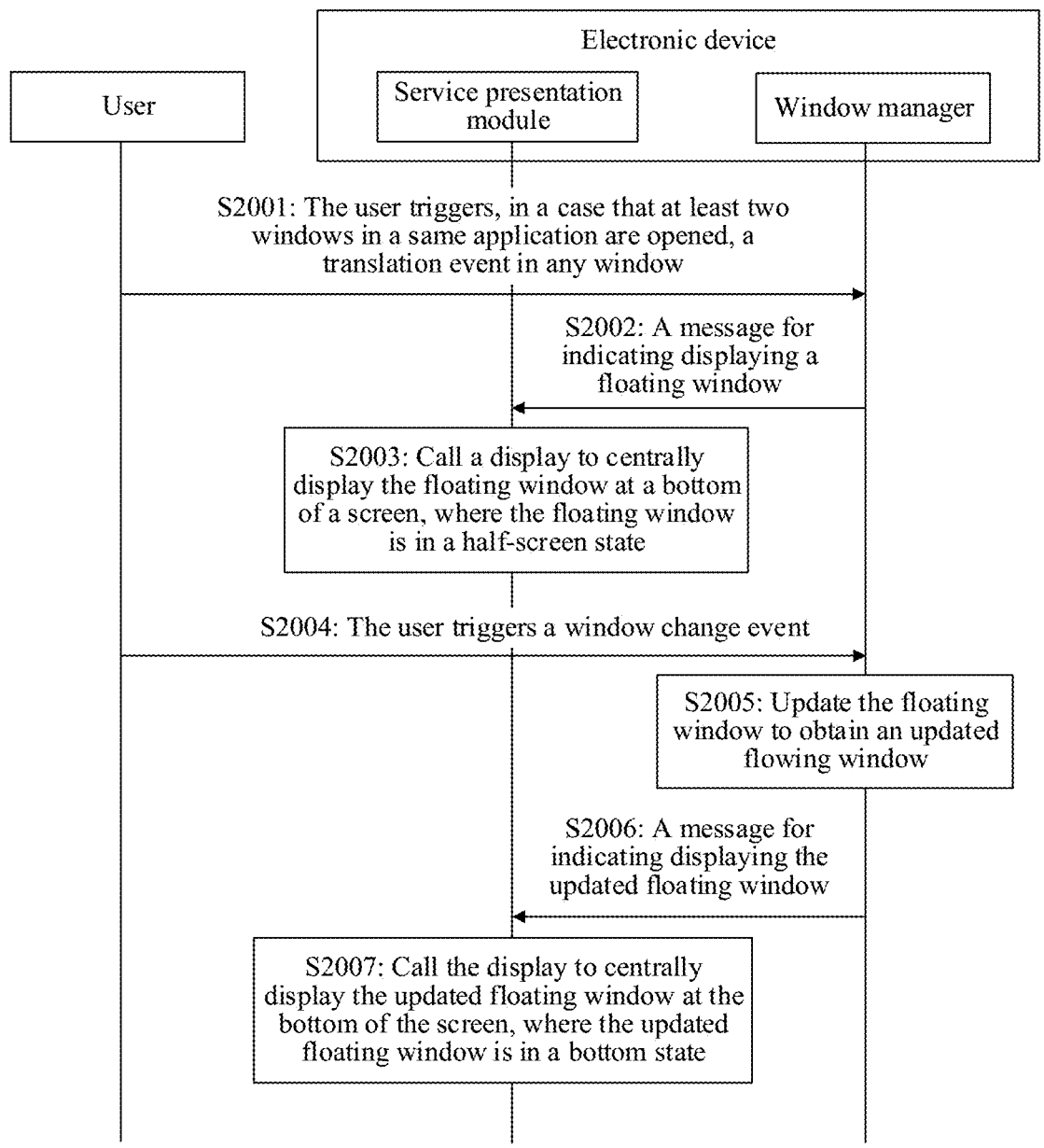
FIG. 20 is a schematic flowchart of a window interaction method according to an embodiment of this application.

For example, FIG. 20 is a schematic flowchart of a window interaction method according to an embodiment of this application. In the embodiment corresponding to FIG. 20, a software architecture of an electronic device may include a plurality of layers, such as an application layer and an application framework layer. The application layer may include a service presentation module, and the application framework layer may include a window manager.

As shown in FIG. 20, a window interaction method based on a parallel horizon function may include the following steps:

S2001: The user triggers, in a case that at least two windows in a same application are opened, a translation event in any window.

The translation event may be an event that triggers display of a floating window corresponding to a translation function of a to-be-translated text.

For example, in a case that the user enables, in a settings application, a parallel horizon function of the application and opens at least two windows in the application based on the parallel horizon function, for example, opens a home page and a content page of the application, the user may trigger a translation event in any window, for example, the main page or the content page.

S2002: The window manager sends, to the service presentation module, a message for indicating displaying a floating window in response to the user triggering the translation event in any window.

S2003: The service presentation module calls a display to centrally display the floating window at the bottom of a screen, and the floating window is in a half-screen state.

The floating window is non-modal.

It may be understood that based on S2001 to S2003, the floating window may be centrally display at the bottom of the screen when the electronic device receives, from the user, an operation of opening the floating window in the application using the parallel horizon.

In a possible implementation, the module in the electronic device may display the floating window based on the following steps S2004 to S2006 when the electronic device receives, from the user, an operation of resizing the window in the application using the parallel horizon.

S2004: The user triggers a window change event.

The window change event may be the user's sliding event for a slide bar between two windows in the application using the parallel horizon.

S2005: The window manager sends, to the service presentation module, the message for indicating displaying the floating window in response to the user triggering the window change event.

S2006: The window manager updates the floating window to obtain an updated floating window.

It may be understood that the updated floating window may be a floating window in a bottom state.

S2007: The service presentation module calls the display to centrally display the floating window at the bottom of the screen, and the updated floating window is in a bottom state.

It may be understood that, in the case that the electronic device uses the floating window displayed in the application using the parallel horizon, the user resizes the window in the parallel horizon, which may not affect a position of the floating window. Specifically, the display of the floating window by the service presentation module may be obtained with reference to the description in the embodiment corresponding to FIG. 10. Details are not described herein again.

In this way, the electronic device can appropriately display the floating window according to a requirement of the user for screen-splitting a display screen, thereby enhancing the user's experience of using the floating window.

Figure 21:
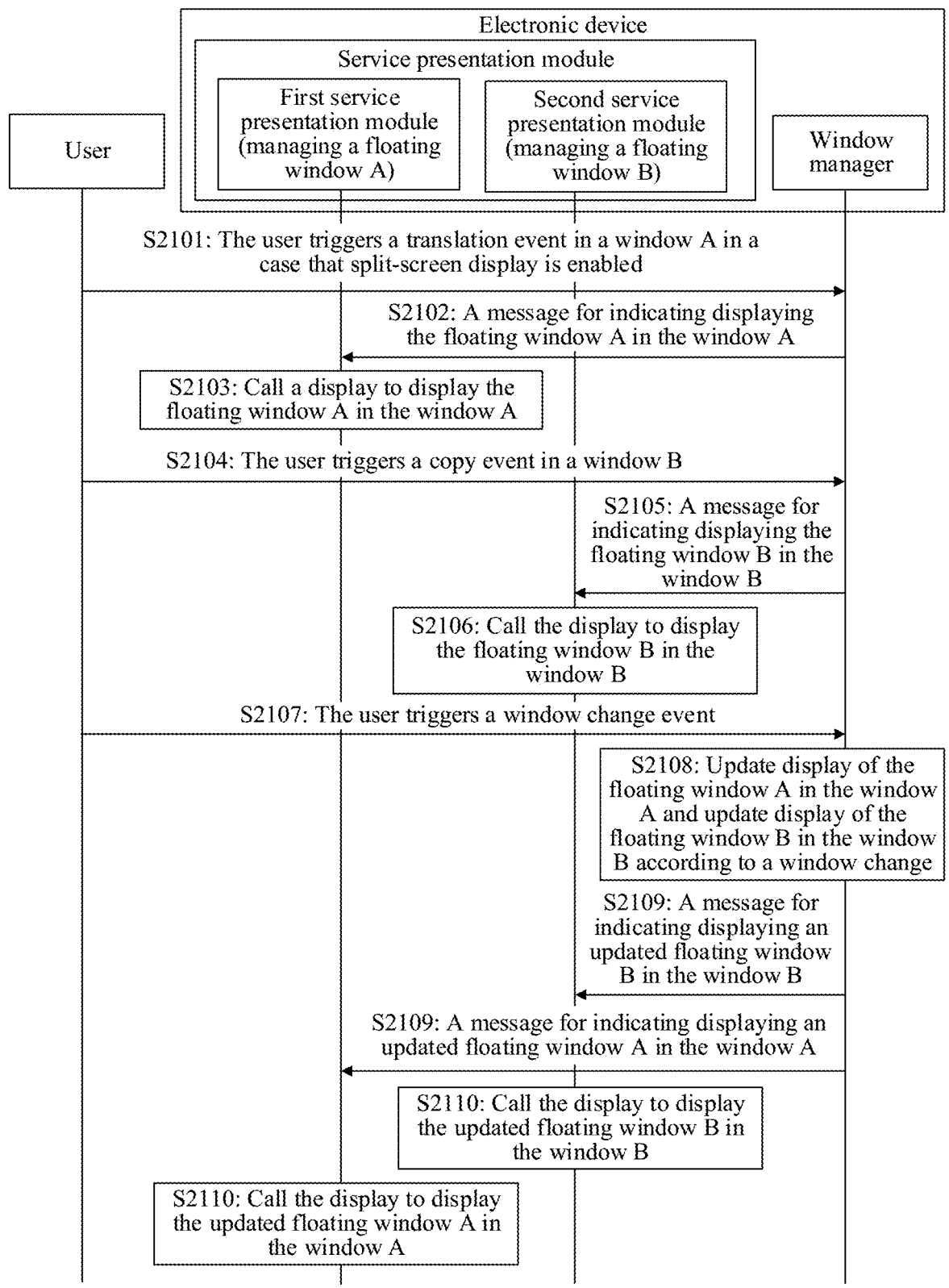
FIG. 21 is a schematic flowchart of another window interaction method according to an embodiment of this application.

For example, FIG. 21 is a schematic flowchart of another window interaction method according to an embodiment of this application. In the embodiment corresponding to FIG. 21, a software architecture of an electronic device may include a plurality of layers, such as an application layer and an application framework layer. The application layer may include a service presentation module, and the application framework layer may include a window manager. The service presentation module may include a first service presentation module for managing a floating window A and a second service presentation module for managing a floating window B.

As shown in FIG. 21, a window interaction method based on an application split-screen display function may include the following steps:

S2101: The user triggers a translation event in a window A in a case that application split-screen display is enabled.

The translation event may be obtained with reference to the description in step S2001. Details are not described herein again.

S2102: The window manager sends, to the first service presentation module, a message for indicating displaying the floating window A in the window A in response to the user triggering the translation event in the window A.

S2103: The first service presentation module calls a display to display the floating window A in the window A.

S2104: The user triggers the translation event in a window B.

S2105: The window manager sends, to the first service presentation module, a message for indicating displaying the floating window B in the window B in response to the user triggering the translation event in the window B.

S2106: The second service presentation module calls the display to display the floating window B in the window B.

In a possible implementation, when the electronic device receives, from the user, an operation of resizing the window in an interface where floating windows are all displayed in a split-screen window, the module in the electronic device may display each floating window in the split-screen window based on the following steps S2107 to S2110.

S2107: The user triggers a window change event.

The window change event may be the user's sliding event for a slide bar between two windows in the application split-screen interface.

S2108: The window manager updates display of the floating window A in the window A and updates display of the floating window B in the window B according to a window change in response to the window change event.

Specifically, the window manager may update, with reference to the description in the embodiment corresponding to FIG. 17, the floating window displayed in the window. The window A may be the window 1701 in FIG. 17, and the window B may be the window 1702 in FIG. 17.

In an implementation, as shown in FIG. 17A, the window manager may update the floating window with reference to the interface shown in FIG. 17B when the user taps the slide bar 1703 to slide left (e.g., slide to the region where the dotted box 1706 is located).

In a possible implementation, on the basis of the interface shown in FIG. 17B (or in FIG. 18A), floating balls can all be displayed in an application split-screen interface of the electronic device when the electronic device receives, from the user, an operation of triggering the slide bar to slide right to a certain region (the dotted box 1801 in FIG. 18A). Specifically, the window manager may update the floating window with reference to the interface shown in FIG. 18B.

Further, on the basis of the interface shown in FIG. 18B, when the electronic device receives, from the user, an operation of triggering the slide bar to slide right to a certain region (the dotted box 1803 in FIG. 18B), display of content in the right window of the electronic device may be canceled in the application split-screen interface of the electronic device and the electronic device may display content in the left window of the electronic device in full screen. Specifically, the window manager may update the floating window with reference to the interface shown in FIG. 18D.

In a possible implementation, on the basis of the interface shown in FIG. 17B (or FIG. 18A), when the electronic device receives, from the user, an operation of triggering the slide bar to slide left to a certain region (the dotted box 1804 in FIG. 18A), display of the content in the left window of the electronic device may be canceled in the application split-screen interface of the electronic device and the electronic device may display the content in the right window of the electronic device in full screen. Specifically, the window manager may update the floating window with reference to the interface shown in FIG. 18C.

In another implementation, as shown in FIG. 17A, the window manager may update the floating window with reference to the interface shown in FIG. 17C when the user taps the slide bar 1703 to slide left (e.g., slide to the region where the dotted box 1707 is located).

In yet another implementation, as shown in FIG. 17A, the window manager may update the floating window with reference to the interface shown in FIG. 17D when the user taps the slide bar 1703 to slide left (e.g., slide to the region where the dotted box 1708 is located).

S2109: The window manager sends, to the first service presentation module, a message for indicating displaying the updated floating window A in the window A, and sends, to the second service presentation module, a message for indicating displaying the updated floating window B in the window B.

S2110: The first service presentation module calls the display to display the updated floating window A in the window A, and the second service presentation module calls the display to display the updated floating window B in the window B.

In this way, the electronic device can appropriately display the floating window according to a requirement of the user for screen-splitting a display screen, thereby enhancing the user's experience of using the floating window.

It may be understood that, the interface according to this embodiment of this application is merely an example, which cannot further limit this embodiment of this application.

Figure 22:
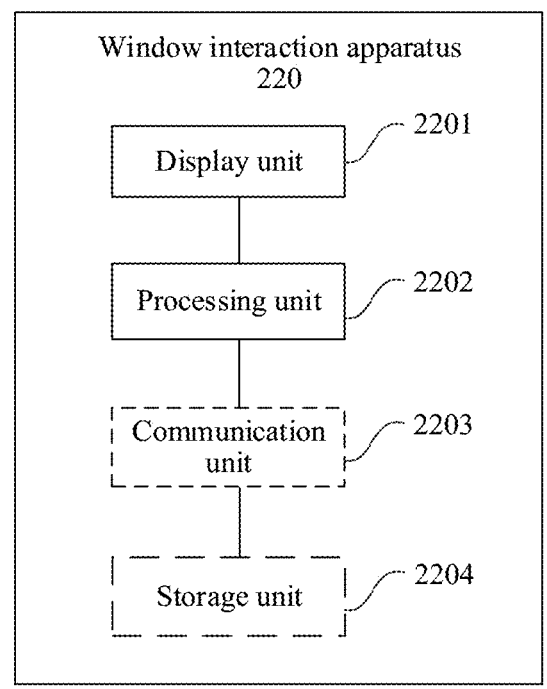
FIG. 22 is a schematic structural diagram of a window interaction apparatus according to an embodiment of this application.

For example, FIG. 22 is a schematic structural diagram of a window interaction apparatus according to an embodiment of this application.

As shown in FIG. 22, a window interaction apparatus 220 may be applied to a communication device, a circuit, a hardware component, or a chip, and the window interaction apparatus includes: a display unit 2201, a processing unit 2202, and a communication unit 2203. The display unit 2201 is configured to support exiting a display step performed by a resource allocation method. The processing unit 2202 is configured to support the window interaction apparatus to perform an information processing step. The communication unit 2203 is configured to support data sending and data receiving steps performed by the resource allocation method.

In a possible embodiment, the communication unit 2203 may be an input or output interface, a pin, a circuit, or the like.

In a possible embodiment, the window interaction apparatus may further include: a storage unit 2204. The processing unit 2202, the communication unit 2203, and the storage unit 2204 are connected through a line.

The storage unit 2204 may include one or more memories, and the memory may be one or more devices or components in a circuit that are used to store a program or data.

The storage unit 2204 may exist independently, and is connected to the processing unit 2202 included in the window interaction apparatus by using a communication line. The storage unit 2204 may alternatively be integrated with the processing unit 2202.

The storage unit 2204 may store computer-executable instructions of the method in the electronic device, so that the processing unit 2202 performs the method in the foregoing embodiments.

The storage unit 2204 may be a register, a cache, a RAM, or the like, and the storage unit 2204 may be integrated with the processing unit 2202. The storage unit 2204 may be a read-only memory (read-only memory, ROM) or another type of static storage device that may store static information and instructions, and the storage unit 2204 may be independent of the processing unit 2202.

In the foregoing embodiment, the instructions executed by the processor stored in the memory may be implemented in the form of a computer program product. The computer program product may be pre-written in the memory, or may be downloaded and installed in the memory in the form of software.

The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, including one or more usable media. The usable medium may include a magnetic medium (for example, a floppy disk, a hard disk, or a magnetic tape), an optical medium (for example, a digital versatile disc (digital versatile disc, DVD)), a semi-conductive medium (for example, a solid-state disk (solid-state disk, SSD)), or the like.

An embodiment of this application further provides a computer-readable storage medium. All or some of methods in the foregoing embodiments may be implemented by using software, hardware, firmware, or any combination thereof. The computer-readable medium may include a computer storage medium and a communication medium, and may further include any medium that may transmit a computer program from one place to another. The storage medium may be any target medium accessible to a computer.

In a possible design, the computer-readable storage medium may include a compact disc read-only memory (compact disc read-only memory, CD-ROM), a RAM, a ROM, an EEPROM, or another optical disc memory. The computer-readable medium may include a magnetic disk memory or another magnetic disk storage device. Any connection line may also be appropriately referred to as a computer readable medium. For example, if software is transmitted from a website, a server or another remote source by using a coaxial cable, an optical fiber cable, a twisted pair, a DSL or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc (CD), a laser disc, an optical disc, a digital versatile disc (digital versatile disc, DVD), a floppy disk, and a blue ray disc. The magnetic disk generally reproduces data in a magnetic manner, and the optical disc reproduces data optically by using laser.

The foregoing combination should also be included in the scope of the computer-readable medium. The foregoing descriptions are merely specific implementations of the present invention, but the protection scope of the present invention is not limited thereto. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A window interaction method, applied to an electronic device, wherein the electronic device comprises a first display screen, and the method comprises:

displaying, by the electronic device, a first interface by using the first display screen, wherein the first interface comprises a first window, a second window, and a first slide bar configured to resize the first window and the second window, and content displayed in the first window and content displayed in the second window both belong to a first application;

displaying, by the electronic device, a second interface in response to a first operation on the first window or the second window, wherein the second interface comprises a first floating window displayed in the first window, the first window, the second window, and the first slide bar, and a width of the first floating window is less than that of the first display screen, and the first floating window satisfies a first state; and displaying, by the electronic device, a modified interface in response to an operation of sliding the first slide bar to resize the first window and the second window, wherein when a width of the first window is reduced to a certain width threshold due to the sliding operation, the first floating window is replaced with a floating ball for display in the first window and a second floating window is centrally displayed in a bottom end of the second window, wherein the floating ball is a system window that has a display form different from a display form of the first floating window and that is displayed in the first window over content of the first window, wherein the floating ball is a window that receives a triggering operation by a user to open the first floating window, and wherein when the width of the first window is increased from the certain width threshold due to the sliding operation, the floating ball is replaced with the first floating window for display in the first window.

2. The method according to claim 1, wherein the second interface further comprises a first region, the first region is a region in the second interface other than the first floating window, and the method further comprises:
displaying, by the electronic device, a third interface in response to an operation of sliding the first slide bar to the first region in the second interface, the third interface comprises a second floating window, the second floating window satisfies a second state, and the second state is different from or the same as the first state.

3. The method according to claim 2, wherein the first state comprises any one of a half-screen state, a full-screen state, or a bottom state; and
wherein the second state comprises the bottom state.

4. The method according to claim 1, further comprising:
displaying, by the electronic device, a fourth interface in response to a third operation on the electronic device, wherein the fourth interface comprises a third floating window; and a width of the third floating window is less than that of the first display screen, and the third floating window satisfies the first state.

5. The method according to claim 4, wherein the fourth interface is an interface of the electronic device in a landscape state when the second interface is an interface of the electronic device in a portrait state.

6. The method according to claim 1, wherein the electronic device further comprises a second display screen, and the method further comprises:
displaying, by the electronic device in response to a fourth operation on the electronic device, a fifth interface by using the second display screen, wherein the fifth interface comprises a fourth floating window and the second window, and a width of the fourth floating window is the same as that of the second display screen.

7. The method according to claim 6, wherein displaying, by the electronic device in response to the fourth operation on the electronic device, the fifth interface by using the second display screen comprises:
obtaining, by the electronic device, first data in response to the fourth operation on the electronic device, wherein the first data comprises folding-angle data, and the folding-angle data is detected based on a hinge sensor; and
displaying, by the electronic device, the fifth interface by using the second display screen when the electronic device determines that the folding-angle data satisfies a first preset condition.

8. The method according to claim 1, wherein before displaying, by the electronic device, the first interface by using the first display screen, the method further comprises:
displaying, by the electronic device, a sixth interface by using the first display screen when a preset function of the first application is enabled, content displayed on the sixth interface belong to the first application; and
wherein displaying, by the electronic device, the first interface by using the first display screen comprises:
displaying, by the electronic device in response to a fifth operation on the sixth interface, the first interface by using the first display screen.

9. The method according to claim 1, wherein displaying, by the electronic device, the second interface in response to the first operation on the first window or the second window comprises:
displaying, by the electronic device, a seventh interface in response to the first operation on the first window or the second window, wherein the seventh interface comprises a first text;
displaying, by the electronic device, a first control in response to an operation on the first text, wherein the first control comprises a copy option and a translation option;
displaying, by the electronic device, a floating ball control in response to an operation on the copy option; and
displaying, by the electronic device, the second interface in response to an operation on the floating ball control.

10. The method according to claim 1, wherein displaying, by the electronic device, the first interface by using the first display screen comprises:
displaying, by the electronic device, an eighth interface by using the first display screen, wherein the eighth interface comprises a second text;
displaying, by the electronic device, a second control in response to an operation on the second text, wherein the second control comprises a copy option and a translation option; and
displaying, by the electronic device in response to an operation on the translation option, the first interface by using the first display screen.

11. An electronic device, wherein the electronic device comprises a memory storing a computer program instruction and a processor configured to execute the program instruction, and wherein, when the computer program instruction is executed by the processor, the electronic device is enabled to:
display a first interface using a first display screen, wherein the first interface comprises a first window, a second window, and a first slide bar configured to resize the first window and the second window, and content displayed in the first window and content displayed in the second window both belong to a first application;
display a second interface in response to a first operation on the first window or the second window, wherein the second interface comprises a first floating window displayed in the first window, the first window, the second window, and the first slide bar, and wherein a width of the first floating window is less than that of the first display screen, and the first floating window satisfies a first state; and
display a modified interface in response to an operation of sliding the first slide bar to resize the first window and the second window, wherein when a width of the first window is reduced to a certain width threshold due to the sliding operation, the first floating window is replaced with a floating ball for display in the first window and a second floating window is centrally displayed in a bottom end of the second window, wherein the floating ball is a system window that has a display form different from a display form of the first floating window and that is displayed in the first window over content of the first window, wherein the floating ball is a window that receives a triggering operation by a user to open the first floating window, and wherein when the width of the first window is increased from the certain width threshold due to the sliding operation, the floating ball is replaced with the first floating window for display in the first window.

12. The electronic device, according to claim 11, wherein the second interface further comprises a first region, the first region is a region in the second interface other than the first floating window, the electronic device is further enabled to:
display a third interface in response to an operation of sliding the first slide bar to the first region in the second interface, wherein the third interface comprises a third floating window, the third floating window satisfies a second state, and the second state is different from or the same as the first state.

13. The electronic device, according to claim 12, wherein the first state comprises any one of a half-screen state, a full-screen state, or a bottom state, and the second state comprises the bottom state.

14. The electronic device, according to claim 11, wherein the electronic device is further enabled to:
display a fourth interface in response to a third operation on the electronic device, wherein the fourth interface comprises a third floating window, and a width of the third floating window is less than that of the first display screen, and the third floating window satisfies the first state.

15. The electronic device, according to claim 14, wherein the fourth interface is an interface of the electronic device in a landscape state when the second interface is an interface of the electronic device in a portrait state.

16. The electronic device, according to claim 11, wherein the electronic device further comprises a second display screen, and the electronic device is further enabled to:
display a fifth interface by using the second display screen in response to a fourth operation on the electronic device, wherein the fifth interface comprises a fourth floating window and the second window, and wherein a width of the fourth floating window is the same as that of the second display screen.

17. The electronic device, according to claim 16, wherein displaying the fifth interface by using the second display screen in response to the fourth operation on the electronic device comprises:
obtaining first data in response to the fourth operation on the electronic device, wherein the first data comprises folding-angle data, and the folding-angle data is detected based on a hinge sensor; and
displaying the fifth interface by using the second display screen when the electronic device determines that the folding-angle data satisfies a first preset condition.

18. A non-transitory computer-readable storage medium, wherein a computer program is stored in the computer-readable storage medium, and the computer program, when executed on a computer, enables a computer to:
display a first interface using a first display screen, wherein the first interface comprises a first window, a second window, and a first slide bar configured to resize the first window and the second window, and wherein content displayed in the first window and content displayed in the second window both belong to a first application;
display a second interface in response to a first operation on the first window or the second window, wherein the second interface comprises a first floating window displayed in the first window, the first window, the second window, and the first slide bar, and wherein a width of the first floating window is less than that of the first display screen, and the first floating window satisfies a first state; and
display a modified interface in response to an operation of sliding the first slide bar to resize the first window and the second window, wherein when a width of the first window is reduced to a certain width threshold due to the sliding operation, the first floating window is replaced with a floating ball for display in the first window and a second floating window is centrally displayed in a bottom end of the second window, wherein the floating ball is a system window that has a display form different from a display form of the first floating window and that is displayed in the first window over content of the first window, wherein the floating ball is a window that receives a triggering operation by a user to open the first floating window, and wherein when the width of the first window is increased from the certain width threshold due to the sliding operation, the floating ball is replaced with the first floating window for display in the first window.

19. The non-transitory computer-readable storage medium, according to claim 18, wherein the second interface further comprises a first region, the first region is a region in the second interface other than the first floating window, the computer is further enabled to:
display a third interface in response to an operation of sliding the first slide bar to the first region in the second interface, wherein the third interface comprises a third floating window, the third floating window satisfies a second state, and the second state is different from or the same as the first state.

20. The non-transitory computer-readable storage medium, according to claim 19, wherein the first state comprises any one of a half-screen state, a full-screen state, or a bottom state, and wherein the second state comprises the bottom state.

* * * * *